United States Patent
Panwar et al.

(10) Patent No.: US 11,936,883 B2
(45) Date of Patent: Mar. 19, 2024

(54) SYSTEM AND METHOD FOR RENDERING DIFFERENTIAL VIDEO ON GRAPHICAL DISPLAYS

(71) Applicant: SAMSUNG ELECTRONICS CO., LTD., Suwon-si (KR)

(72) Inventors: Sumit Panwar, Noida (IN); Ashish Kumar, Noida (IN); Daljeet Kaur, Noida (IN); Harsh Aggarwal, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 17/557,812

(22) Filed: Dec. 21, 2021

(65) Prior Publication Data
US 2023/0016473 A1    Jan. 19, 2023

Related U.S. Application Data

(63) Continuation of application No. PCT/KR2021/016231, filed on Nov. 9, 2021.

(30) Foreign Application Priority Data

Jul. 13, 2021   (IN) .............................. 202111031488

(51) Int. Cl.
*H04N 19/176*   (2014.01)
*G06T 1/20*     (2006.01)
(Continued)

(52) U.S. Cl.
CPC ............. *H04N 19/176* (2014.11); *G06T 1/20* (2013.01); *G06T 15/005* (2013.01); *H04N 19/127* (2014.11); *H04N 19/174* (2014.11)

(58) Field of Classification Search
None
See application file for complete search history.

(56) References Cited

U.S. PATENT DOCUMENTS

| 10,157,480 B2 | 12/2018 | Zhu et al. |
| 2006/0038922 A1 | 2/2006 | Hsieh et al. |

(Continued)

FOREIGN PATENT DOCUMENTS

| AU | 2016216674 B2 | 9/2016 |
| EP | 3 634 005 A1 | 4/2020 |

(Continued)

OTHER PUBLICATIONS

International Search Report dated Mar. 30, 2022 issued by the International Searching Authority in counterpart International Application No. PCT/KR2021/016231 (PCT/ISA/210).

(Continued)

*Primary Examiner* — Clifford Hilaire
(74) *Attorney, Agent, or Firm* — Sughrue Mion, PLLC

(57) ABSTRACT

A differential video rendering system, including a graphics processing unit (GPU); a graphical display coupled to the GPU; a video decoder configured to decode a bitstream of encoded data into a plurality of sets of decoded blocks; at least one processor configured to: generate, based on a first set of the plurality of sets of decoded blocks, a first differential video frame comprising a plurality of sets of differential regions, normalize each set of the plurality of sets of differential regions to a fixed size block to provide a normalized plurality of sets of differential regions, map a respective set of the normalized plurality of sets of differential regions to align with a respective tile size region of a plurality of tile size regions conforming with the GPU, generate a hierarchal region tree based on the normalized plurality of sets of differential regions mapped to the plurality of tile size regions, and generate a plurality of optimal (Continued)

Related Art Video Texturing Flow Diagram regions based on the hierarchal region tree satisfying a predefined criteria corresponding to a pre-defined optimal number of regions and a predefined efficiency parameter; and a graphics rendering engine configured to render the first differential video frame on the graphical display based on the plurality of optimal regions and a group of differential regions.

20 Claims, 53 Drawing Sheets

(51) Int. Cl.
 *G06T 15/00* (2011.01)
 *H04N 19/127* (2014.01)
 *H04N 19/174* (2014.01)

(56) References Cited

U.S. PATENT DOCUMENTS

| | | |
|---|---|---|
| 2007/0065030 A1 | 3/2007 | Shen et al. |
| 2008/0187048 A1* | 8/2008 | Baik .................. H04N 19/61 375/E7.125 |
| 2009/0295800 A1 | 12/2009 | Vetter et al. |
| 2010/0118938 A1 | 5/2010 | Fuchs et al. |
| 2012/0092451 A1 | 4/2012 | Nystad et al. |
| 2012/0236199 A1 | 9/2012 | Imai et al. |
| 2013/0265298 A1* | 10/2013 | Moon .................. G06T 15/005 345/419 |
| 2014/0043358 A1 | 2/2014 | Wang |
| 2014/0147044 A1 | 5/2014 | Takada |
| 2014/0241608 A1 | 8/2014 | Ghosh et al. |
| 2015/0228106 A1* | 8/2015 | Laksono ................ G06T 15/04 345/419 |
| 2015/0229927 A1 | 8/2015 | Inada et al. |
| 2015/0229960 A1 | 8/2015 | Yamasaki et al. |
| 2020/0031058 A1* | 1/2020 | Withey .................. G06T 11/40 |
| 2020/0314424 A1 | 10/2020 | Hu et al. |

FOREIGN PATENT DOCUMENTS

| | | |
|---|---|---|
| JP | 5622613 B2 | 11/2014 |
| WO | 2014/110553 A | 7/2014 |

OTHER PUBLICATIONS

International Written Opinion dated Mar. 30, 2022 issued by the International Searching Authority in counterpart International Application No. PCT/KR2021/016231 (PCT/ISA/237).

Communication dated Jan. 10, 2024 by the Indian Patent Office in corresponding IN Patent Application No. 202111031488.

* cited by examiner

Related Art Video Texturing Flow Diagram

After insertion of first 6 Blocks

After Insertion Block 7, 8 and 9

Example with N= 6, No. of Dirty Tiles = 18

After Split

Example with N= 6, No. of Dirty Tiles = 18

After Insertion Block 11

After Insertion Block 12

Example with N= 6, No. of Dirty Tiles =18

After Split

Example with N= 6, No. of Dirty Tiles = 18

After Insertion of first 6 Blocks

Example with N=6, No. of Dirty Tiles = 18

After Insertion Block 7, 8 and 9

Example with N= 6, No. of Dirty Tiles = 18

After Insertion Block 10

After Insertion Block 12

Example with N= 6

After insertion of Block 13 & 14

Example with N= 6, No. of Dirty Tiles = 18

Example with N= 6, No. of Dirty Tiles = 18

Related Art Method

Method according to embodiments

E= GPU Efficiency : 0.2 (i.e., Each optimal region can have max 20% unchanged region)

DDR Read : (83x2x2)x4* + N(E)xWXHx4*
         (83x2x2)x4* + 4(0.2)x14X14x4* = 1955 BYTES
DDR Write = DDR Read = 1955 BYTES/frame = ~2KB
Total : ~4KB/sec

*E : Efficiency param of algorithm

Rendering Performance : High ●

CPU Utilization : Low ●

3400

SYSTEM AND METHOD FOR RENDERING DIFFERENTIAL VIDEO ON GRAPHICAL DISPLAYS

CROSS-REFERENCE TO RELATED APPLICATION

This application is a bypass continuation of International Application No. PCT/KR2021/016231, filed on Nov. 9, 2021, which is based on and claims priority to India Patent Application No. 202111031488, filed on Jul. 13, 2021, in the Intellectual Property India, the disclosures of which are incorporated by reference herein in their entireties.

TECHNICAL FIELD

The disclosure relates to a system and method for rendering differential video on graphical displays. In particular, the disclosure relates to a differential video rendering system and a differential video rendering method to partially render differential video frames on a graphical display utilizing regional information.

BACKGROUND ART

In graphics image rendering process, images can be texture mapped to different geometry shapes, for example, cubic shape, rectangular shape, sphere shape, cylindrical shape, etc., using Graphics Application Programming Interface (API). These geometry shapes vary with User Interface (UI) scenarios and the use cases desired by the application. When the images are continuous video frames and texture mapped to any geometry shape, it is referred to as video texturing. Video texturing is a common technique to render YUV color-encoded image data to graphical windows. 360 videos incorporate similar methods to texture map captured 360 YUV frames to defined region of the sphere shape.

Videos are normally displayed on a dedicated Video plane for any system. It requires no separate color space conversion as input and output formats remains the same. However, there are certain UI and Graphics applications which are required to render YUV frames, for example video frames, on graphics plane which is RGB format.

Related art video texturing methods require rendering of the video frames on arbitrary shapes as per final UI needs. This video rendering technique involves large amount of video image or video data from a Central Processing Unit (CPU) memory to a Graphics Processing Unit (GPU) memory. This video rendering technique further requires each frame to be copied to the GPU memory before it can be displayed. As the video resolution increases, CPU-GPU bandwidth becomes more and more of a critical resource and any scarcity can lead to lowered system performance. Further, the increased memory access will also lead to higher power consumption by the devices.

Also, related art video texturing methods read the full video frame, decodes video data and renders full-frame using the GPU (Open GL ES library). According to a related art video texturing method, as shown in FIG. 1, entire decoded frames generated based on video decoding of the input data is read by the GPU and further passed through a graphics pipeline of the GPU. The decoded frames include changed pixels and unchanged pixels.

When the entire decoded frame including the changed pixels and unchanged pixels is passed through the graphics pipeline of the GPU, multiple GPU cycles are wasted in rendering unchanged pixels and lead to limited system resource availability. Further, there will be a need for a full-frame update, and hence high double-data rate (DDR) random-access memory (RAM) bandwidth and increased memory access may be needed by for the GPU and the CPU. This leads to degraded system performance and eventually results in audio glitches due to overall lower system performance. Due to high bandwidth utilization, several video texturing features could not be productized on low-end systems. Due to high bandwidth utilization, the low-end systems may have synchronization issues between audio and video playback.

Further, in order to solve the problem of high bandwidth utilization, a related art video texturing method discloses video Rendering using compressed textures. The decoded frames are compressed to generate decoded compressed frames and these decoded compressed frames are passed through the graphics pipeline of the GPU for being rendered on the graphic display. However, compression or decompression of the decoded frames can result in loss of pixel information which leads to low-quality pictures for higher resolutions. Further, it might also cause formats to support issues and can restrict applicability to normal video inputs.

DISCLOSURE

Technical Problem

Therefore, there is a need for a system and method that can reduce overall system bandwidth requirement and enhance rendering performance in order to render the decoded video frames on the graphics display by minimizing the GPU DDR accesses. In other words, there is a need of a system and method that can improve CPU-GPU DDR bandwidth by minimizing the increased memory access and rendering only those pixels of the decoded frames which are minimally required.

Technical Solution

This summary is provided to introduce a selection of concepts in a simplified format that are further described in the detailed description below. This summary is not intended to identify key or essential concepts, nor is it intended for determining the scope of the present disclosure.

Additional aspects will be set forth in part in the description which follows and, in part, will be apparent from the description, or may be learned by practice of the presented embodiments.

In accordance with an aspect of the disclosure, a differential video rendering system includes a graphics processing unit (GPU); a graphical display coupled to the GPU; a video decoder configured to decode a bitstream of encoded data into a plurality of sets of decoded blocks; at least one processor configured to: generate, based on a first set of the plurality of sets of decoded blocks, a first differential video frame comprising a plurality of sets of differential regions, normalize each set of the plurality of sets of differential regions to a fixed size block to provide a normalized plurality of sets of differential regions, map a respective set of the normalized plurality of sets of differential regions to align with a respective tile size region of a plurality of tile size regions conforming with the GPU, generate a hierarchal region tree based on the normalized plurality of sets of differential regions mapped to the plurality of tile size regions, and generate a plurality of optimal regions based on the hierarchal region tree satisfying a predefined criteria corresponding to a pre-defined optimal number of regions and a predefined efficiency parameter; and a graphics rendering engine configured to render the first differential video frame on the graphical display based on the plurality of optimal regions and a group of differential regions.

A respective optimal region of the plurality of optimal regions may include a set of tile size regions, and satisfies the predefined criteria.

The differential video rendering system as may further include a central processing unit (CPU) configured to: determine the pre-defined optimal number of regions based on experimental values associated with at least one of a clock speed of the GPU, a clock speed of the CPU, and a number of processing cores included in the GPU; and determine the predefined efficiency parameter based on system variable parameters corresponding to at least one of the clock speed of the GPU, a bandwidth of the GPU, a memory configuration coupled to the GPU, a width of a memory bus, and the number of the processing cores included in the GPU, wherein the predefined efficiency parameter corresponds to a processing capability of the GPU to process maximum differential regions with a minimum bandwidth.

The pre-defined optimal number of regions may correspond to a maximum number of optimal regions that can be passed to a rendering pipeline of the GPU without impacting an overall performance of the GPU.

The at least one processor may be further configured to determine a first number of tile size regions among the plurality of tile size regions that includes a minimum number of differential regions; execute a marking process to mark, as dirty tiles, the first number of tile size regions having the minimum number of differential regions; and generate a list of the dirty tiles based on the marking process.

The at least one processor may be further configured to: generate a blocklist including the plurality of tile size regions based on the list of the dirty tiles; select a root block from the blocklist, wherein the root block is a superset of all blocks in the blocklist; select, in a sequential order, a second number of tile size regions among the plurality of tile size regions in the blocklist; add the selected second number of tile size regions to the root block in the sequential order until a number of child regions of the root block exceeds the predefined criteria corresponding to the pre-defined optimal number of regions; and generate a first level of the hierarchal region tree based on the addition of the selected second number of tile size regions to the root block.

The at least one processor may be further configured to: select a third number of tile size regions among the plurality of tile size regions in the blocklist, wherein the third number of tile size regions neighbors the second number of tile size regions; add, in the sequential order, the selected third number of tile size regions to the first level of the hierarchal region tree; determine at least one child region of the root block at the first level exceeds at least one of the pre-defined optimal number of regions and the predefined efficiency parameter; and split, into a first plurality of sub child regions, the at least one child region which exceeds the at least one of the pre-defined optimal number of regions and the predefined efficiency parameter, such that each sub child region of the first plurality of sub child regions satisfies the predefined criteria.

The at least one processor may be further configured to generate a second level of the hierarchal region tree based on the split of the at least one child region into the first plurality of sub child regions, the second level of the hierarchal region tree may include the first plurality of sub child regions, and the second level may correspond to a level subsequent to the first level of the hierarchal region tree.

The hierarchal region tree may include a plurality of levels, the plurality of levels may include at least the first level, and the at least one processor may be further configured to: determine whether any of sub child regions at each of the plurality of levels exceeds at least one of the pre-defined optimal number of regions and the predefined efficiency parameter; and split, into a second plurality of sub child regions, the sub child regions which exceed the at least one of the pre-defined optimal number of regions and the predefined efficiency parameter, such that each of the sub child regions at a corresponding level of the plurality of levels satisfies the predefined criteria.

A bottom level of the hierarchal region tree may include leaf blocks, the at least one processor may be further configured to generate, based on the split of the at least one child region and at least one sub child region among any of the sub child regions, the plurality of optimal regions from the root block towards the leaf blocks, and the plurality of optimal regions may be generated from the root block towards the leaf blocks such that each optimal region of the plurality of optimal regions has an efficiency greater than or equal to the predefined efficiency parameter.

The at least one processor may be further configured to: arrange, in an order of the generation of the first level and the second level, the first level and the second level from a top of the root block towards leaf blocks; and generate the hierarchal region tree based on the arrangement.

The at least one processor may be further configured to generate a second differential video frame based on a second set of the plurality of sets of decoded blocks, the generation of the first differential video frame may occur before the generation of the second differential video frame, a first number of tile size regions among the plurality of tile size regions may correspond to reused tiles, a second number of tile size regions among the plurality of tile size regions may correspond to dirty tiles, the reused tiles may be fully composed of reused blocks, the reused blocks may correspond to blocks which have same pixel values in the first differential video frame and the second differential video frame, and the dirty tiles may include the reused blocks.

The at least one processor may be further configured to: generate a blocklist including the plurality of tile size regions based on a list of the reused tiles and the dirty tiles; select a root block from the blocklist, wherein the root block is a superset of all blocks in the blocklist; select, in a sequential order, a first set of the dirty tiles and the reused tiles; add the selected first set of the dirty tiles and the reused tiles to the root block in the sequential order until a number of child regions of the root block exceeds the pre-defined optimal number of regions, wherein each reused tile of the first set of the reused tiles is added to the root block as a separate child region; and generate a first level of the hierarchal region tree based on the addition of the selected first set of the dirty tiles and the reused tiles to the root block.

The at least one processor may be further configured to: select a second set of each of the dirty tiles and the reused tiles, wherein the second set of the dirty tiles neighbor the first set of the dirty tiles; add, in the sequential order, the selected second set of the dirty tiles and the reused tiles to the first level of the hierarchal region tree; determine at least one child region of the root block at the first level exceeds at least one of the pre-defined optimal number of regions and the predefined efficiency parameter; and split, into a first plurality of sub child regions, the at least one child region which exceeds the at least one of the pre-defined optimal number of regions and the predefined efficiency parameter, such that each sub child region of the first plurality of sub child regions satisfies the predefined criteria.

The at least one processor may be further configured to generate a second level of the hierarchal region tree based on the split of the at least one child region into the first plurality of sub child regions, the second level of the hierarchal region tree may include the first plurality of sub child regions, and the second level may correspond to a level subsequent to the first level of the hierarchal region tree.

The hierarchal region tree may include a plurality of levels, the plurality of levels may include at least the first level, and the at least one processor may be further configured to: determine whether any of sub child regions at each of the plurality of levels exceeds at least one of the predefined optimal number of regions and the predefined efficiency parameter; and split, into a second plurality of sub child regions, the sub child regions which exceed the at least one of the pre-defined optimal number of regions and the predefined efficiency parameter, such that each of the sub child regions at a corresponding level the plurality of levels satisfies the predefined criteria.

A bottom level of the hierarchal region tree may include leaf blocks, the at least one processor may be further configured to generate, based on the split of the at least one child region and at least one sub child region among any of the sub child regions, the plurality of optimal regions from the root block towards the leaf blocks, and the plurality of optimal regions may be generated from the root block towards the leaf blocks such that each optimal region of the plurality of optimal regions has an efficiency greater than or equal to the predefined efficiency parameter.

The at least one processor may be further configured to: arrange the first level and the second level in an order of generation from a top of the root block towards leaf blocks; and generate the hierarchal region tree based on the arrangement.

Each of the first differential video frame and the second differential video frame may correspond to one of a static video frame or a dynamic video frame.

The at least one processor may be further configured to map, based on a tile-based rendering process, the normalized plurality of sets of differential regions to align with the plurality of tile size regions.

DESCRIPTION OF DRAWINGS

These and other features, aspects, and advantages of certain embodiments of the present disclosure will be more apparent from the following detailed description taken in conjunction with the accompanying drawings, in which.

Figure 1:
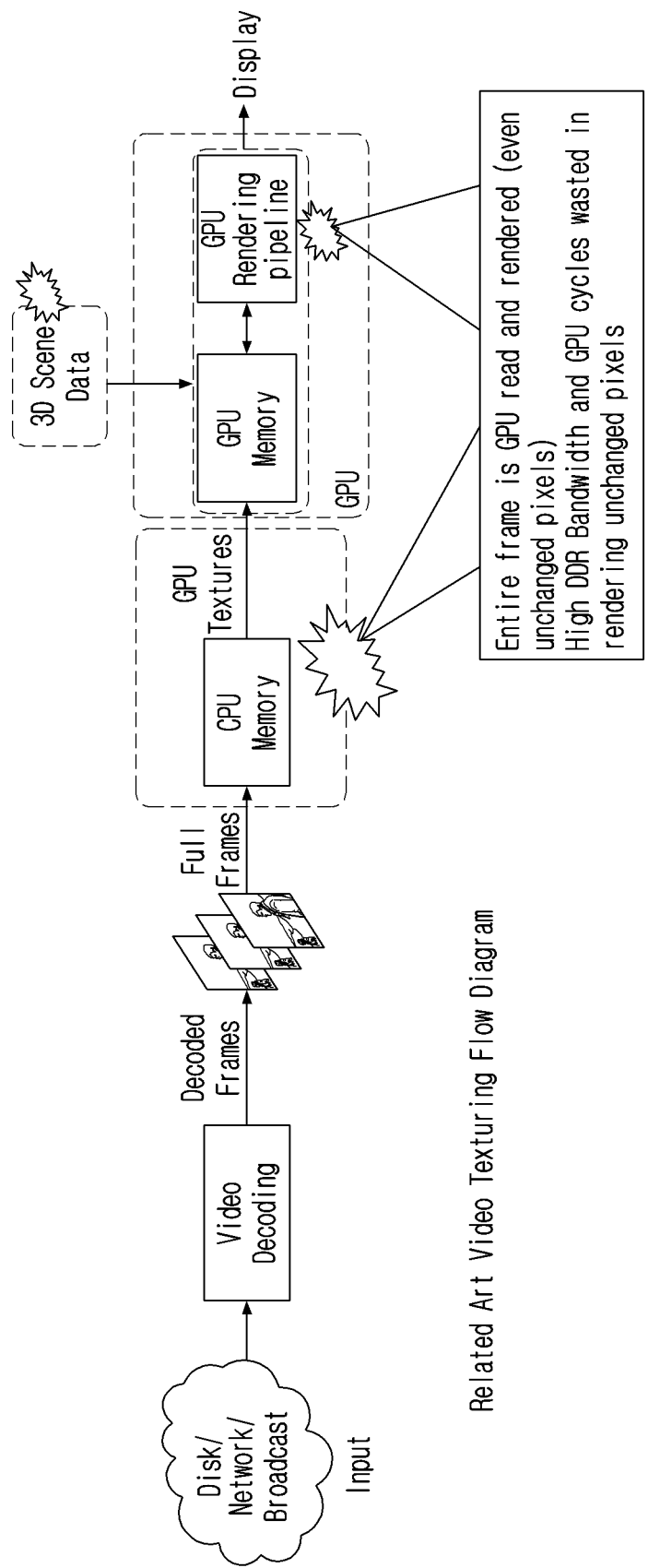
FIG. 1 illustrates problems in related art video texturing method.

Further, elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by related art symbols, and the drawings may show only those specific details that are pertinent to understanding embodiments of the present disclosure so as not to obscure the drawings with details that will be readily apparent to those of ordinary skill in the art having benefit of the description herein.

MODE OF DISCLOSURE

Although illustrative implementations of the embodiments of the present disclosure are illustrated below, embodiments may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated.

Whether or not a certain feature or element is used only once, either way it may still be referred to as "one or more features" or "one or more elements" or "at least one feature" or "at least one element." Furthermore, the use of the terms "one or more" or "at least one" feature or element do not preclude there being none of that feature or element, unless otherwise specified.

Unless otherwise defined, all terms, and especially any technical and/or scientific terms, used herein may be taken to have the same meaning as commonly understood by one having an ordinary skill in the art.

As is traditional in the field, embodiments may be described and illustrated in terms of blocks which carry out a described function or functions. These blocks, which may be referred to herein as units modules or the like, or by names such as driver, controller, device, engine, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Embodiments will be described below in detail with reference to the accompanying drawings.

Figure 2:
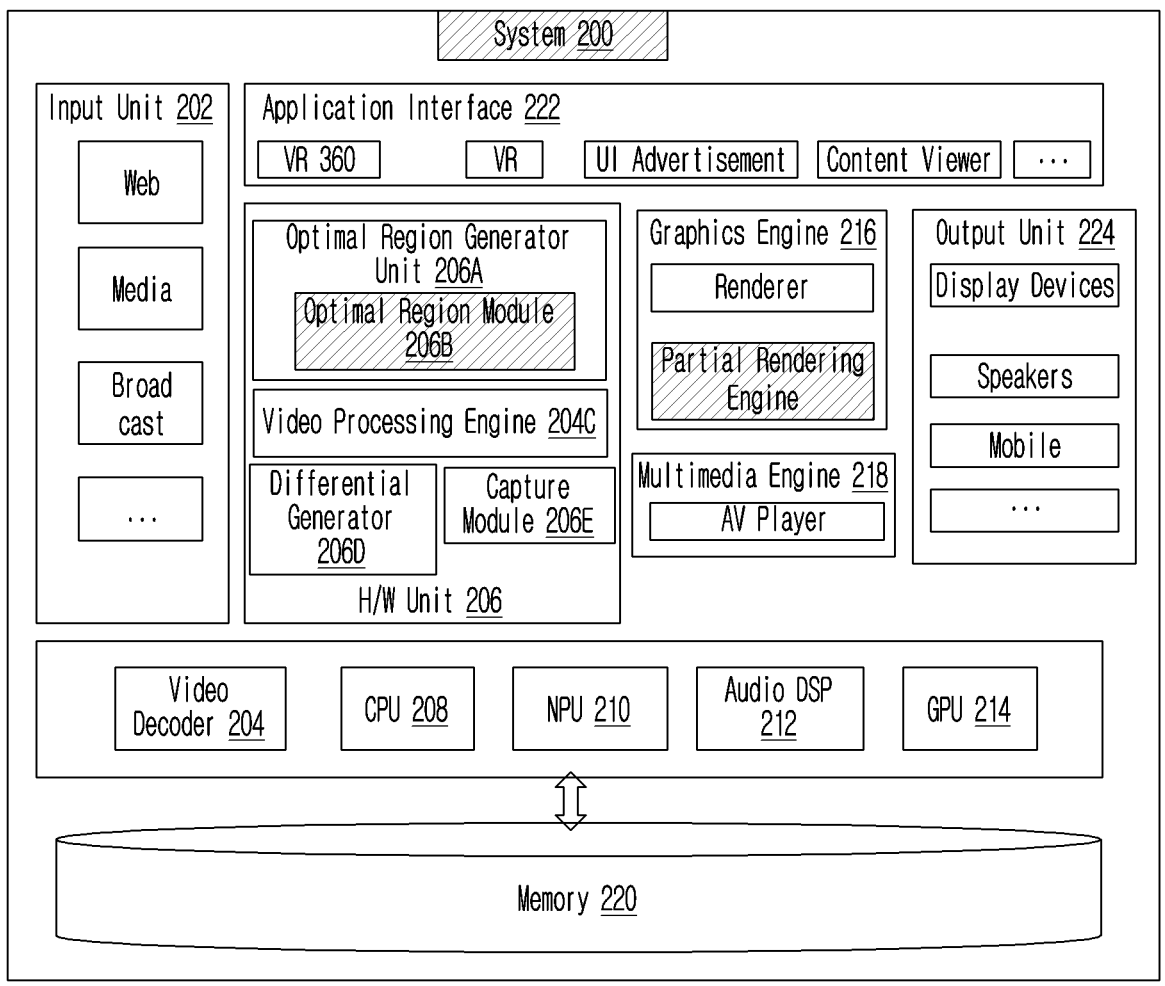
FIG. 2 illustrates a system architecture of a differential video rendering system, in accordance with an embodiment of the present disclosure.

FIG. 2 illustrates a system architecture of a differential video rendering system, in accordance with an embodiment of the present disclosure. FIG. 2, illustrates a system 200 to partially render differential video frames on a graphical display. The system 200 includes Input Unit 202, Video Decoder 204, a hardware Unit 206, a central processing unit (CPU) 208, a Neural Processing Unit (NPU) 210, an Audio digital signal processor (Audio DSP) 212, a Graphics Processing Unit (GPU) 214, a Graphics Engine 216, a Multimedia Engine 218, a Memory 220, an Application Interface 222, and an Output Unit 224. The aforementioned components are coupled with each other. Each of the Video Decoder 204, the CPU 208, the NPU 210, and the GPU 214 are communicatively coupled to the memory 220 in order to read instructions from the memory 120 or to write instructions into the memory 220. Here, the Graphics Engine 216 can also be referred as "a graphics rendering engine" without deviating from the scope of the present disclosure.

The Input Unit 202 receives a bitstream of encoded data and transfers the bitstream of received encoded data to the video decoder 204. The Input Unit 202 may include suitable logic, circuitry, and/or interfaces that may be configured to act as an input interface between a user and the system. The Input Unit 202 may also include various input devices, which may be configured to communicate with different operational components of the system 200. Examples of the input interface include, but are not limited to, for example, web applications, media applications, or broadcasting applications. The input interface may include interfaces different from those described above.

The video decoder 204 decodes the bitstream of the encoded data into a plurality of sets of decoded blocks and stores the plurality of sets of decoded blocks in the memory 220. The encoded data for example corresponds to video data received by the input unit 202.

The hardware Unit 206 includes an Optimal Region Generator Unit 206A including an Optimal Region Module 206B, Video Processing Engine 204C, Differential Generator 206D, and Capture Module 206E. The Differential Generator 206D generates differential video frames based on the plurality of sets of decoded blocks. Each of the generated differential video frames includes a plurality of sets of differential regions. Further, the Differential Generator 206D normalizes each of the plurality of sets of differential regions to a fixed size block. Here, the Optimal Region Generator Unit 206A can also be referred as "a region generator unit" and the Differential Generator 206D can also be referred as "a differential frame generator" without deviating from the scope of the present disclosure.

The Optimal Region Generator Unit 206A maps a respective set of the normalized plurality of sets of differential regions to align with a respective tile size region of a plurality of tile size regions conforming the GPU 214. In embodiments, the plurality of tile size regions conforming the GPU 214 may mean that the plurality of tile size regions conform with the GPU 214 or are compatible with the GPU 214. The Optimal Region Generator Unit 206A further generates a hierarchal region tree based on the normalized plurality of sets of differential regions mapped to the plurality of tile size regions. Furthermore, the Optimal Region Generator Unit 206A generates a plurality of optimal regions based on the hierarchal region tree satisfying a predefined criteria corresponding to a pre-defined optimal number of regions (N) and a predefined efficiency parameter (E) of the GPU 214. A respective optimal region of the plurality of optimal regions includes a set of tile size regions, and satisfies the predefined criteria corresponding to N and E. Description of N and E will be described further in detail in accordance with some examples of the embodiment.

The CPU 208 is hardware that controls overall operations and functions of the system 200. For example, the CPU 208 implements an operating system (OS), invokes a graphics application programming interface (API) for the GPU 214, and executes a driver of the GPU 214. Also, the CPU 208 may execute various other applications installed on the system 200, such as, for example, a video application, a game application, a web-browsing application, and among others.

The NPU 210 may be a microprocessor that specializes in acceleration of machine learning algorithms, for example by operating on predictive models such as artificial neural networks (ANNs) or random forests (RFs). However, the NPU 210 is not limited to the above described example. The NPU 210 can operate on any other models of artificial intelligence as desired.

The GPU 214 is a graphic-exclusive processor that performs a graphics pipeline. In one example, the GPU 214 may be implemented as a hardware that executes a 3-dimensional (3D) graphics pipeline in order to display 3D objects of a 3D image as a 2D image for display. For example, the GPU 214 may perform various functions, such as rendering of image data, shading, blending, illuminating, and generating pixel values of pixels to be displayed. In one example, the GPU 214 may perform a tile-based rendering process. In this context, the term "tile-based" means that each frame of a moving image is divided into a plurality of tiles, and rendering is performed on per tile basis. The tile-based rendering process only updates specific tiles at any point of time. Each of the tiles is just a fraction of entire framebuffer and can be stored on-chip RAM. Performing the tile-based rendering process results in reduction of bandwidth as framebuffer data that the GPU 214 needs for depth testing and for blending transparent fragments, and is therefore available for the GPU 214 without requiring any access to any external memory.

The Audio DSP 212 decodes encoded audio data received via the Input Unit 202 and delivers it to the Output Unit 224 (e.g., speaker, earphone).

The examples of the Output Unit 224 are not limited to the above described examples. The Output Unit 224 may include a graphical user interface (GUI), and/or interfaces that may be configured to act as an output interface between a user and the system 200. The GUI may refer to a graphics display provided on a display (e.g., screen) of an electronic device. The GUI may include at least one window, at least one icon, at least one scroll bar, and any other graphical items used for inputting commands to the device by a user. It should be understood that exemplary embodiments may include various types of GUIs in various shapes, designs, and configurations. Other examples of the Output Unit 224 may include graphics devices/display devices, Computer screens, alarm systems, Computer Aided Design/Computer Aided manufacturing (CAD/CAM) systems, video game stations, smart phone display screens, dashboard mounted display screens in automobiles, or any other type of data output device.

The Graphics Engine 216 includes a renderer and a partial rendering engine. The Graphics Engine 216 renders the differential video frames on the graphics display based on the optimal regions generated by the Optimal Region Generator Unit 206A and a group of differential regions among the differential video frames generated by the Differential Generator 106D.

The Multimedia Engine 218 includes multimedia player, for example Audio/Video (AV) Player. The example of the multimedia player is not limited to the above described example, the Multimedia Engine 218 can include media players other than the AV player. Further, the Multimedia Engine 218 provides interfaces for configuring and controlling multimedia applications installed on the system 100.

The memory 220 is a hardware that stores various types of data processed in the system 200. For example, the memory 220 may store data processed or data to be processed by the Video Decoder 204, the CPU 208, and the GPU 214. Also, the memory 220 may store application data and drivers to be executed by components of the system 200 (i.e. for example, CPU 208, NPU 210, GPU 214, and so on). The memory 220 may include a random access memory (RAM) such as dynamic random access memory (DRAM) or static random access memory (SRAM), read-only memory (ROM), electrically erasable programmable read-only memory (EEPROM), a CD-ROM, a Blu-ray or another optical disk storage device, a hard disk drive (HDD), a solid state drive (SSD), or a flash memory, and moreover, the memory 120 may include an external storage device accessible by the system 200. According to an embodiment of the present disclosure, the memory 220 may also include a Double Data Rate Synchronous Dynamic Random Access Memory (SDRAM), a Double Data Rate 2 SDRAM, a Double Data Rate 3 SDRAM or a Double Data Rate 4 SDRAM (Double Data Rate or Double Data Rate 2, 3, or 4 DDR Synchronous Random Access Memory, or DDR/DDR2/DDR3/DDR4 SDRAM).

The Application Interface 222 may be configured as a video graphics application interface for the user to playback media contents on the system 200. The application interface 222 may be configured to have a dynamic interface that may change in accordance with preferences set by the user and configuration of the system 200. In accordance with some example embodiment of the present disclosure, the application interface 222 may corresponds to a user interface of one or more applications installed on the system 200. For example, the application interface 222 may be an interface of Virtual Reality (VR) 360, an advertisement interface, or content viewer interface. The examples of the application interface 222 are not limited to the above described examples, the application interface 222 may be any interface of the one or more applications installed on the system 200.

Figure 3:
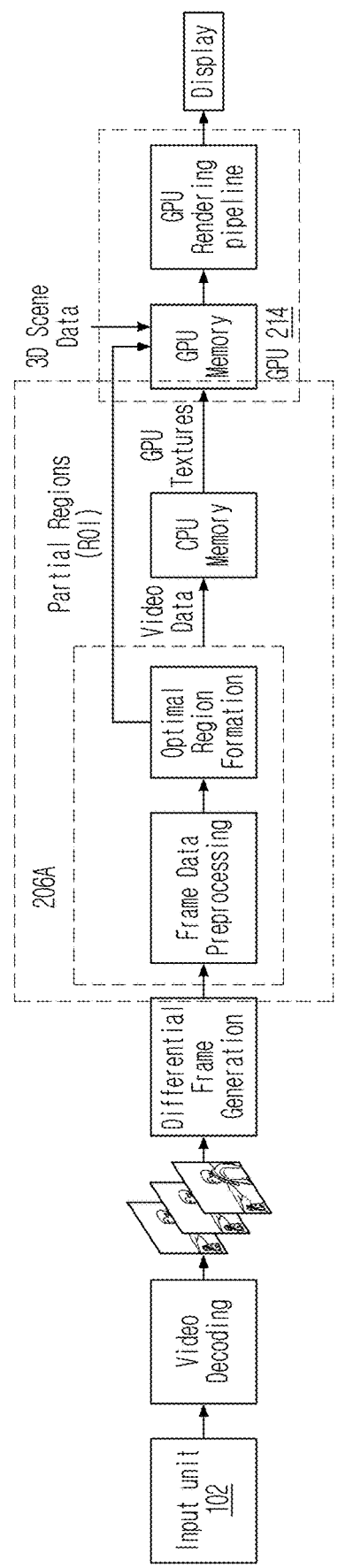
FIG. 3 illustrates an exemplary implementation of the differential video rendering system of FIG. 2, in accordance with an embodiment of the present disclosure.

Referring now to FIG. 3 of the Drawings, FIG. 3 illustrates an exemplary implementation of the differential video rendering system of FIG. 2, in accordance with an embodiment of the present disclosure. FIG. 3 will be described with reference to FIG. 2 and where similar reference numerals denote corresponding features were consistently used throughout the figures for the sake of brevity in the preferred embodiment. The exemplary implementation of the differential video rendering system according to FIG. 3 illustrates that the bitstream of encoded data received by the Input Unit 202 is decoded into the plurality of sets of decoded blocks. Subsequent to the decoding of the bitstream of encoded data, the differential video frames are generated by the Differential Generator 206D based on the plurality of sets of decoded blocks and are further normalized to the fixed size blocks. Further, subsequent to the normalization of the differential video frames to the fixed size blocks, the Optimal Region Generator Unit 206A performs a frame data preprocessing operation on the fixed size blocks.

The frame data preprocessing operation may include mapping of the respective set of the normalized plurality of sets of differential regions to align with the respective tile size region based on the tile-based rendering process.

Subsequent to the mapping of the respective set of the normalized plurality of sets of differential regions, the Optimal Region Generator Unit 206A performs an optimal region formation process which may include the generation of the hierarchal region tree based on the normalized plurality of sets of differential regions mapped to the tile size regions, and the generation of the optimal regions based on the hierarchal region tree. Each of the optimal regions includes a set of tile size regions that satisfies the predefined criteria corresponding to N and E. The optimal regions correspond to partial regions that are region of interest in the video data.

The generated optimal regions are transferred to a memory of the GPU 214. Further, the optimal regions are combined with the group of differential regions of the differential frames by the Graphics Engine 216. Further, subsequent to the combination of the optimal regions with the group of differential regions, the differential video frames are rendered on the graphical display including a 3D scene data using the combination by the Graphics Engine 216.

In accordance with an embodiment of the present disclosure, the above described frame data preprocessing operation and the optimal region formation process results in optimal rectangular regions which are minimally required to render next differential video frame on the graphics display completely using the GPU 214. This optimizes a bandwidth of the GPU 214 by restricting memory accesses only to updated regions and partially rendering the differential video frames to the graphics display by avoiding unchanged pixels corresponding to the previous differential video frame. Therefore, the differential video rendering system of the present disclosure can result in the reduction of overall system bandwidth requirement and enhances the rendering performance of the GPU 214 by minimizing the GPU DDR accesses.

Figure 4:
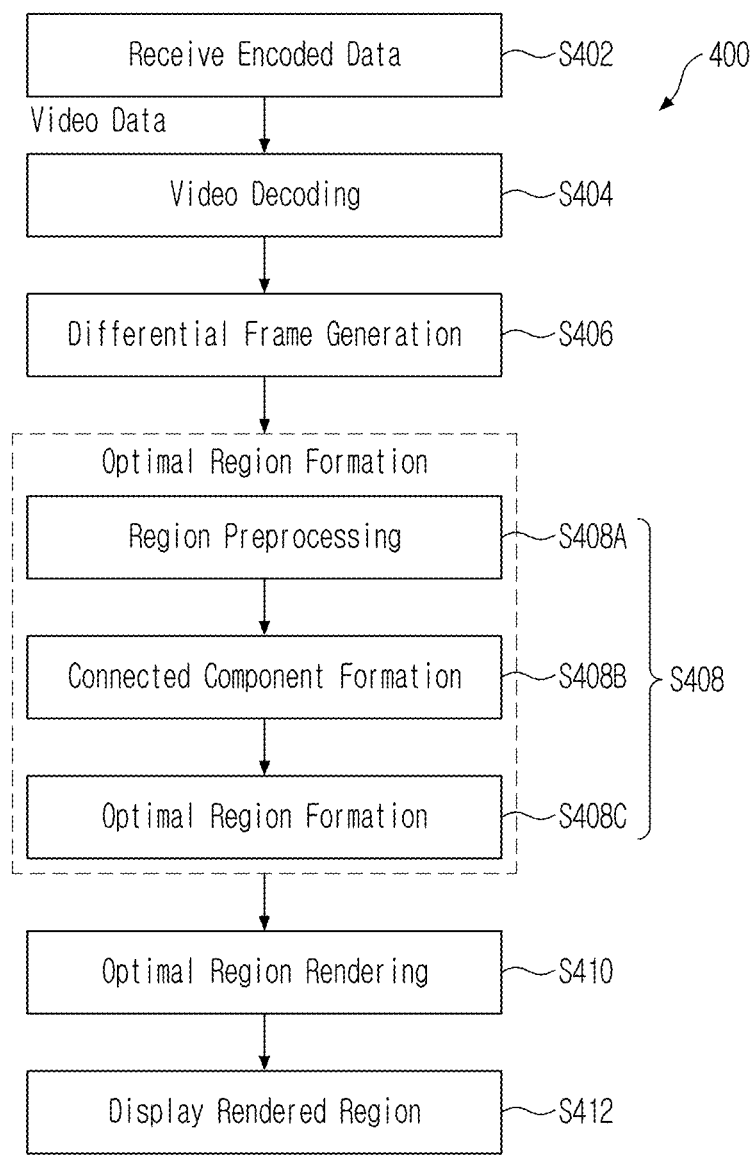
FIG. 4 illustrates method-steps of the differential video rendering method, in accordance with an embodiment of the present disclosure.

FIG. 4 illustrates method-steps of the differential video rendering method, in accordance with an embodiment of the present disclosure. In an implementation as depicted in FIG. 4, the present subject matter refers to a differential video rendering method 400 in the system 200. FIG. 4 will be described with reference to FIG. 2 and where similar reference numerals denote corresponding features were consistently used throughout the figures for the sake of brevity in the preferred embodiment.

The differential video rendering method 400 may include receiving, at block S402, the bitstream of the encoded data by the input unit 202. As an example, the input unit 202 receives encoded video data via the input interface. The flow of the differential video rendering method 400 now proceeds to block S404.

At the block S404, subsequent to the reception of the encoded video data, the differential video rendering method 400 may include decoding the encoded video data into the plurality of sets of decoded blocks. As an example, the video decoder 204 decodes the encoded video data into the plurality of sets of decoded blocks. The flow of the differential video rendering method 400 now proceeds to block S406.

Figure 5:
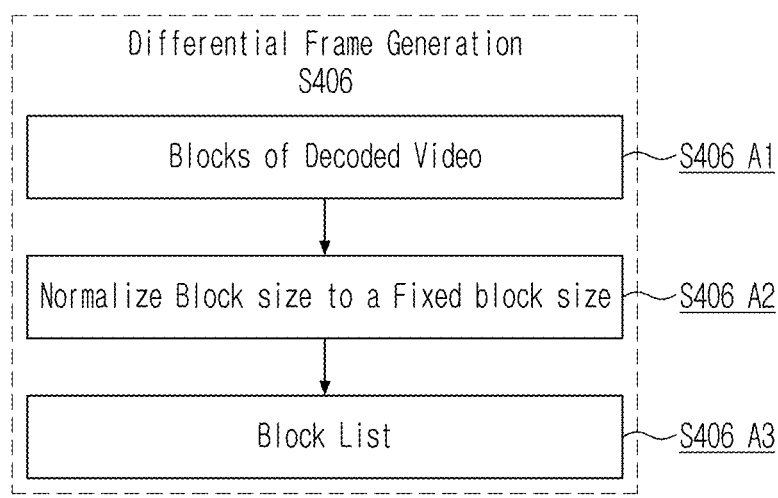
FIG. 5 illustrates a detailed flowchart of differential frame generation process of FIG. 4, in accordance with an embodiment of the present disclosure.

At the block S406, subsequent to the decoding of the encoded video data, the differential video rendering method 400 may include generating a differential video frame including a plurality of sets of differential regions based on a first set of the plurality of sets of decoded blocks. As an example, the Differential Generator 206D generates differential video frames based on the plurality of sets of decoded blocks. Now, further processing steps of the differential video rendering method 400 at the block S406 will be described in detail in accordance with FIG. 5 of the Drawings. FIG. 5 illustrates a detailed flow chart of the process performed by the Differential Generator 206D. Subsequent to the generation of the plurality of sets of decoded blocks at block S406 A1, the differential video rendering method 400 may include at block S406 A2 normalizing the plurality of sets of decoded blocks to the fixed-size blocks. As an example, the Differential Generator 206D normalizes the plurality of sets of decoded blocks to the fixed-size blocks. As a result, the differential video rendering method 400 at block S406 A3 may include generating a blocklist of the fixed size blocks.

Figure 6:
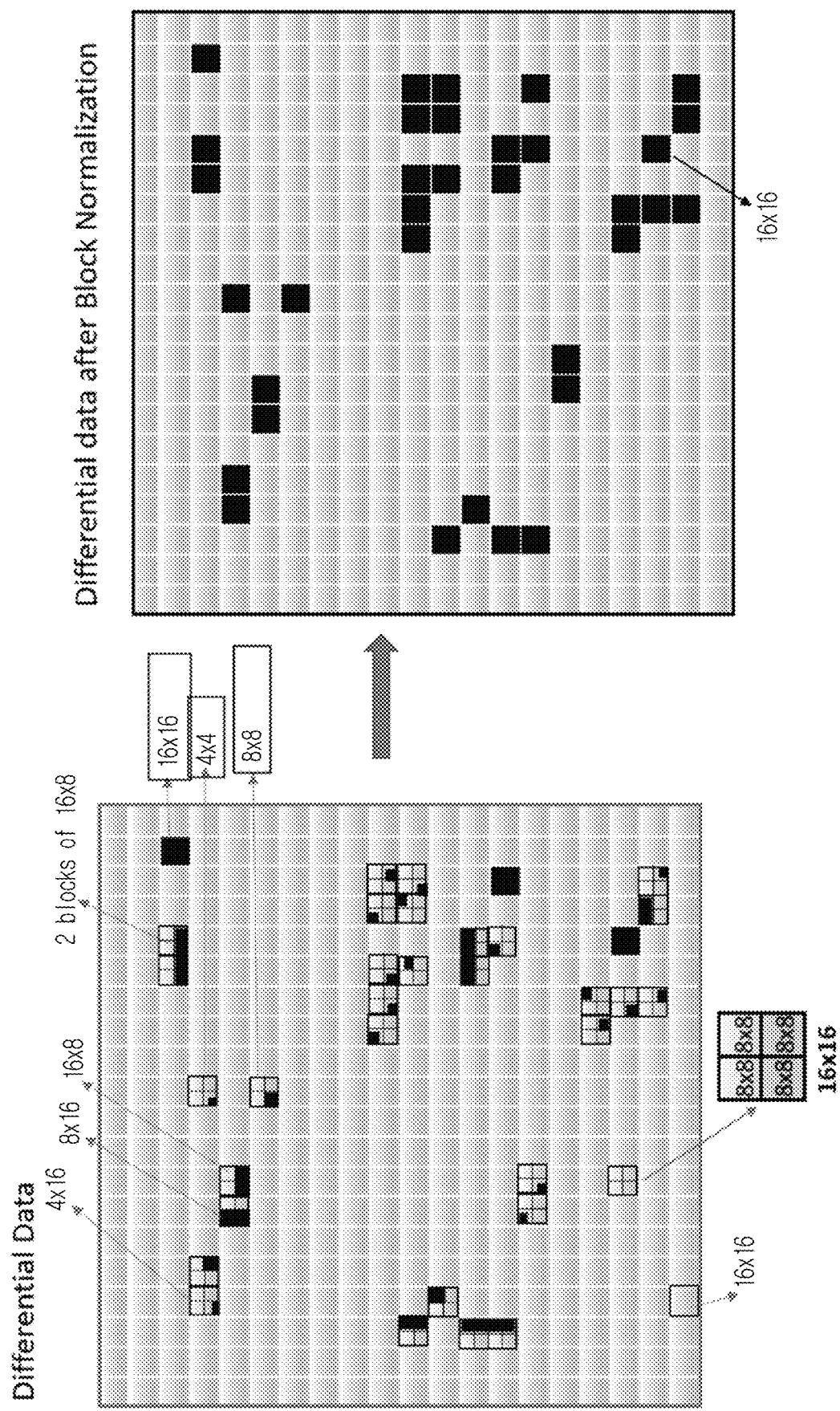
FIG. 6 illustrates an example of differential frame generation process of FIG. 4, in accordance with an embodiment of the present disclosure.

The process performed by the Differential Generator 206D at the block S406 will be described in accordance with FIG. 6 of the Drawings. FIG. 6 illustrates an example of the differential frame generation process of FIG. 4, in accordance with an embodiment of the present disclosure.

The Differential Generator 206D uses motion vector information of blocks within the differential video frames to identify macro blocks of skipped type. Such blocks could be of varying sizes, for example as shown at left-hand side of FIG. 6, a differential video frame may include, for example, blocks of different sizes i.e., 4×4, 4×8, 8×4, 4×16, 8×8, 8×16, 16×8, 16×16. Hereinafter, each of the differential video frames includes a set of the blocks of different sizes. Hereinafter, the blocks of different sizes i.e., 4×4, 4×8, 8×4, 4×16, 8×8, 8×16, 16×8, 16×16 can be referred as "a plurality of sets of differential regions". As an example, a first set (i.e., for example, blocks 4×4, 4×8, 4×16, 8×8) of the plurality of sets of differential regions is different from a second set of the plurality of sets of differential regions (i.e., for example, blocks 4×16, 8×8, 8×16, 16×8, 16×16). The aforementioned examples of the blocks of different sizes are not limited to the size configuration as mentioned above, the block sizes may be different from the size configuration as described above.

The Differential Generator 206D predicts frame from the blocks of different sizes and motion vectors of a previous differential video frame. The motion vectors might refer to multiple previous video frames depending on encoding format of the encoded data. The Differential Generator 206D translates the motion vectors to spatial information (x, y, w, h) corresponding to only one previous frame in a display order.

The Differential Generator 206D further normalizes the plurality of sets of differential regions to fixed size blocks. For example, as shown at right hand side of FIG. 6, the blocks of different sizes i.e., 4×4, 4×8, 8×4, 4×16, 8×8, 8×16, 16×8, 16×16 are normalized to a fixed size block of 16×16. The blocks of different sizes may also be normalized to a fixed size block of 32×32 or any other size, in accordance with an example embodiment of the present disclosure. Specifically, the Differential Generator 206D organizes the plurality of sets of differential regions in an easily manageable format.

Now, referring again to FIG. 4, subsequent to the normalization of the plurality of sets of decoded blocks, the flow of the differential video rendering method 400 now proceeds to block S408. Block S408 may include a plurality of method steps S408 A, S408 B, and 5408C. The series of Steps of block S408 will be explained in detail with reference to the FIGS. 7 through 19. At block S408 A, the differential video rendering method 400 may include region preprocessing operation of the normalized plurality of sets of differential regions, which may be referred to as a frame data preprocessing operation, by the Optimal Region Generator Unit 206A.

Figure 7:
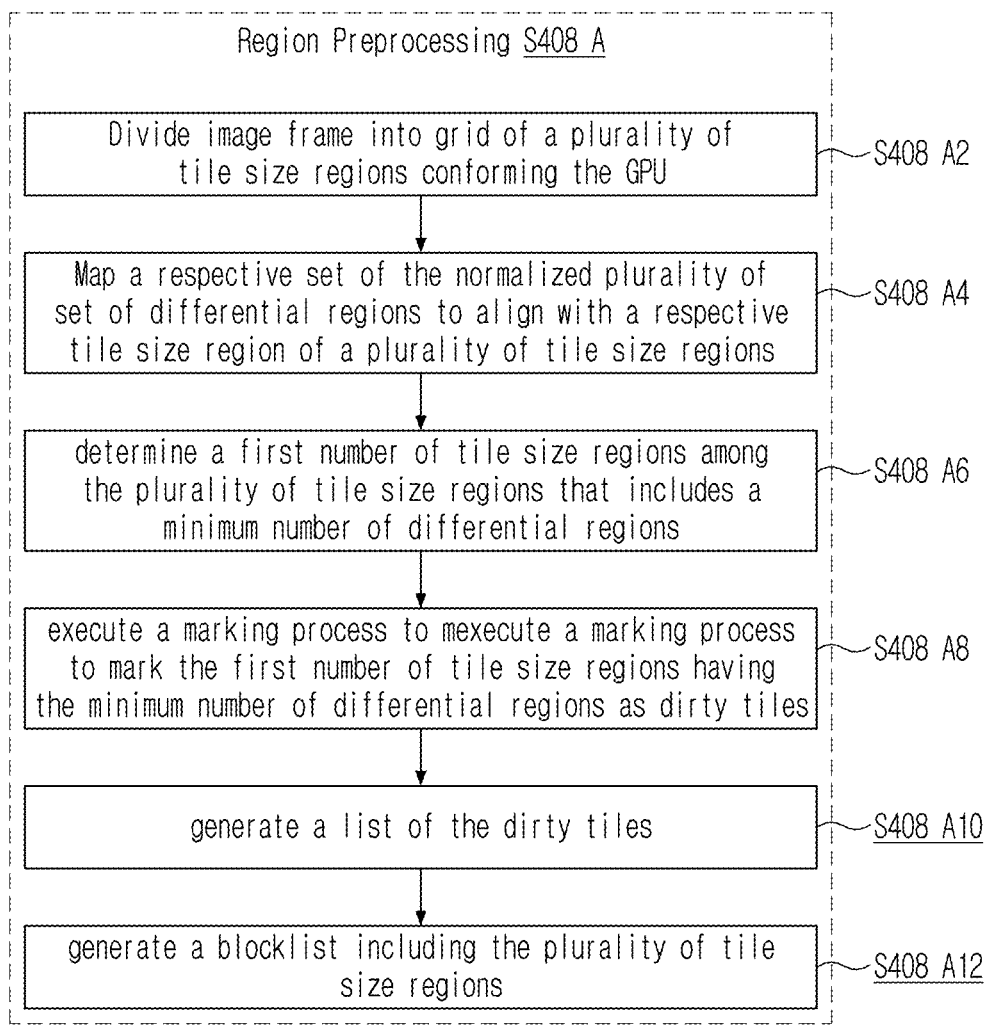
FIG. 7 illustrates method-steps of a region preprocessing operation of the differential video rendering method, in accordance with an embodiment of the present disclosure.

Referring now to FIG. 7 illustrates method-steps of the region preprocessing operation of the differential video rendering method 400 of FIG. 4, in accordance with an embodiment of the present disclosure. The region preprocessing operation at the block S408 A, may include a series of method-steps S408 A2 through S408 A12. At block S408 A2 the differential video rendering method 400 may include dividing the differential video frame (hereinafter referred to "a first differential video frame") into a grid of a plurality of tile size regions conforming with the GPU 214. After dividing the first differential video frame, the flow region preprocessing operation now proceeds to block S408 A4.

At the block S408 A4, the differential video rendering method 400 further may include mapping a respective set of the normalized plurality of sets of differential regions to align with a respective tile size region of a plurality of tile size regions conforming with the GPU 214. After mapping of the respective set of the normalized plurality of sets of differential regions, the flow region preprocessing operation now proceeds to block S408 A6.

At the block S408 A6, the differential video rendering method 400 further may include determining a first number of tile size regions among the plurality of tile size regions that includes a minimum number of differential regions.

After determining the first number of tile size regions the flow now proceeds to block S408 A8. At the block S408 A8, the differential video rendering method 400 further may include executing a marking process to mark the first number of tile size regions having the minimum number of differential regions as dirty tiles.

After execution of the marking process, the flow now proceeds to block S408 A10. At the block S408 A10, the differential video rendering method 400 further may include generating a list of the dirty tiles based on the execution of the marking process. After the generation of the list of the dirty tiles the flow now proceeds to block S408 A12.

At the block S408 A12, the differential video rendering method 400 further may include generating a blocklist including the plurality of tile size regions based on the list of the dirty tiles. As an example, the aforementioned region preprocessing operation at the block S408 A of the differential video rendering method 400 will be described with reference to FIGS. 8, and 9A, and 9B of the drawings.

Figure 8:
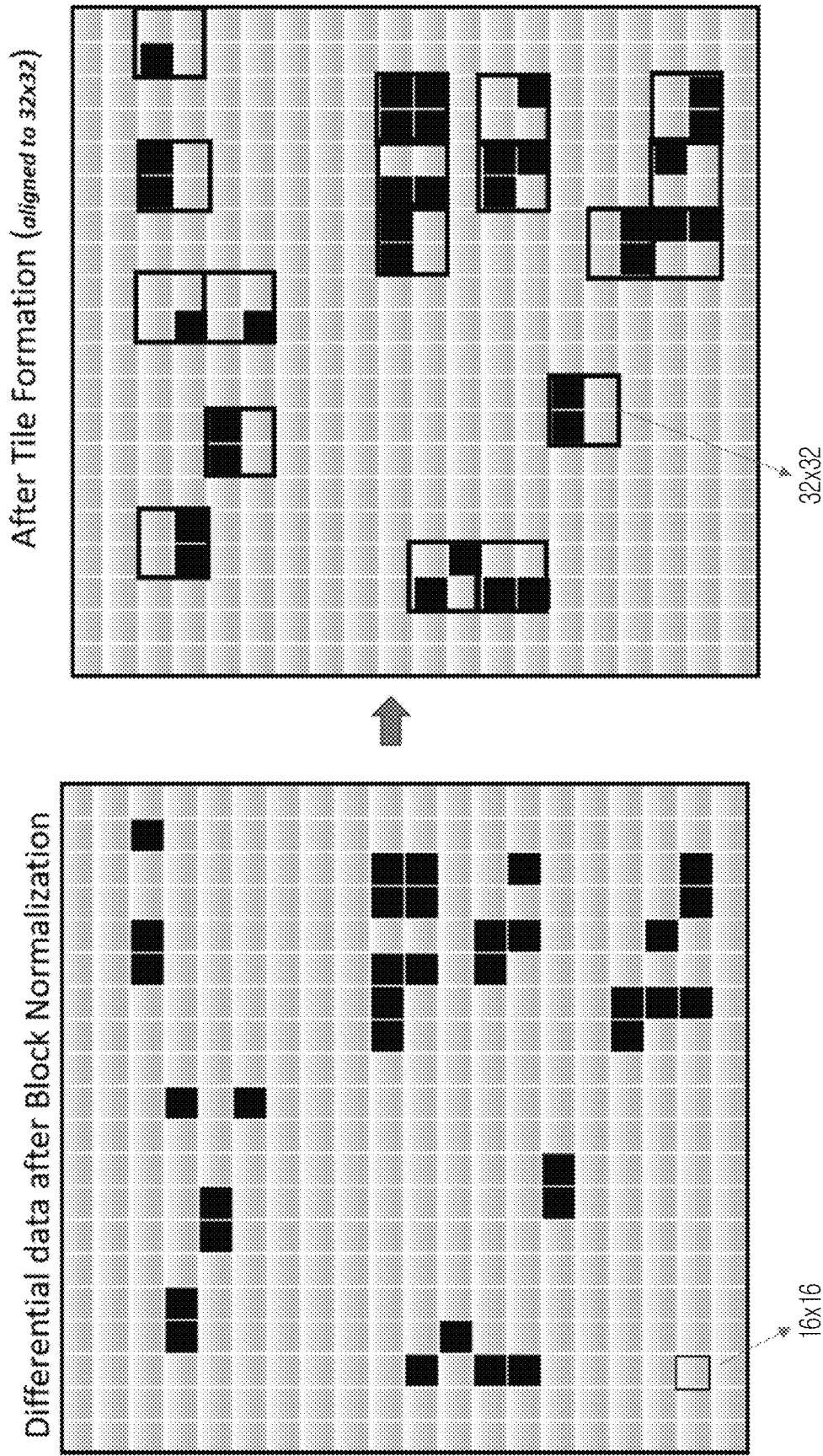
FIG. 8 illustrate an example of the region preprocessing operation of the differential video rendering method, in accordance with an embodiment of the present disclosure.

FIG. 8 illustrates an example of the region preprocessing operation of the differential video rendering method 400, in accordance with an embodiment of the present disclosure. In FIG. 8 it is shown that the first differential video frame is divided into the grid of a plurality of tile size regions conforming with the GPU 214. As an example, the Optimal Region Generator Unit 206A divides the first differential video frame into the grid of the tile size regions of 32×32. Further, in FIG. 8 it is shown normalized fixed size blocks of 16×16. Furthermore, according to FIG. 8, the Optimal Region Generator Unit 206A maps the respective normalized fixed size blocks to align with the respective tile size regions of 32×32 conforming with the GPU 214. Here, the normalized fixed size blocks of 16×16 refers to "the normalized plurality of sets of differential regions" and the tile size regions of 32×32 refers to "the plurality of tile size regions conforming with the GPU 214".

Figure 9A:
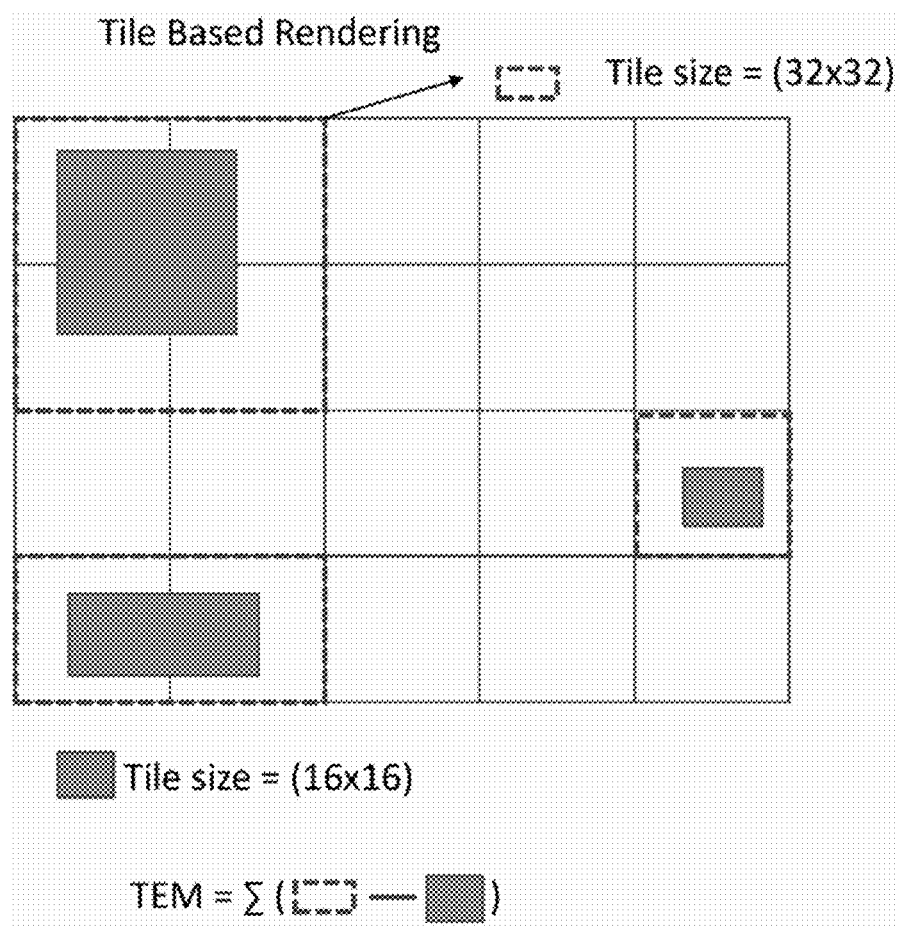
FIGS. 9A-9B illustrate an example of a tile-based rendering process and dirty tile marking process corresponding to the region preprocessing operation of the differential video rendering method, in accordance with an embodiment of the present disclosure.
Figure 9B:
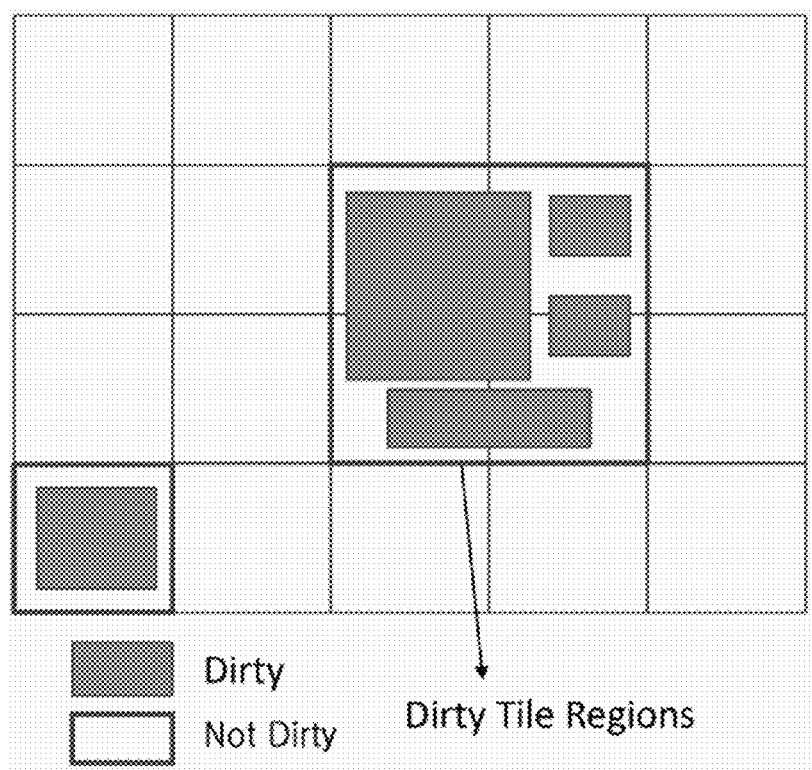

FIGS. 9A-9B illustrate an example of a tile-based rendering process and dirty tile marking process, in accordance with an embodiment of the present disclosure. In FIG. 9A, it is shown that normalized fixed size blocks of 16×16 are mapped on to the tile size regions of 32×32 on per tile basis by the Optimal Region Generator Unit 206A. Further, in FIG. 9B it is shown that tile size regions of 32×32 having a minimum number of normalized fixed size blocks of 16×16 are marked as dirty tiles. For example, the Optimal Region Generator Unit 206A marks tile size regions of 32×32 having at least one normalized fixed size block of 16×16 as a dirty tile. The exemplary process illustrated in FIGS. 8, 9A, and 9B correspond to the method steps of blocks S408 A2 through S408 A12.

Figure 10A:
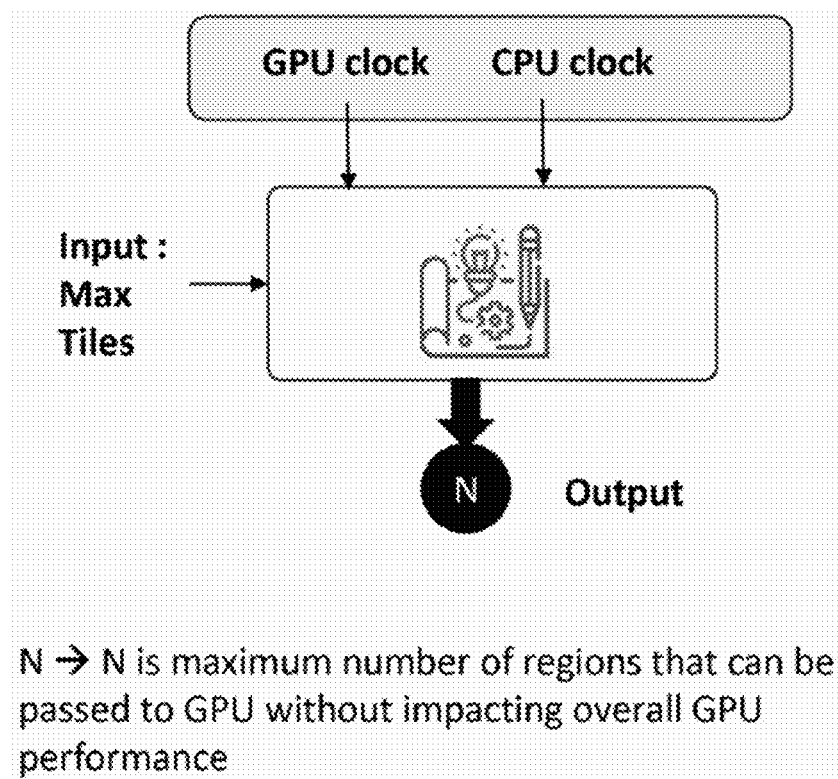
FIGS. 10A-10B illustrate a determination example of a pre-defined optimal number of regions (N) and a predefined efficiency parameter (E) corresponding to a GPU of the differential video rendering system, in accordance with an embodiment of the present disclosure.
Figure 10B:
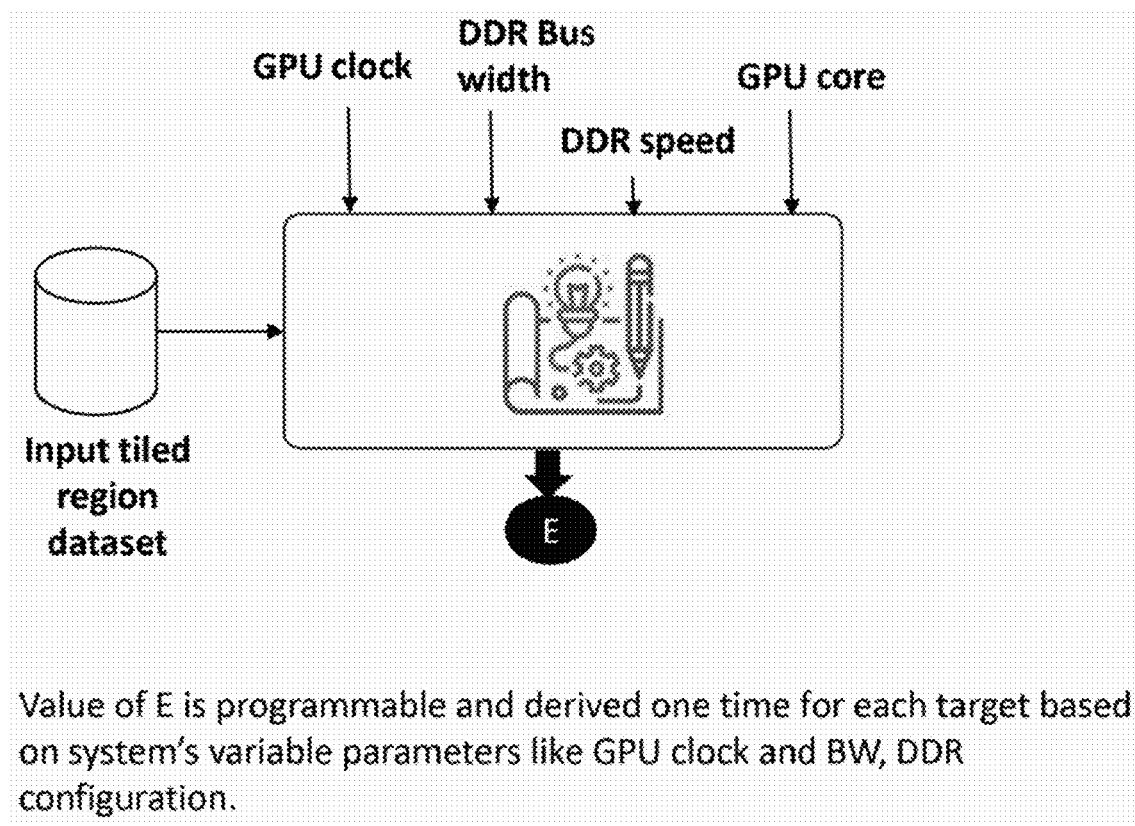

FIGS. 10A-10B illustrate a determination example of a pre-defined optimal number of regions (N) and a predefined efficiency parameter (E) corresponding to the GPU 214 of the system 400, in accordance with an embodiment of the present disclosure. Here, N corresponds to a maximum number of optimal regions that can be passed to a rendering pipeline of the GPU 214 without impacting an overall performance of the GPU 214 and E corresponds to a processing capability of the GPU 214 to process maximum differential regions with a minimum bandwidth.

According to an embodiment of the present disclosure, the CPU 208 determines N based on experimental values associated with at least one of a clock speed of the GPU 214, a clock speed of the CPU 208, and a number of processing cores included in the GPU 214. Further, the CPU 208 determines E based on system variable parameters corresponding to at least one of the clock speed of the GPU 214, a bandwidth of the GPU 214, a memory configuration coupled to the GPU 214, a width of a memory bus, and the number of processing cores included in the GPU 214.

According to an embodiment of the present disclosure, the CPU 208 determines N by the iterative method defined below:
For each varying factor (GPU clock, core)
1. For n (Max N→1)
  i. CHECK FPS
  ii. IF FPS==PREV_FPS
    1. N=1
    2. PREY FPS=FPS
    3. continue
  iii. BREAK
2. RETURN n;
where,
Max N—screen size or tile size
FPS—frame per second
PREV_FPS—Previous Frame Rate According to an embodiment of the present disclosure, the CPU 208 determines E by the iterative method defined below:
For varying factor (GPU clock, core, DDR speed, and width)
1. For E (0.0→0.5)//step size=0.05
  i. For Input Region Set (1→n)
  ii. Execute pipeline and measure BW
  iii. Prepare chart for each E
2. SELECT E from chart with minimum bandwidth for maximum differential regions.

The CPU 208 selects a value of E with minimum bandwidth for the maximum differential regions and E represents the processing capability of the GPU 214 to process the maximum differential regions with the minimum bandwidth.

Now, referring again to FIG. 4, subsequent to the region preprocessing operation at the block S408 A, the flow of the differential video rendering method 400 now proceeds to block S408 B. The block S408 B describes a connected component formation process to generate a hierarchal region tree. The differential video rendering method 400 at the block S408 B, further may include generating the hierarchal region tree based on the normalized plurality of sets of differential regions mapped to the plurality of tile size regions. The Optimal Region Generator Unit 206A generates the hierarchal region tree by the connected component formation process S408 B. The connected component formation process S408 B is performed in a series of steps that will be described with reference to FIGS. 11 through 17B. Hereinafter the explanation will be made for the component formation process S408 B in case of a static video differential frame using FIGS. 11 through 17B.

Figure 11:
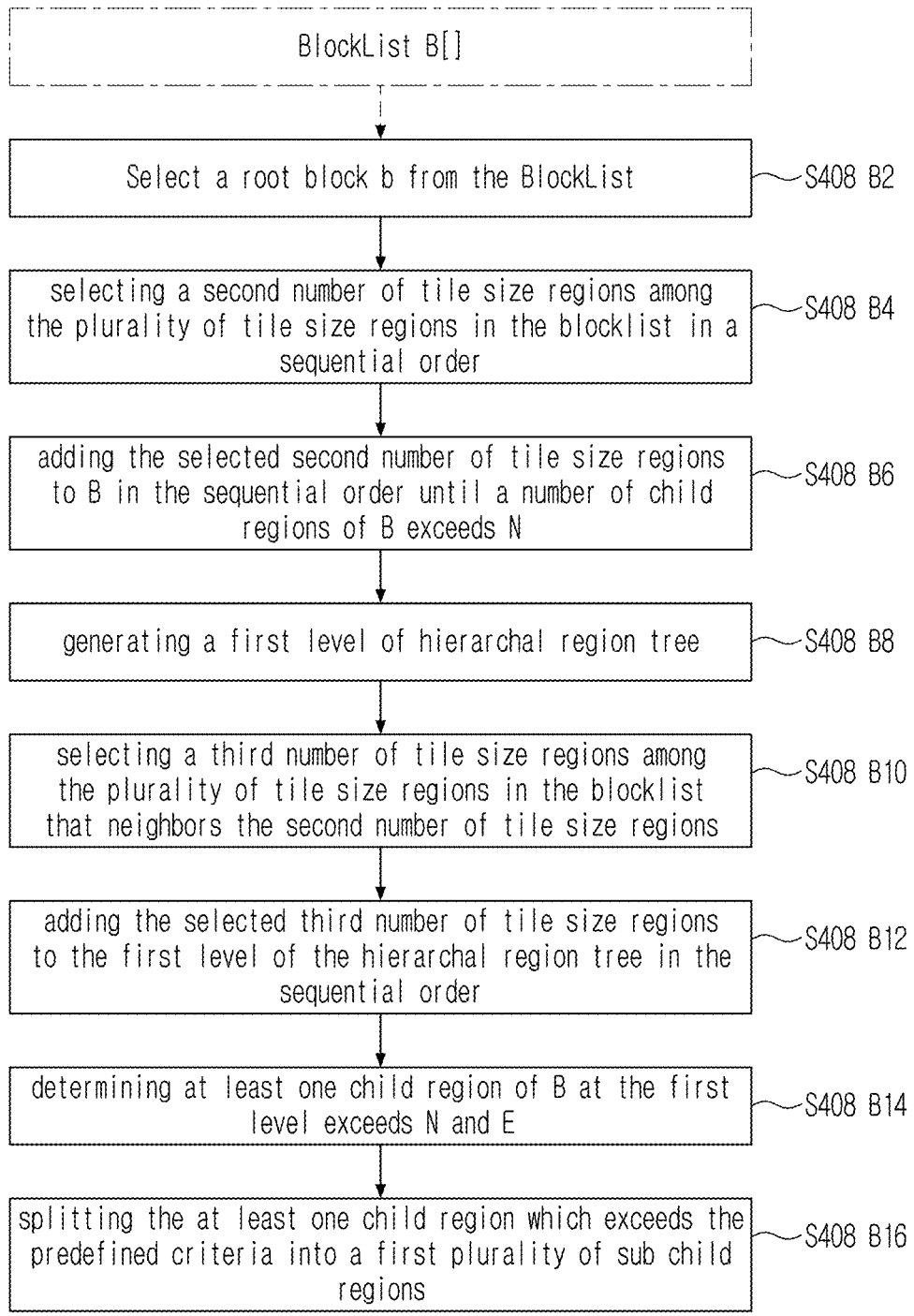
FIG. 11 illustrates a first part of connected component formation process of the differential video rendering method of FIG. 4, in accordance with an embodiment of the present disclosure.

FIG. 11 illustrates the connected component formation process at the block S408 B of differential video rendering method 400 of FIG. 4. The connected component formation process S208 B may include a series of method-steps S408 B2 through S408 B26. The connected component formation process S408 B starts with the blocklist generated by the Optimal Region Generator Unit 206A at the block S408 A12 of FIG. 7.

The connected component formation process S408 B at block S408 B2, may include selecting select a root block (b) from the blocklist, where the root block is a superset of all blocks in the blocklist. The flow of the connected component formation process S408 B proceeds now to block S408 B4.

After selecting the root block, the connected component formation process S408 B at the block may include selecting a second number of tile size regions among the plurality of tile size regions in the blocklist in a sequential order. The flow of the connected component formation process S408 B proceeds now to block S408 B6. Hereinafter, numbers of the tile size regions refers to the "dirty tile regions".

At the block S408 B6, the connected component formation process S408 B further may include adding the selected second number of tile size regions to the root block in the sequential order until a number of child regions of the root block exceeds the predefined criteria corresponding to N.

In other words, initially the root block is empty. Further, a tile size region is selected one after other and added to the root block. Newly added tile size regions become the direct child of root block until the number of tile size region exceeds a value of N specified in the iterative method 1 as described above.

Figure 12A:
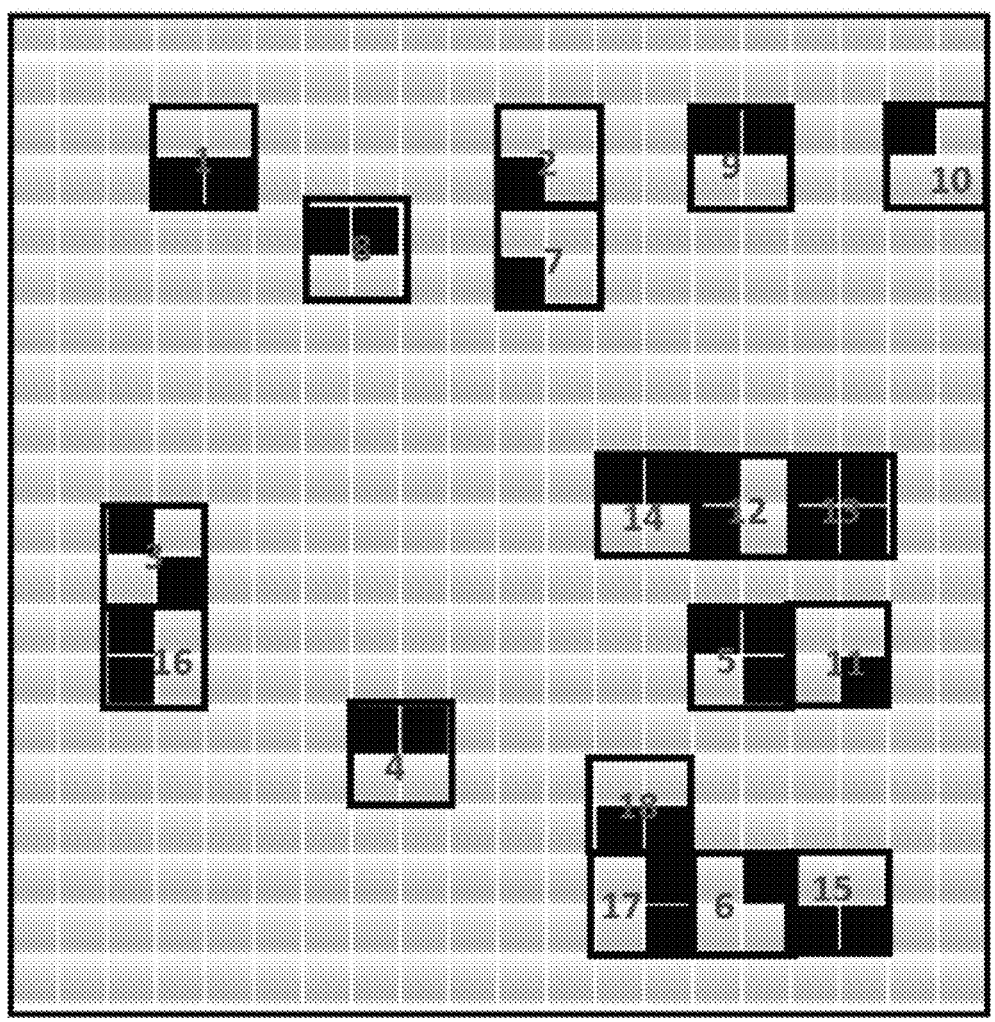
FIG. 12A illustrates an example of generating a hierarchal region tree, in accordance with an embodiment of the present disclosure.
Figure 12B:
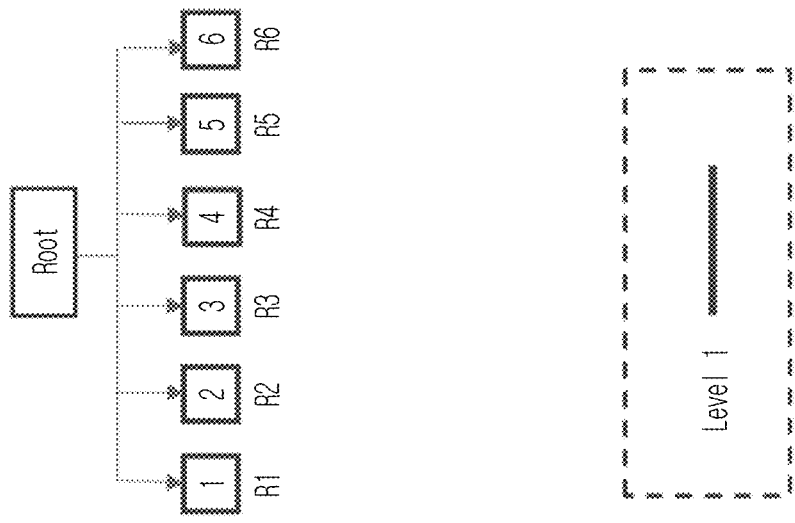
FIG. 12B illustrates an example of generating a hierarchal region tree, in accordance with an embodiment of the present disclosure.

Now the connected component formation process S408 B at the blocks S408 B2, S408 B4, S408 B6, and S408 B8 will be explained with reference to FIGS. 12Ad 12B of the drawings. FIGS. 12A-12B illustrates an example of generating a first level of the hierarchal region tree, in accordance with an embodiment of the present disclosure. For example, the value of N is considered 6 for explaining the generation of the hierarchal region tree. As shown at left-hand side of FIGS. 12A-12B, 18 dirty tiles are present in the differential video frame, and the Value of N=6. The Optimal Region Generator Unit 206A initially selects the root block from the generated blocklist and further selects a second number of tile size regions among the plurality of tile size regions in the blocklist in a sequential order. As an example, tile size regions 1 to 6 were selected as the second number of tile size regions among the tile size regions 1 to 18 by the Optimal Region Generator Unit 206A. Further, the Optimal Region Generator Unit 206A adds the selected tile size regions 1 to 6 to the root block in the sequential order until the number of child regions, i.e., R1 to R6 of the root block exceeds the predefined value of N=6. Here, the value of N used an example, it is not limited to the aforementioned example. The value of N depends on a type and processing capacity of the GPU 214 and can be calculated based on the iterative method 1 as described above.

After the addition of the selected tile size regions 1 to 6 to the root block, the connected component formation process S408 B at block S408 B8, may include generating the first level of the hierarchal region tree based on the addition of the selected second number of tile size regions to the root block. As an example, the Optimal Region Generator Unit 206A generates Level 1 including child regions R1 to R6 of the root block, as shown in FIGS. 12A-12B.

After generation of the first level of the hierarchal region tree, the connected component formation process S408 B at block 408 B10, may include selecting a third number of tile size regions among the plurality of tile size regions in the blocklist that neighbors the second number of tile size regions. The flow now proceeds to block 408 B12.

At the block 408 B12, the connected component formation process S408 B may include adding the selected third number of tile size regions to the first level of the hierarchal region tree in the sequential order. The flow now proceeds to block 408 B14.

At the block 408 B14, the connected component formation process S408 B may include determining at least one child region of the root block at the first level exceeds the predefined criteria corresponding to at least one of N and E. The flow now proceeds to block 408 B16.

At the block 408 B16, the connected component formation process S408 B may include splitting the at least one child region which exceeds the predefined criteria into a first plurality of sub child regions such that each sub child region of the first plurality of sub child regions satisfies the predefined criteria corresponding to N and E.

Figure 13:
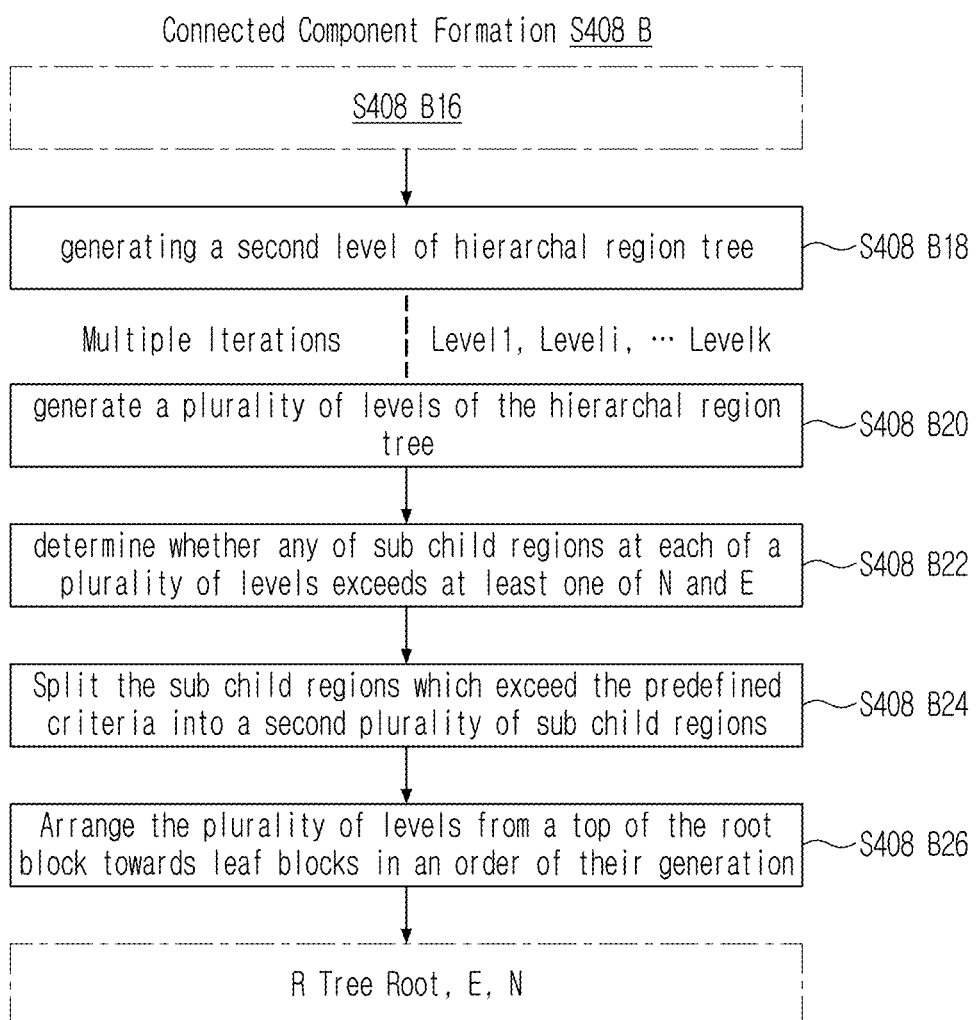
FIG. 13 illustrates a second part of the connected component formation process of FIG. 11, in accordance with an embodiment of the present disclosure.
Figure 14A:
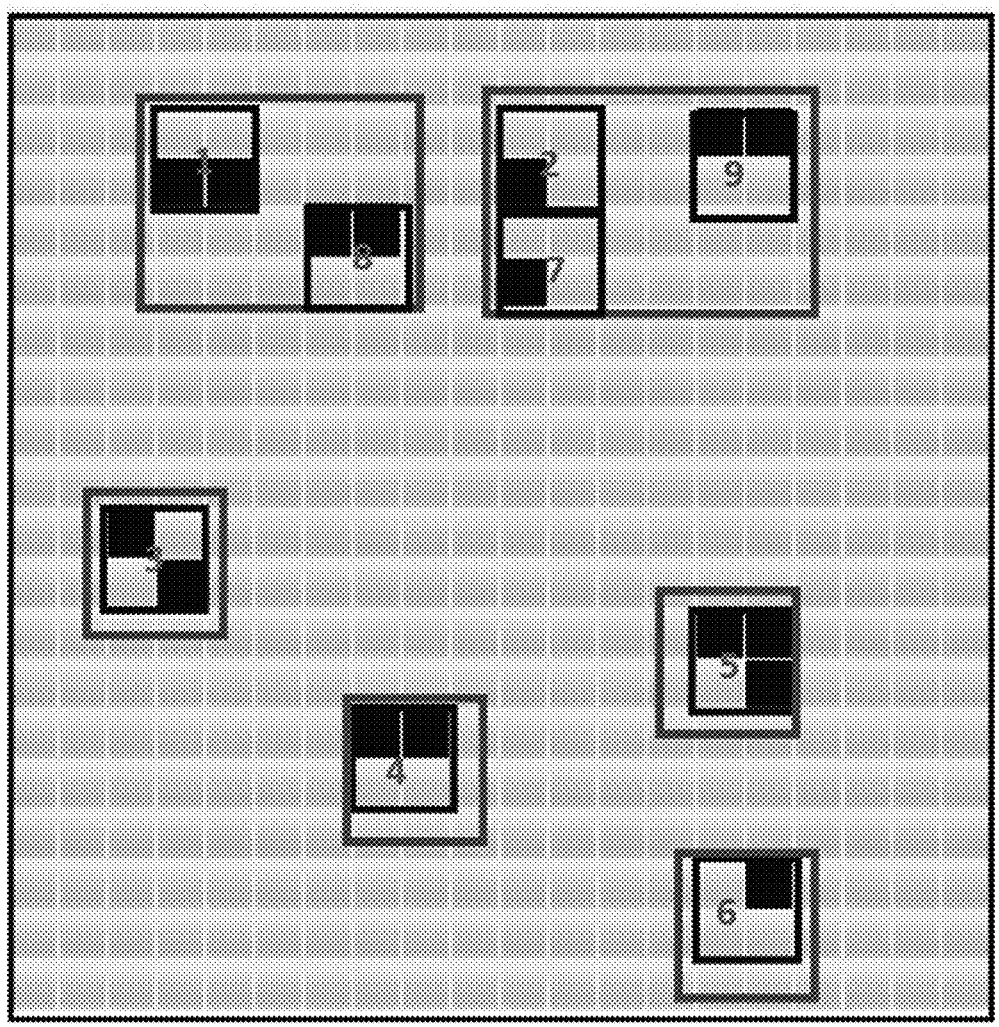
FIG. 14A illustrates an example of generating the hierarchal region tree, in accordance with an embodiment of the present disclosure.
Figure 14B:
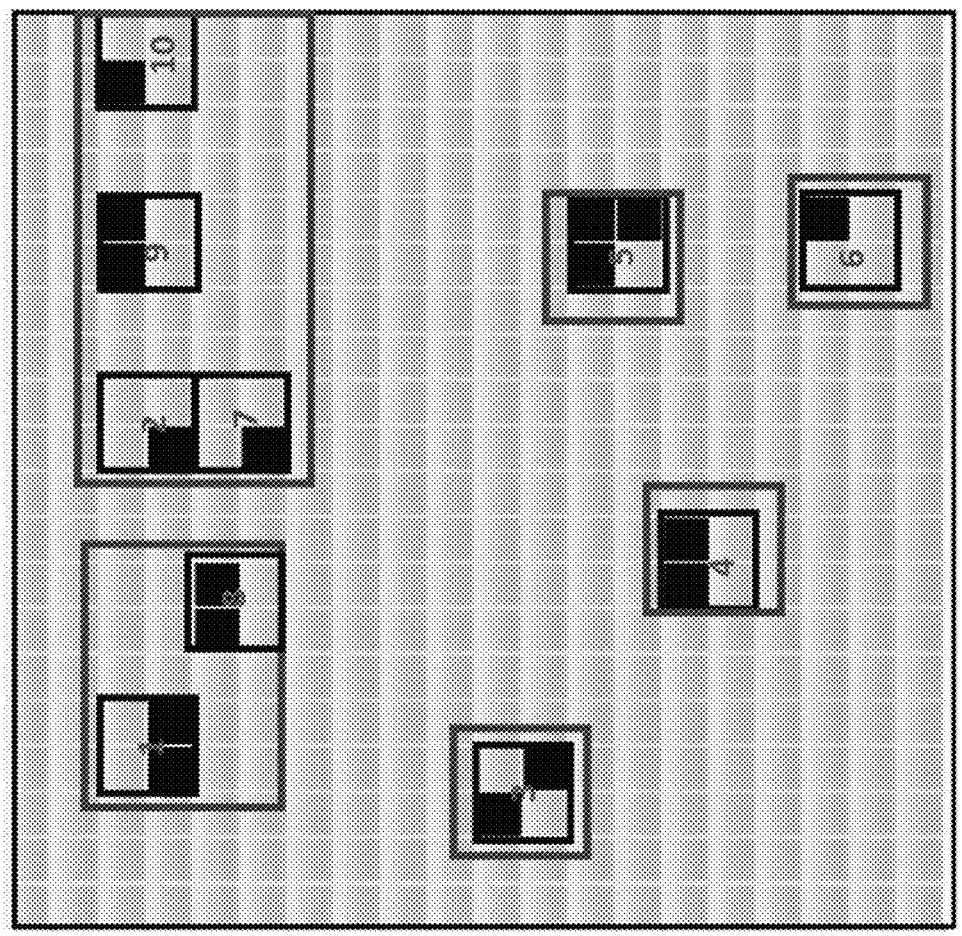
FIG. 14B illustrates an example of generating the hierarchal region tree, in accordance with an embodiment of the present disclosure.
Figure 14B:
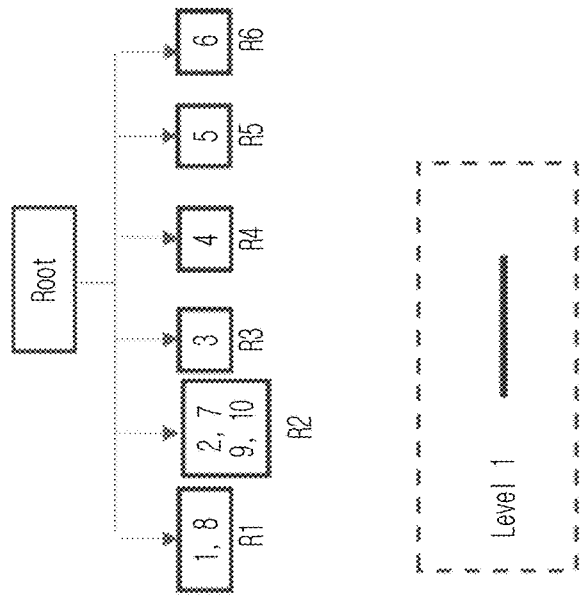

FIG. 13 illustrates subsequent part of the connected component formation process S408 B of FIG. 11, in accordance with an embodiment of the present disclosure. According to FIG. 13, the flow of the connected component formation process S408 B proceeds now to block S408 B18. Subsequent to the splitting the at least one child region, the connected component formation process S408 B at the block S408 B18, may include generating a second level of the hierarchal region tree based on the split of the at least one child region into the first plurality of sub child regions.

The operation performed at the block 408 B14 and the block 408 B16 are repeated after formation of next level until each of the child regions and the sub child regions of the root blocks satisfies the predefined criteria corresponding to N and E.

As shown at block S408 B20 of FIG. 13, the Optimal Region Generator Unit 206A may generate a plurality of levels of the hierarchal region tree. The plurality of levels may include at least the first level. The flow of the connected component formation process S408 B proceeds now to block S408 B22. The connected component formation process S408 B at the block S408 B22, may include determining whether any of sub child regions at each of the plurality of levels exceeds the predefined criteria corresponding to at least one of N and E. The flow of the connected component formation process S408 B proceeds now to block S408 B24.

The connected component formation process S408 B at the block S408 B24, may include splitting the sub child regions which exceed the predefined criteria into a second plurality of sub child regions such that each of the sub child regions at a corresponding level of the plurality of levels satisfies the predefined criteria corresponding to N and E. The flow of the connected component formation process S408 B proceeds now to block S408 B26.

The connected component formation process S408 B at the block S408 B26, may include arranging the plurality of levels from a top of the root block towards the leaf blocks in an order of their generation. As a result of the arrangement, the hierarchal region tree is formed. As an example, the Optimal Region Generator Unit 206A may arrange the first level and the second level of the hierarchal region tree in an order of their generation from the top of the root block towards leaf blocks.

Now the connected component formation process S408 B at the blocks 408 B10 through 408 B24 will be explained with reference to FIGS. 14A through 17B of the drawings. FIGS. 14A-17B illustrates an example of generating the hierarchal region tree, in accordance with an embodiment of the present disclosure. As shown in FIGS. 12A-12B, tile size region 8 is neighbor of the child region R1 at the level 1. Also, tile size regions 7, 9, and 10 are neighbors of the child region R2 at the level 1, and tile size region 11 is neighbor of the child region R5 at the level 1. Accordingly, the Optimal Region Generator Unit 206A further selects the tile size regions 8, 7, 9, 10, and 11 as the as the third number of tile size regions, and adds the selected tile size regions 8, 7, 9, 10, and 11 to respective child regions R1, R2, and R5, respectively, as shown in FIGS. 14A-14B, and 15A-15B.

Figure 15A:
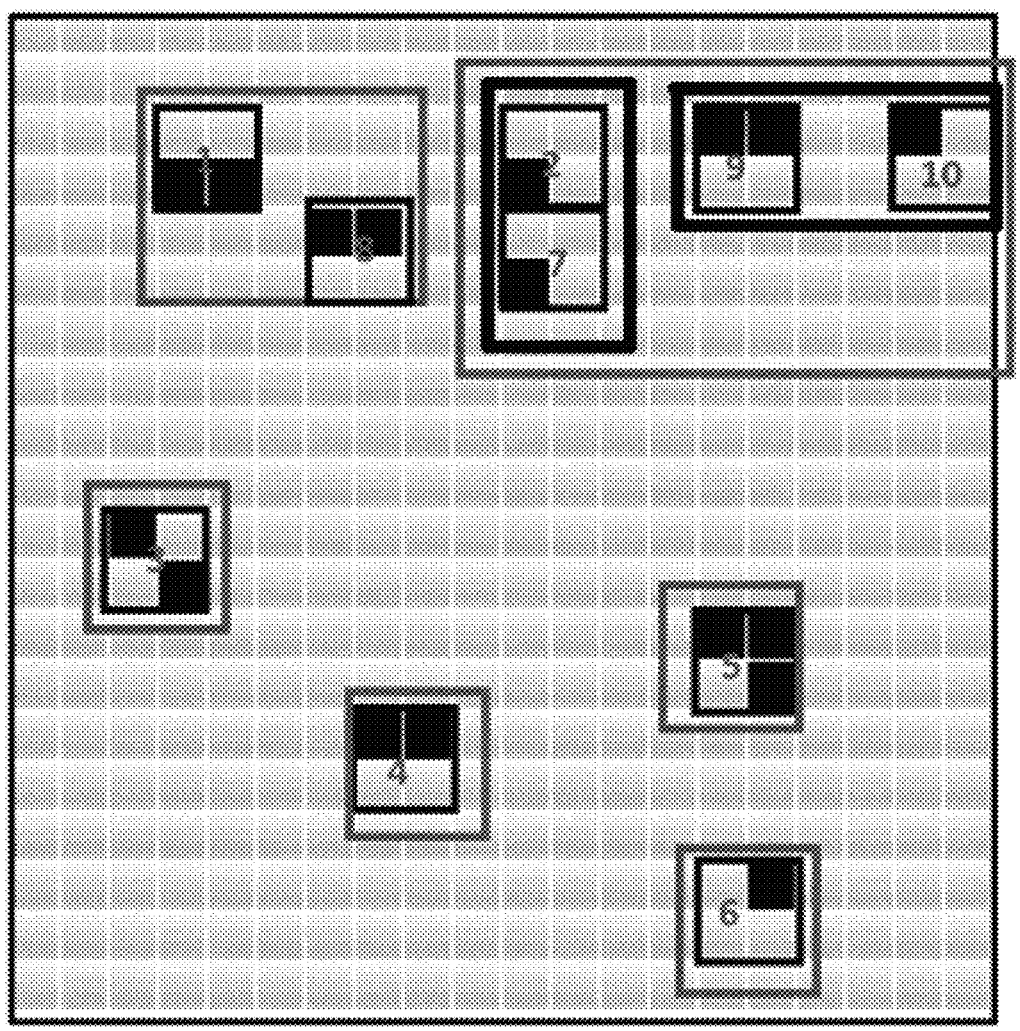
FIG. 15A illustrates an example of generating the hierarchal region tree, in accordance with an embodiment of the present disclosure.
Figure 15B:
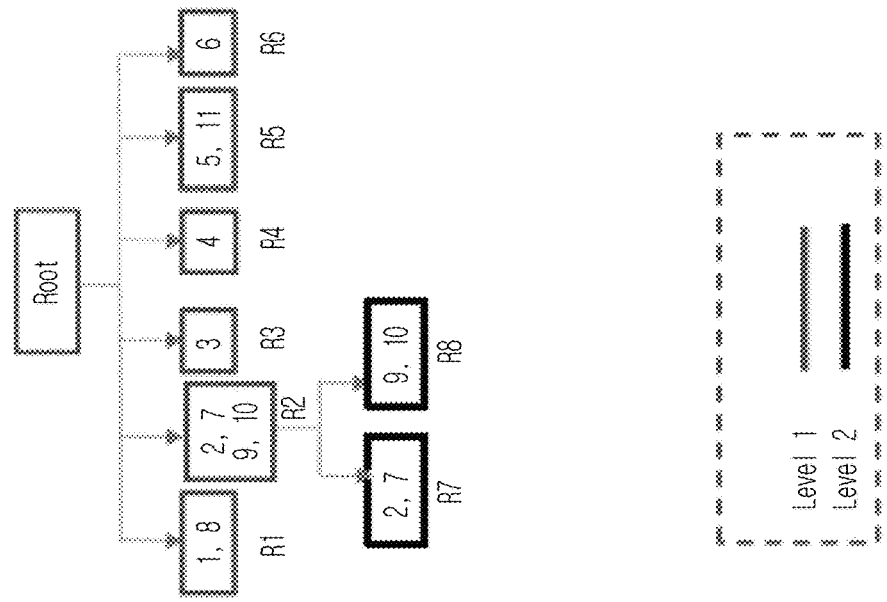
FIG. 15B illustrates an example of generating the hierarchal region tree, in accordance with an embodiment of the present disclosure.
Figure 15B:
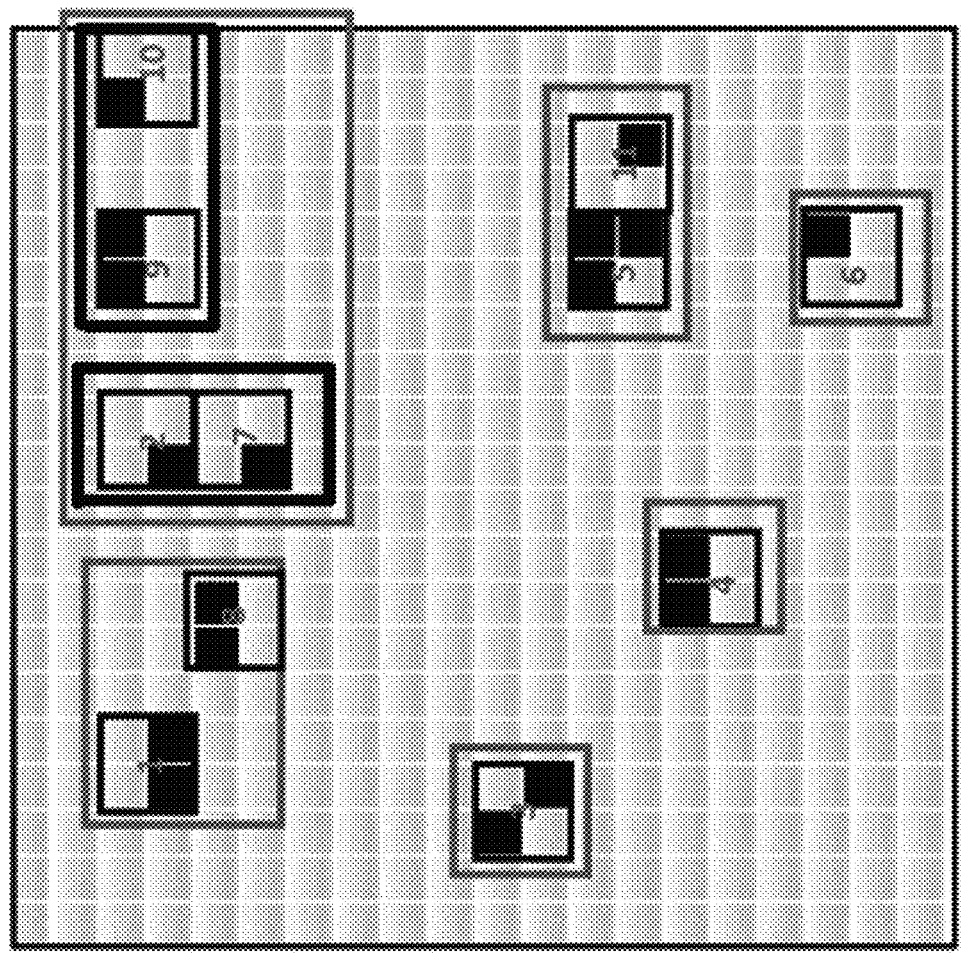

After addition of the selected tile size regions 7, 9, and 10 to the child region R2, the Optimal Region Generator Unit 206A determines that E constraint for the child region R2 is violated, and accordingly splits the child region R2 into sub child regions R7 and R8, as shown at the right-hand side of FIGS. 15A-15B, such that each of the sub child regions R7 and R8 satisfies the predefined criteria N and E. As an example, the sub child regions R7 and R8 satisfies each of the constraint E and N.

Figure 12B:
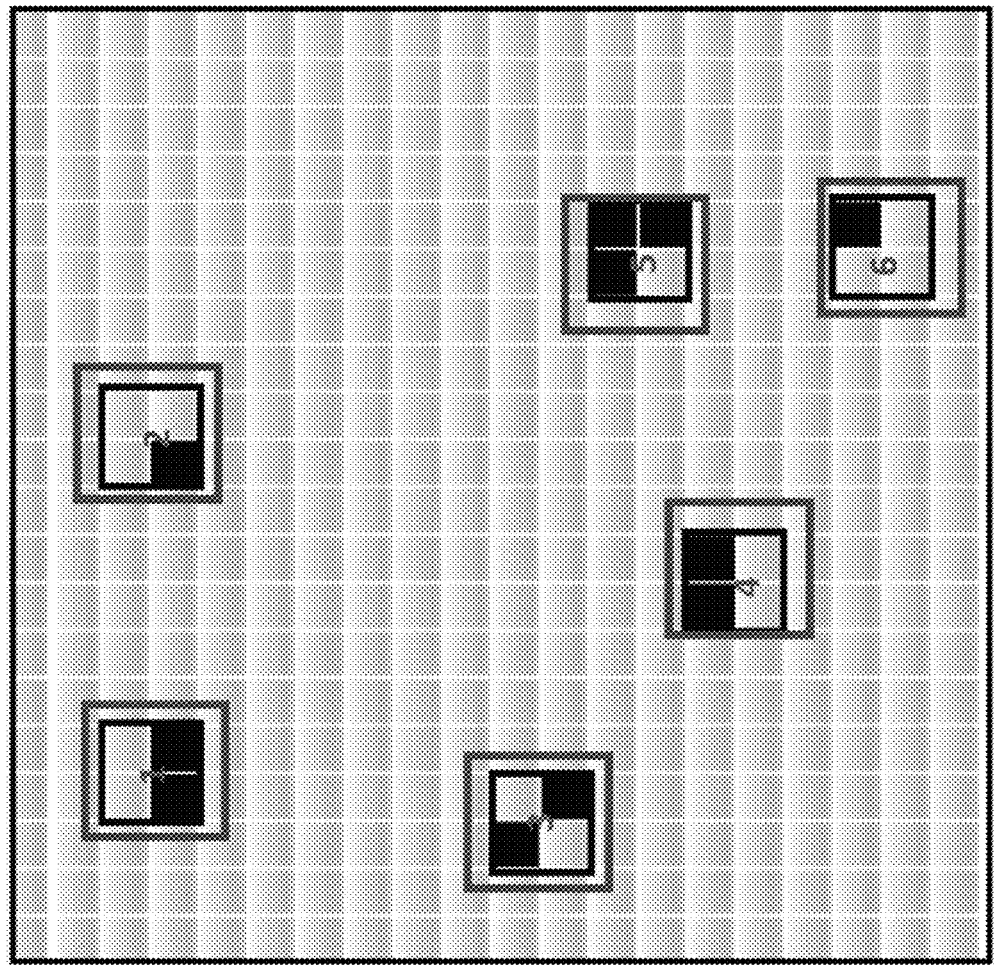
Figure 16A:
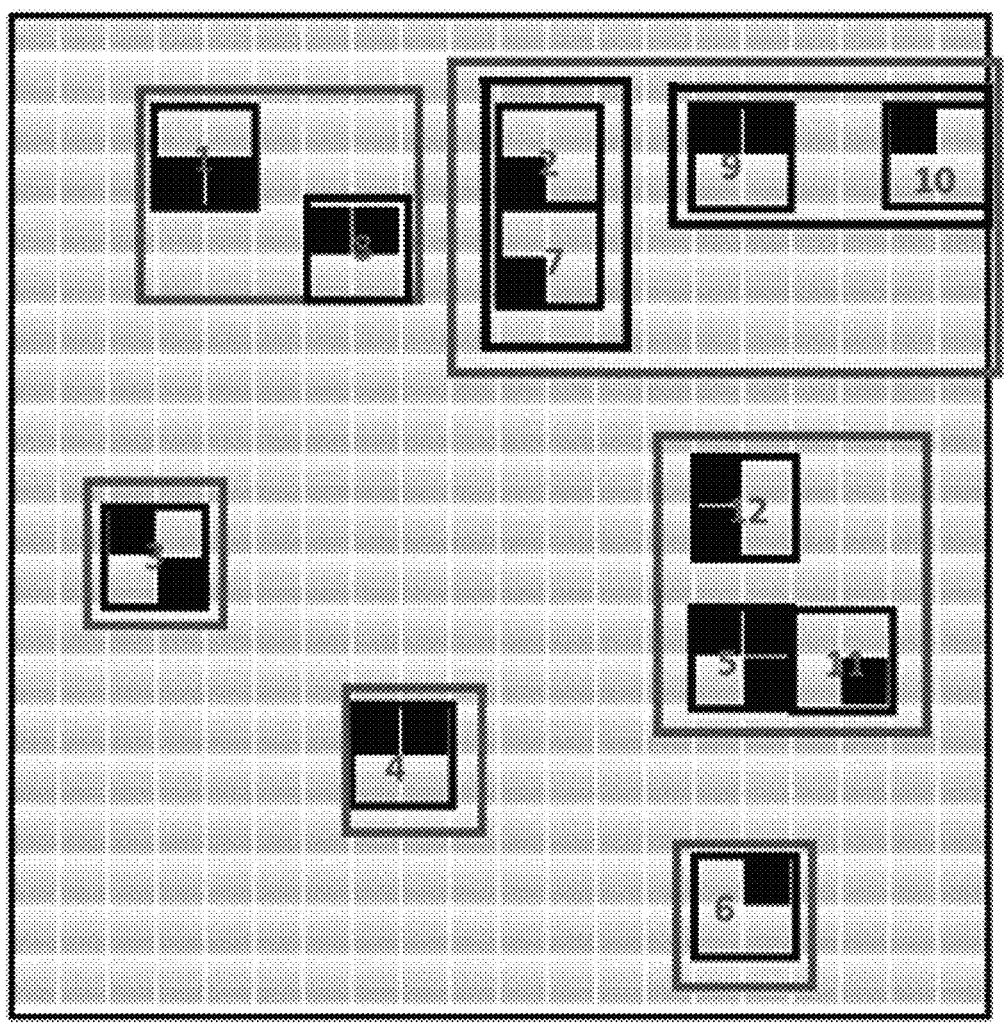
FIG. 16A illustrates an example of generating the hierarchal region tree, in accordance with an embodiment of the present disclosure.
Figure 16B:
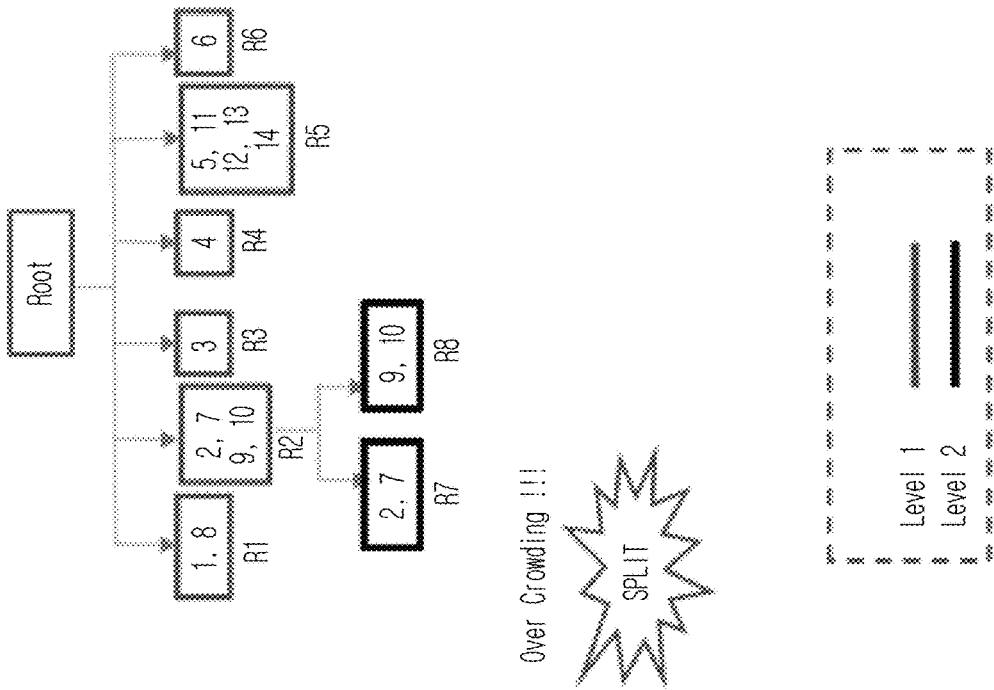
FIG. 16B illustrates an example of generating the hierarchal region tree, in accordance with an embodiment of the present disclosure.
Figure 16B:
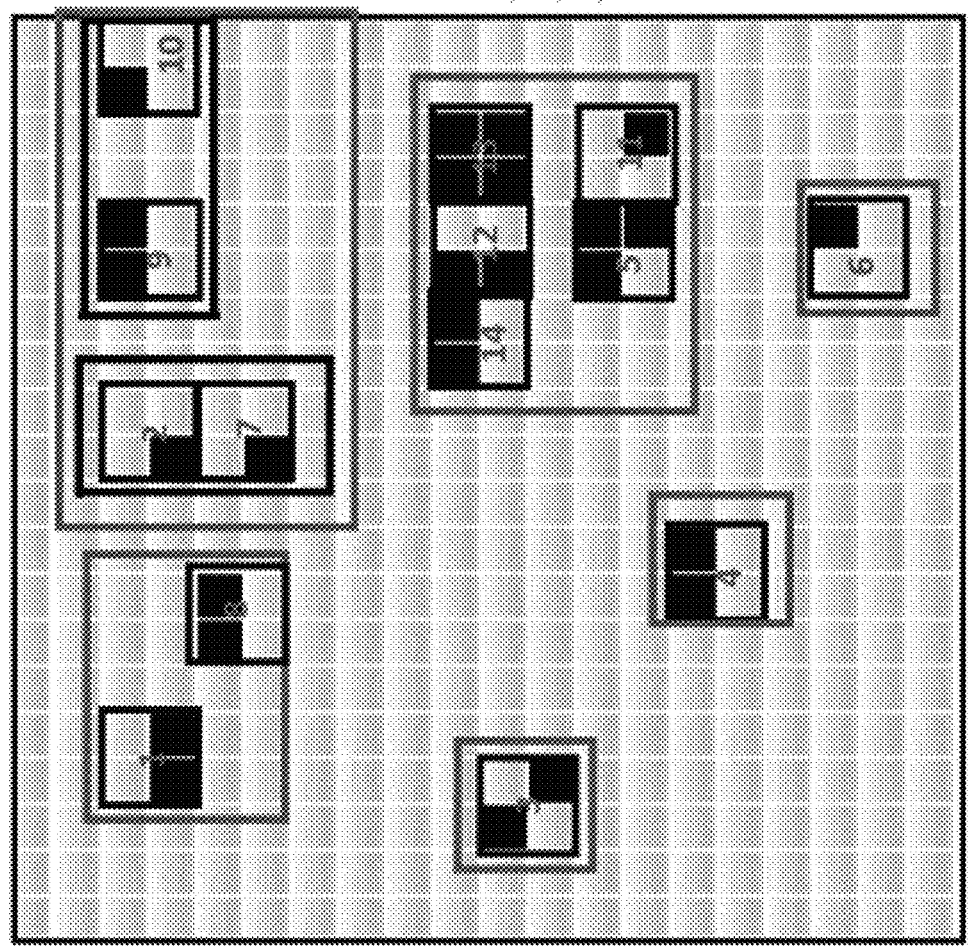

Further, as shown in FIGS. 12 and 16A16B, tile size regions 12, 13, and 14 are neighbors of the child region R5 including tile size region 5 and 11 at the level 1. Accordingly, the Optimal Region Generator Unit 206A further selects the tile size regions 12, 13, and 14, and adds the selected tile size regions 12, 13, and 14 to child region R5.

Figure 17A:
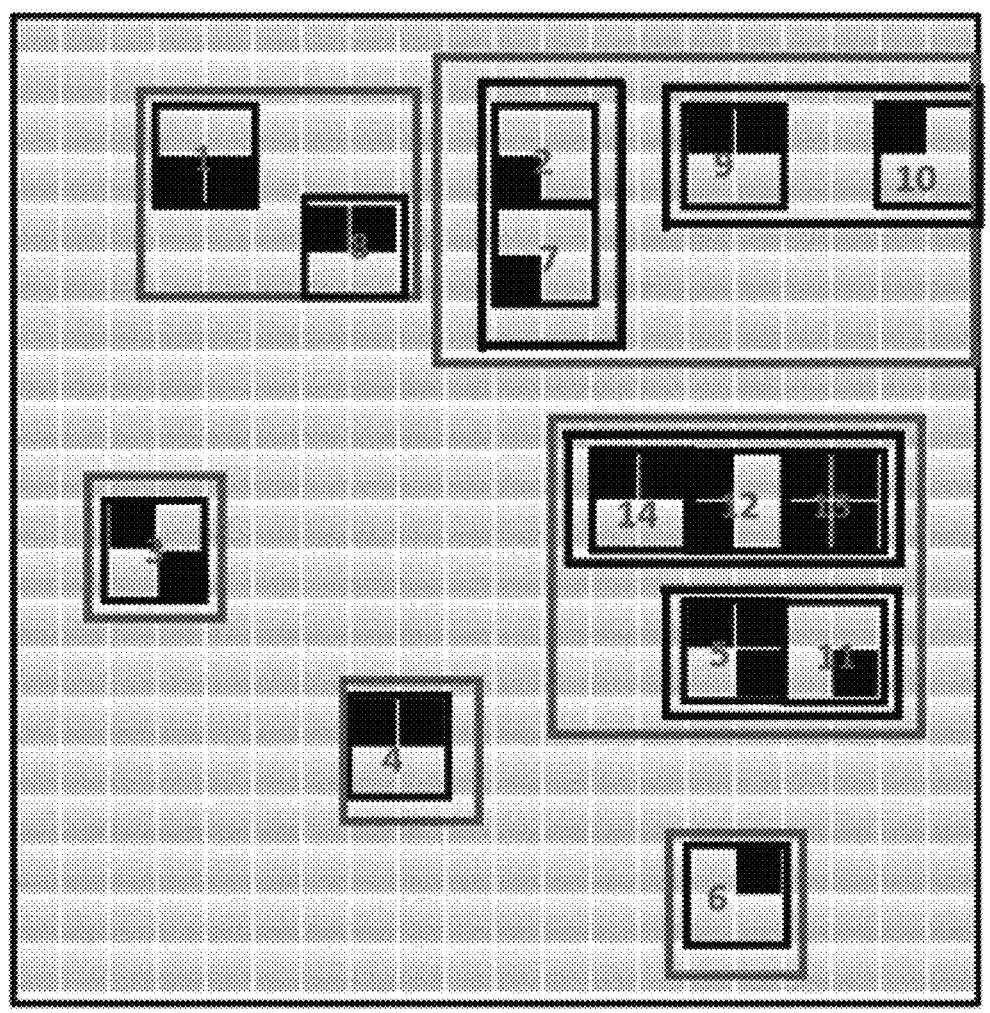
FIG. 17A illustrates an example of generating the hierarchal region tree, in accordance with an embodiment of the present disclosure.
Figure 17B:
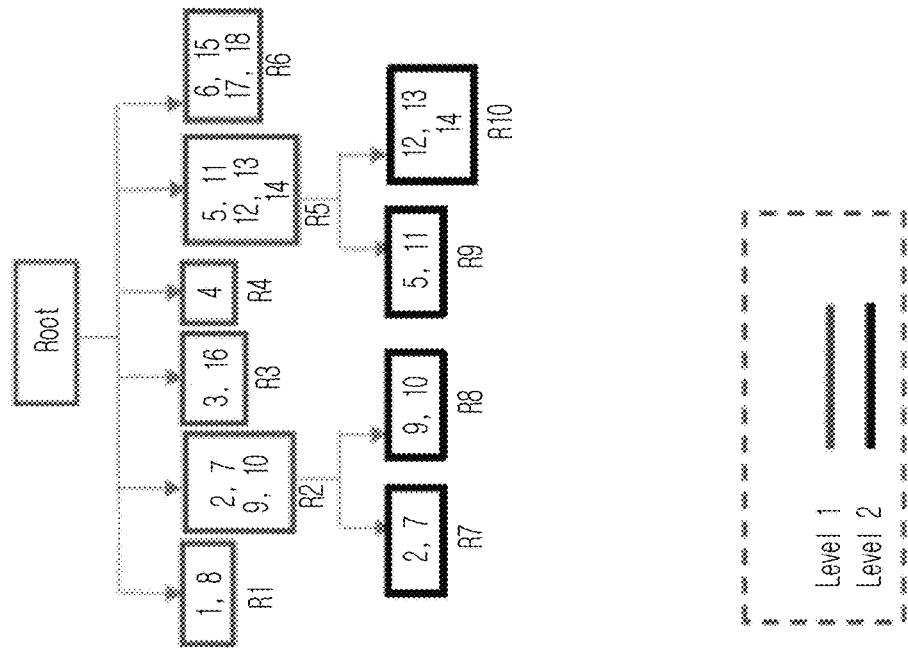
FIG. 17B illustrates an example of generating the hierarchal region tree, in accordance with an embodiment of the present disclosure.
Figure 17B:
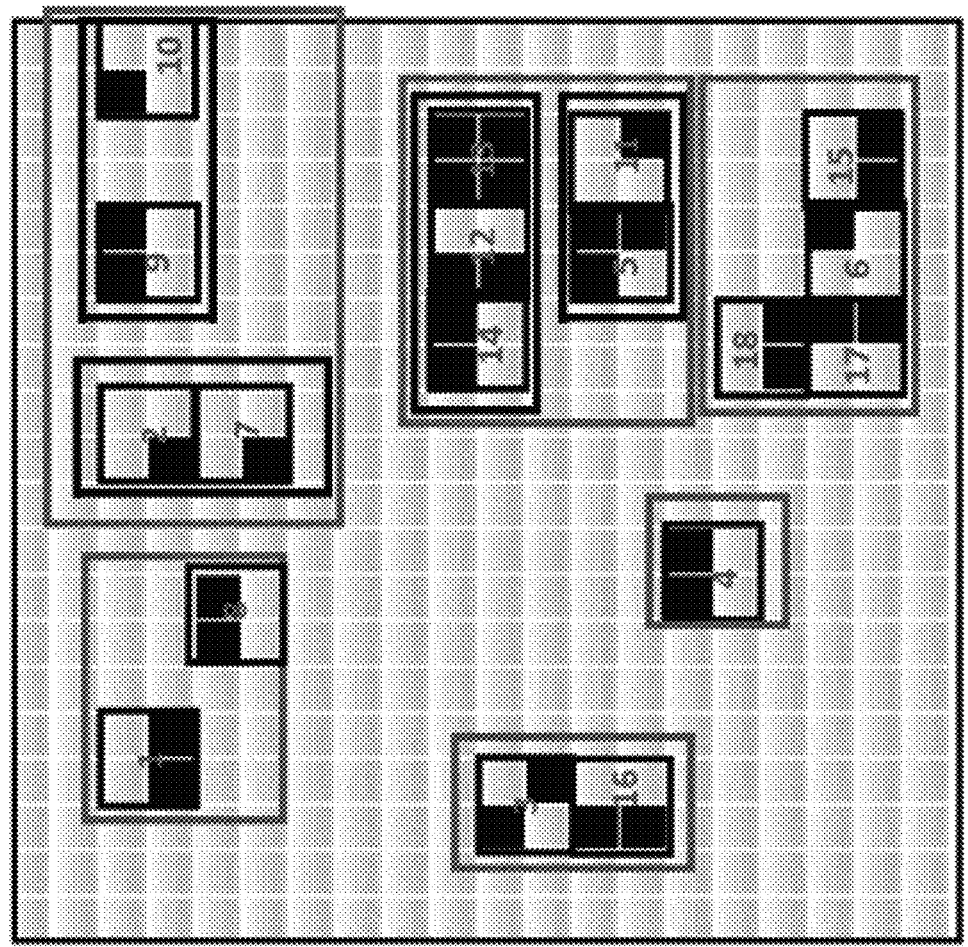

After addition of the selected tile size regions 12, 13, and 14 to the child region R5, the Optimal Region Generator Unit 206A further determines that one of the constraints among E and N for the child region R5 is violated, and accordingly splits the child region R5 into sub child regions R9 and R10 as shown at the right-hand side of FIGS. 17A-17B, such that each of the sub child regions R9 and R10 satisfies the predefined criteria N and E. As an example, the sub child regions R9 and R10 satisfies each of the constraint E and N.

Further, as shown in FIGS. 12 and 17A-17B, tile size regions 15, 17, and 18 are neighbors of the child region R6 including tile size region 6 at the level 1, and the size region 16 is neighbor of the child region R3 including tile size region 3 at the level 1. Accordingly, the Optimal Region Generator Unit 206A further selects the tile size regions 15, 17, and 18, and adds the selected tile size regions 15, 17, 18 to the child regions R5. Further, the Optimal Region Generator Unit 206A selects the tile size region 16 and add the tile size region 16 to the child region R3. The additions of the selected tile size regions to the respective child regions of the root block results in the generation of the hierarchal region tree satisfying the predefined criteria N and E. Accordingly, the connected component formation process S408 B of the differential video rendering method 400 is completed. Further, the hierarchal region tree can be referred as "R tree" in the drawings without deviating from the scope of the present disclosure. Hereinafter the explanation will be made for the component formation process S408 B in case of dynamic video differential frames using the FIGS. 18 through 28.

In case of Dynamic videos, motion estimation is used to predict the reused Blocks in frame N+1 from previous a Frame N. The Blocks from the Frame N which has absolute zero difference in pixel values and only differs in position information (X,Y) in the N+1 frames are considered as reused blocks. The reused blocks need not to be read from the memory 220 again and can be reused by the GPU 214 while rendering. Hereinafter, the Frame N can be referred as "first differential video frame" and the frame N+1 can be referred as "second differential video frame.

Reused blocks are treated separately in region preparation of the hierarchal region tree in a way that they can be combined with only matching reused regions. If no matching reused region is found in the second differential video frame, it is added to dirty tile region based on efficiency along with the position information.

According to an embodiment of the present disclosure, the Differential Generator 206D generates the Frame N+1 after generating the Frame N. As an example, the Differential Generator 206D generates the Frame N based on a first set of decoded blocks among the plurality of sets of decoded blocks, and generates the Frame N+1 based on a second set of decoded blocks among the plurality of sets of decoded blocks.

Figure 18:
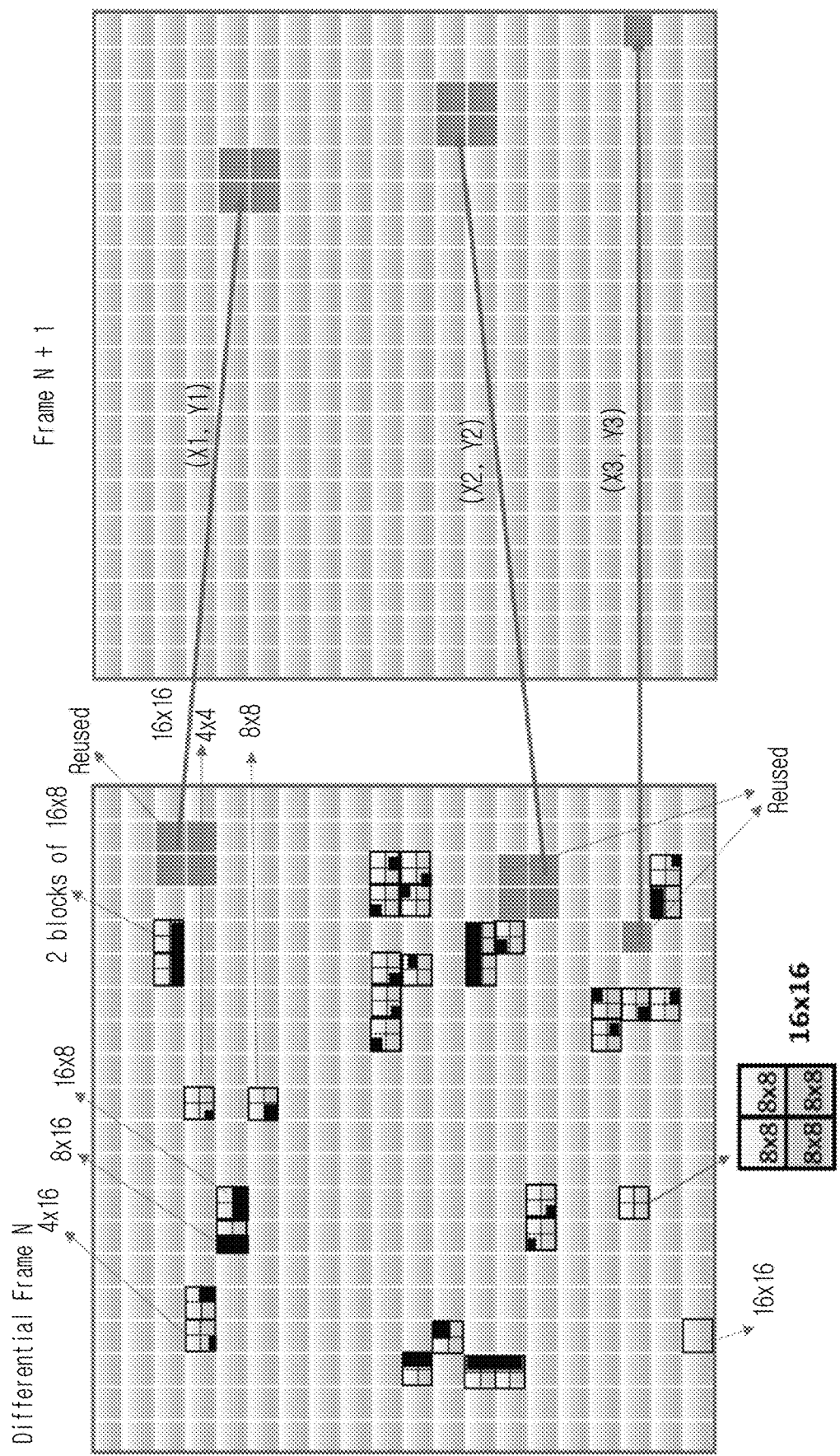
FIG. 18 illustrates an example of dynamic differential video frames, in accordance with an embodiment of the present disclosure.

FIG. 18 illustrates an example of dynamic differential video frames, in accordance with an embodiment of the present disclosure. FIG. 18 includes the frame N and the Frame N+1. The Frame N+1 differs from the frame N in the position information (x1, y1), (x2, y2), and (x3, y3) as shown in FIG. 18. The blocks representing the position information (x1, y1), (x2, y2), and (x3, y3) in the Frame N+1 has absolute zero difference in pixel values with reference to the Frame N and only differs in the position information (X,Y) in the N+1 frames. These blocks are considered as the reused blocks.

Figure 19:
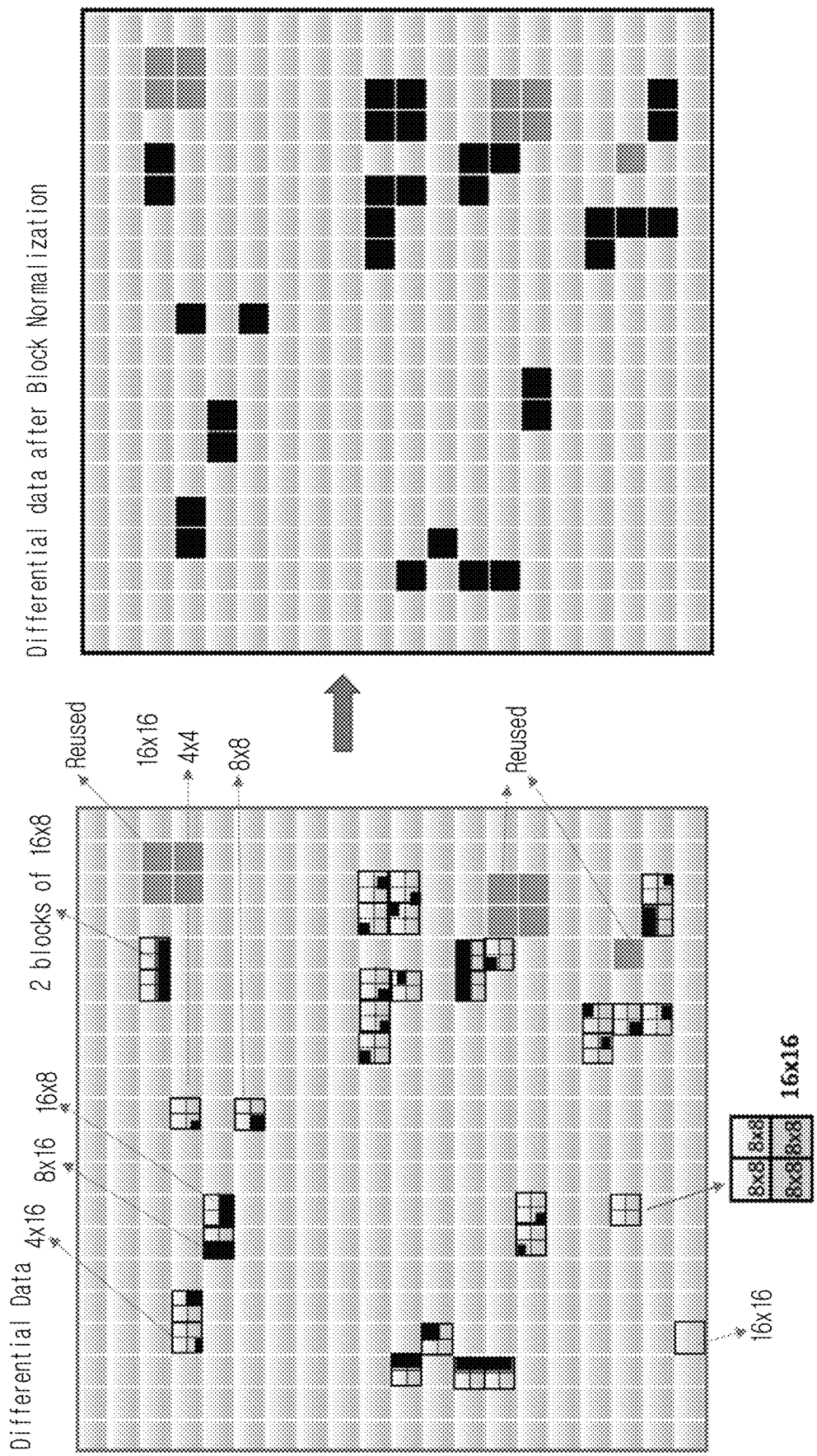
FIG. 19 illustrates another example of the differential frame generation process of FIG. 4, in accordance with an embodiment of the present disclosure.

FIG. 19 illustrates another example of differential frame generation process of FIG. 4 with reference to the dynamic differential video frames, in accordance with an embodiment of the present disclosure. The differential frame generation process explained at FIG. 6 of the present disclosure is almost similar to the differential frame generation process of FIG. 19, only they differ from each other in a scenario that FIG. 19 further includes the reused blocks that has same size as the fixed size block of 16×16. Accordingly, the Differential Generator 206D performs the similar process as described above with reference to FIG. 6, and therefore detailed explanation of the differential frame generation process with reference to FIG. 19 is omitted.

Figure 20:
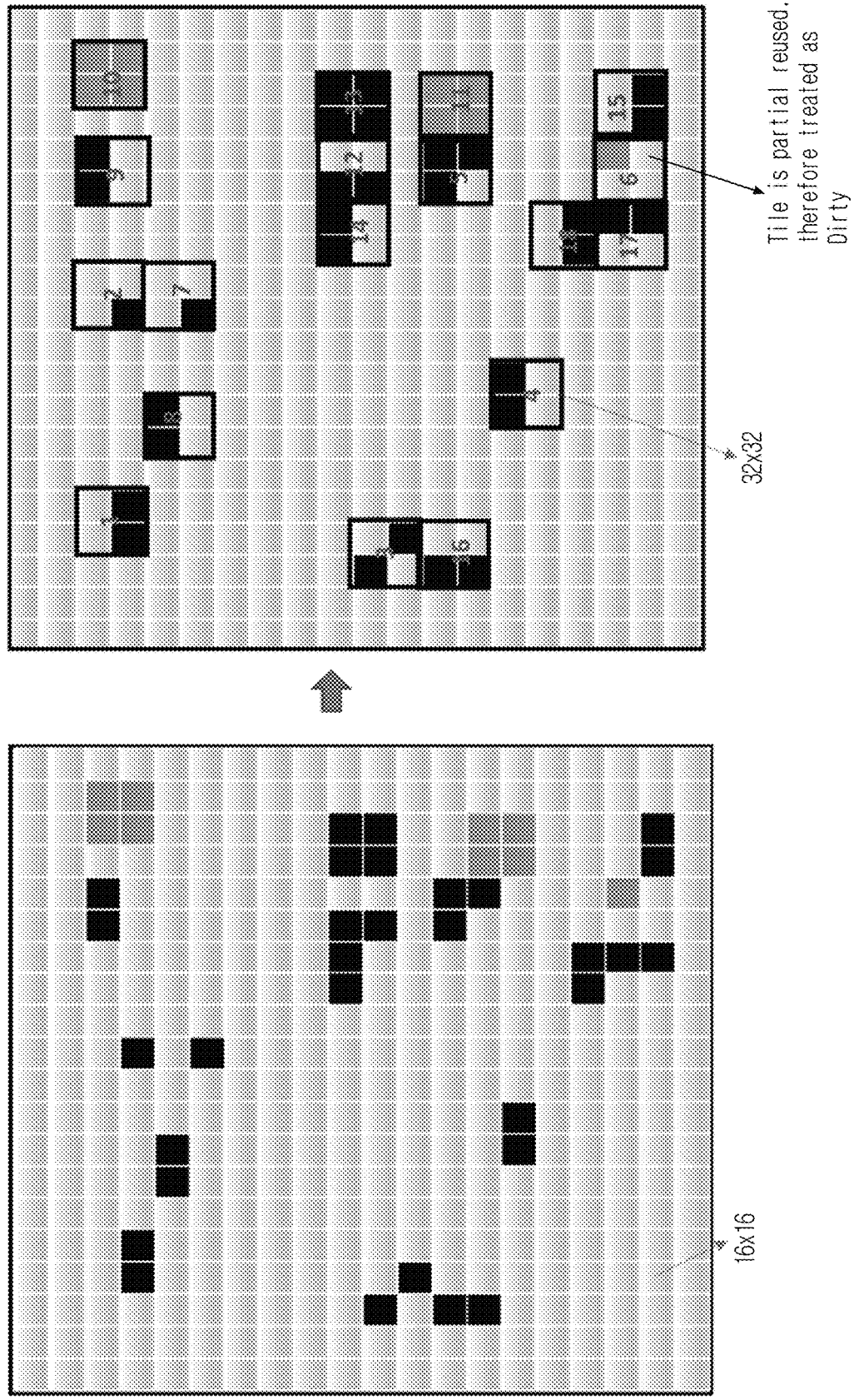
FIG. 20 illustrates another example of the region preprocessing operation of the differential video rendering method 400, in accordance with an embodiment of the present disclosure.

FIG. 20 illustrates another example of the region preprocessing operation of the differential video rendering method 400, in accordance with an embodiment of the present disclosure. The Region Preprocessing S408 A of the differential video rendering method 400 explained at FIGS. 7, 8 of the present disclosure is almost similar to the region preprocessing operation of FIG. 20. Only they differ from each other in a scenario that FIG. 20 further describes the mapping of the normalized fixed size blocks of 16×16 including the reused blocks to align with the tile size regions of 32×32 on per tile basis. Hereinafter, the reused blocks can be referred as "reused tiles" without deviating from the scope of the present disclosure. Accordingly, the differential video rendering method 400 further may include generating a blocklist including the plurality of tile size regions based on the list of the dirty tiles and a list of the reused tiles. detailed explanation of the region preprocessing operation with reference to FIG. 20 is omitted.

Further, according to FIG. 20, the tile size regions which are fully composed of the reused blocks are referred as the reused tiles, and the tile size regions which are partially composed of the reused blocks are referred as the dirty tiles. In embodiments, a tile size region that is "partially composed of" the reused blocks may include one or more reused blocks and other blocks. As an example, tile size regions other than tile size region 10 and 11 of FIG. 20 are the dirty tiles, and the tile size regions 10 and 11 are the reused tiles. Accordingly, the Optimal Region Generator Unit 206A generates the blocklist including the plurality of tile size regions based on the list of the dirty tiles and the list of the reused tiles in accordance with the Region Preprocessing S408 A of FIG. 7.

Figure 21:
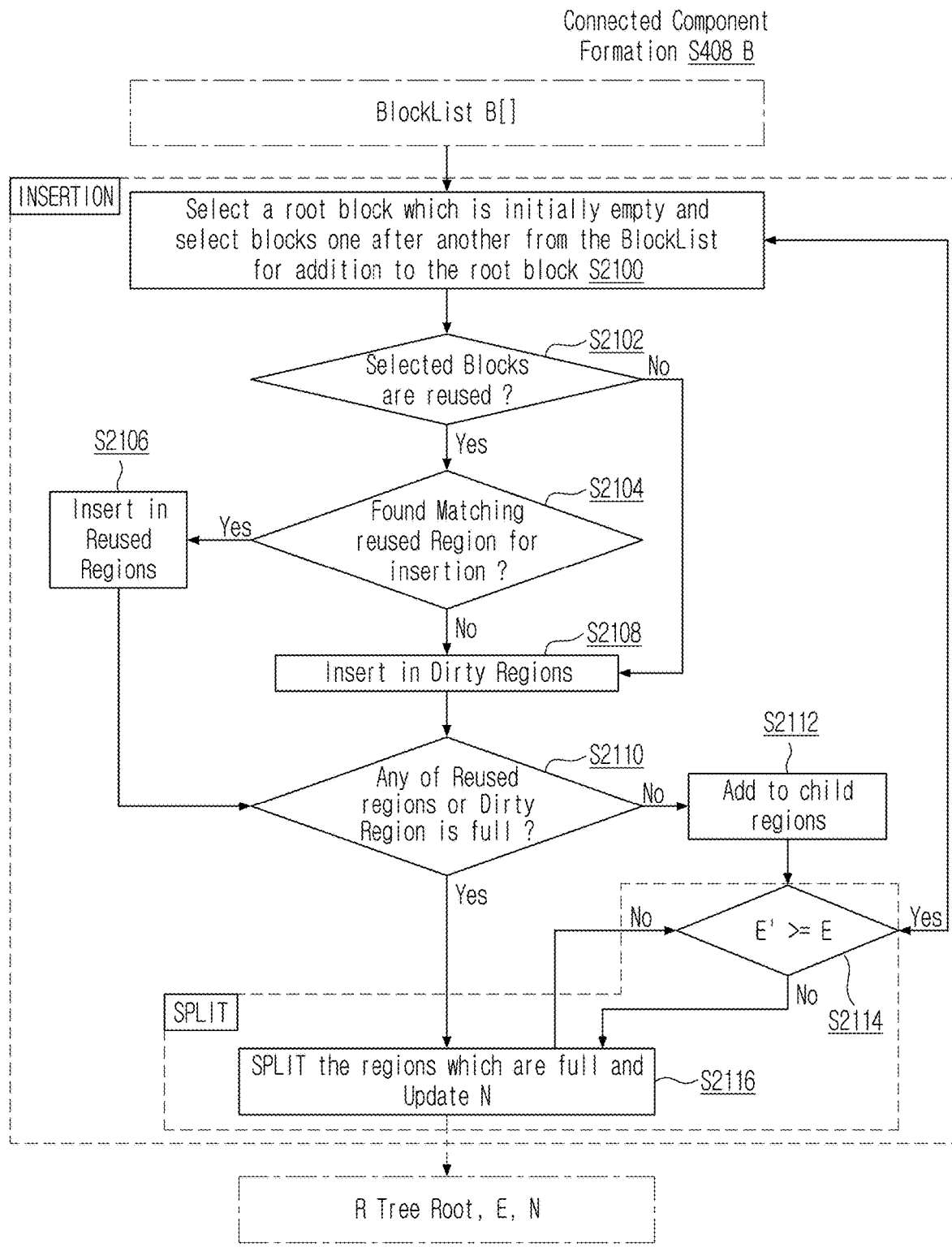
FIG. 21 illustrates a flow chart of the connected component formation process with reference to dynamic differential video frames, in accordance with an embodiment of the present disclosure.

FIG. 21 illustrates a flow chart of the connected component formation process with reference to the dynamic differential video frames, in accordance with an embodiment of the present disclosure. The connected component formation process with reference to the dynamic differential video frames starts with the blocklist generated based on the list of the dirty tiles and the list of the reused tiles. For clarity, the connected component formation process of FIG. 21 has been denoted with the same reference numeral as of the connected component formation process S408 B of FIG. 4. The connected component formation process S408 B of FIG. 21 includes a series of method-steps S2100 through S2116. For ease of the understanding, the steps S2100 through S2116 will be explained with reference to FIGS. 22A through 27. FIGS. 22A-27 illustrate an example of the connected component formation process S408 B of FIG. 21, in accordance with an embodiment of the present disclosure.

At block S2100, the connected component formation process S408 B may include selecting a root block from the blocklist, where the root block is a superset of all blocks in the blocklist. The blocklist includes the list of the dirty tiles and the list of the reused tiles. This process is similar to the selection process performed at the block S408 B2 of FIG. 11. Initially the root block is Empty. Further, blocks are selected one after other from the blocklist and added to the root block. Newly added blocks become the direct child of root block. Hereinafter, the blocks can also be referred as "tile size regions" without deviating from the scope of the present disclosure.

The connected component formation process S408 B at the block S2100 further may include selecting a first set of each of the dirty tiles and the reused tiles from the block list in a sequential order, and adding the selected first set of the dirty tiles and the reused tiles to the root block in the sequential order until a number of child regions of the root block exceeds the predefined criteria corresponding to N.

Figure 22A:
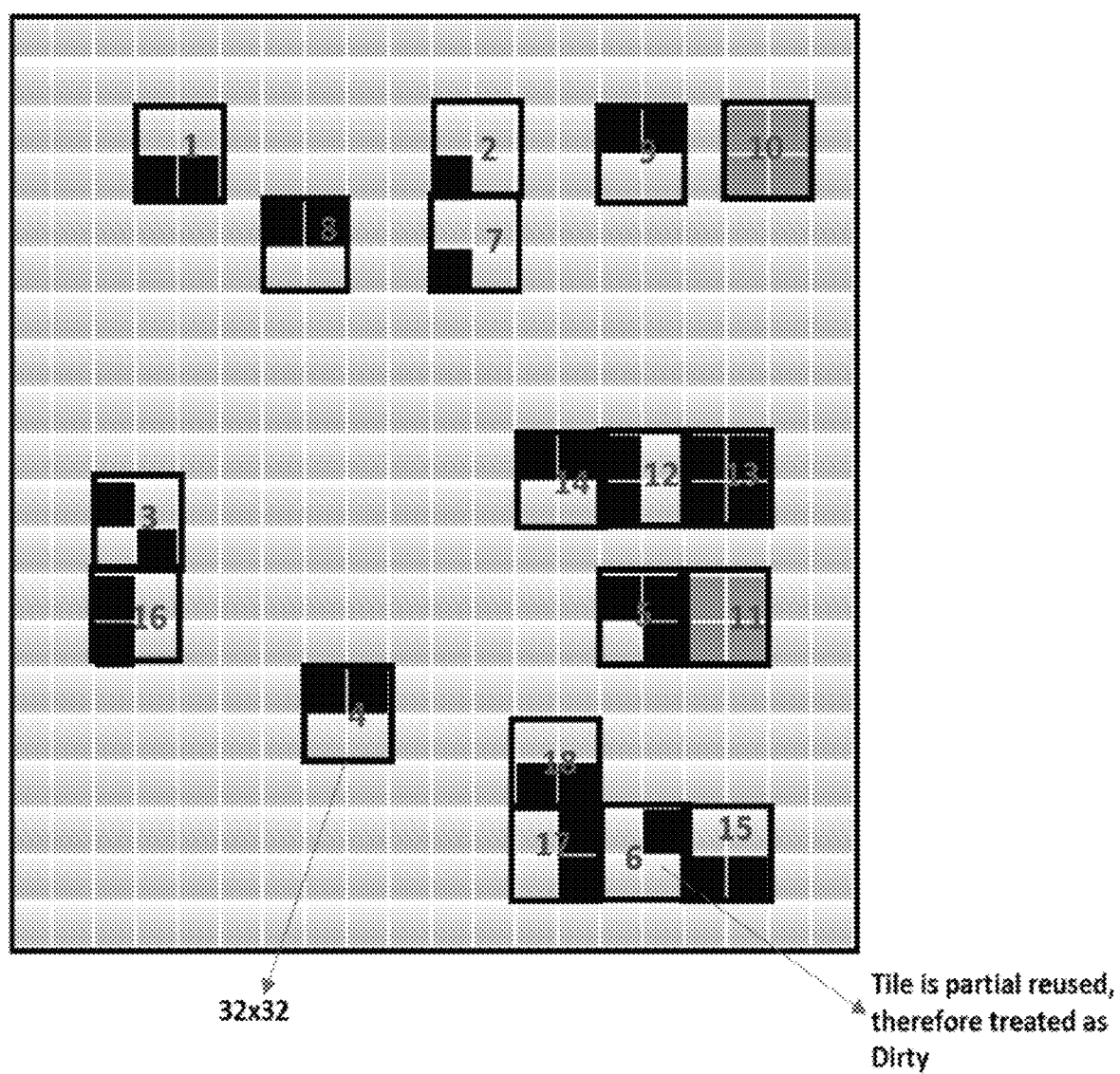
FIG. 22A illustrates an example of the connected component formation process of FIG. 21, in accordance with an embodiment of the present disclosure.
Figure 22B:
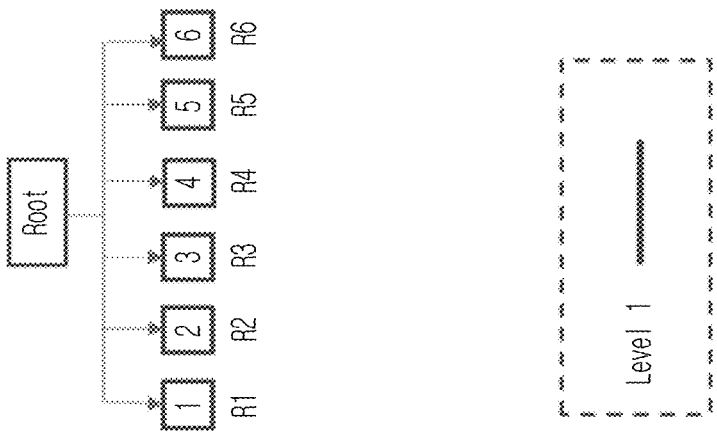
FIG. 22B illustrates an example of the connected component formation process of FIG. 21, in accordance with an embodiment of the present disclosure.
Figure 22B:
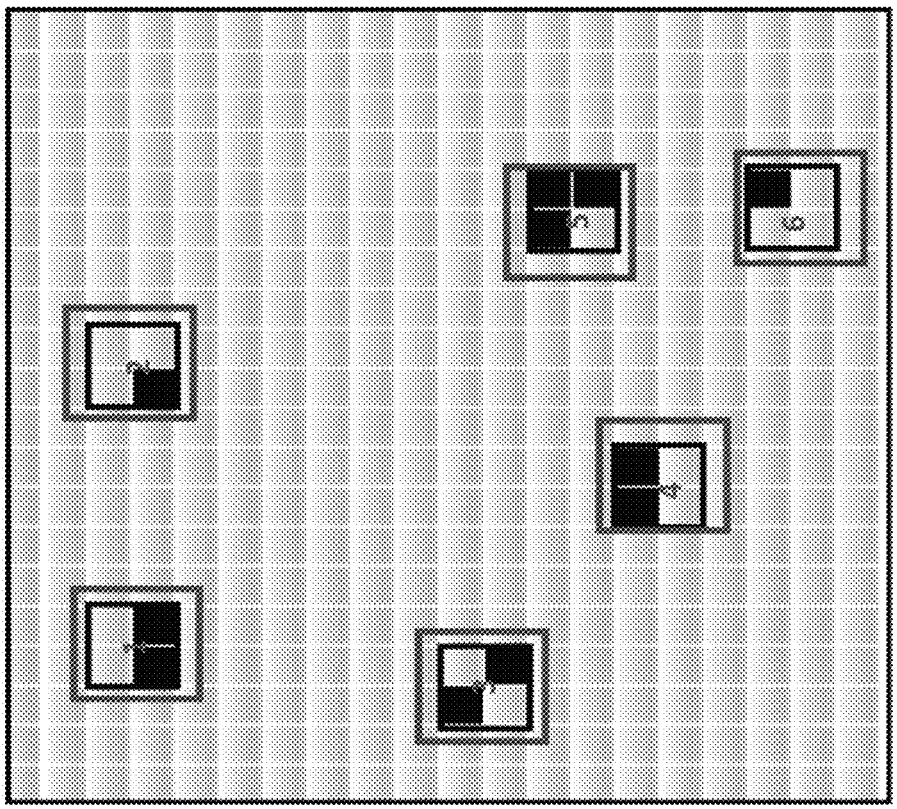

As an example, with reference to FIGS. 22A-22B, the Optimal Region Generator Unit 206A selects the tile size regions 1 to 6 among the tile size regions 1 to 18, and adds the tile size regions 1 to 6 to the root block in the sequential order until the number of child regions i.e., R1 to R6 of the root block exceeds the predefined value of N=6. The Optimal Region Generator Unit 206A further selects the tile size regions 7, 8, 9, and 10.

Figure 23A:
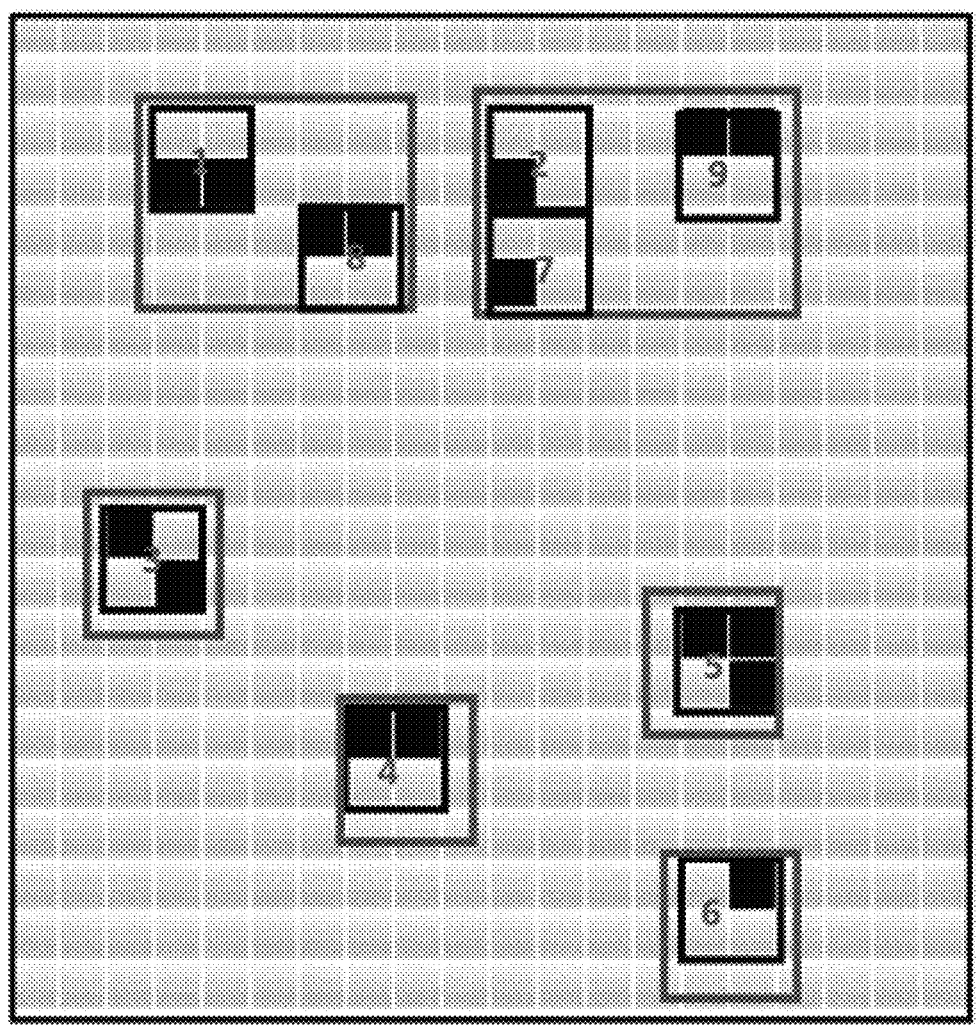
FIG. 23A illustrates an example of the connected component formation process of FIG. 21, in accordance with an embodiment of the present disclosure.
Figure 23B:
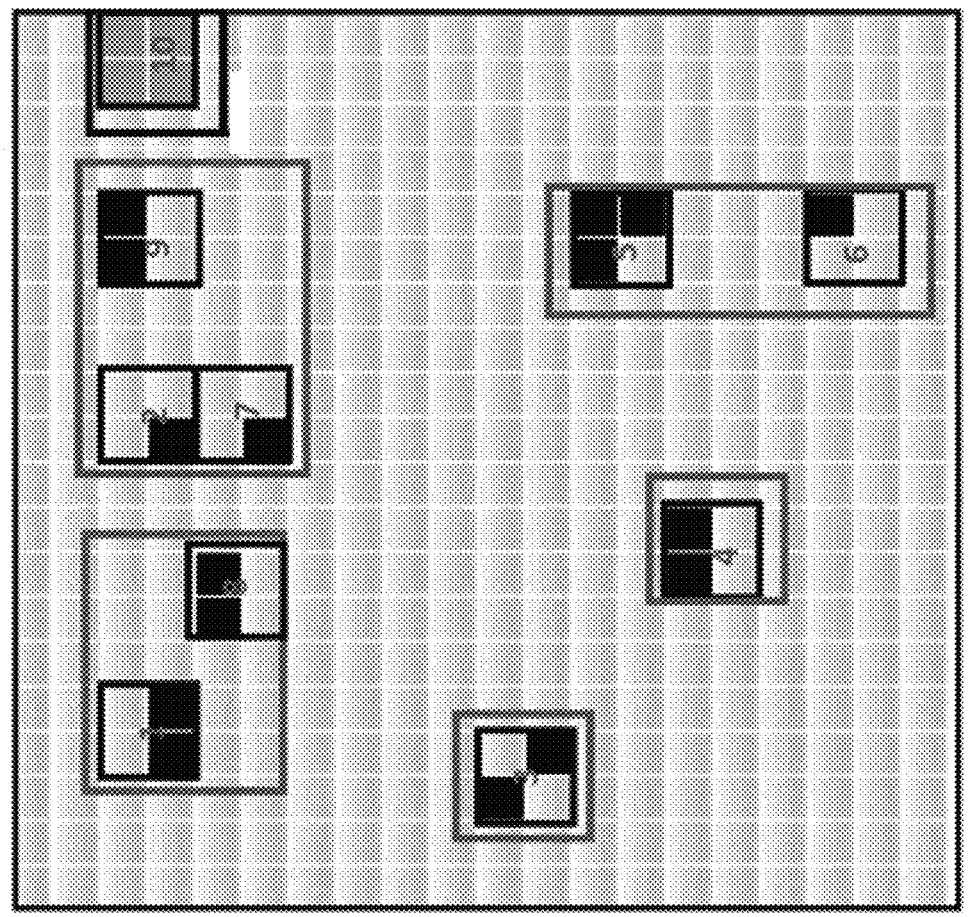
FIG. 23B illustrates an example of the connected component formation process of FIG. 21, in accordance with an embodiment of the present disclosure.
Figure 23B:
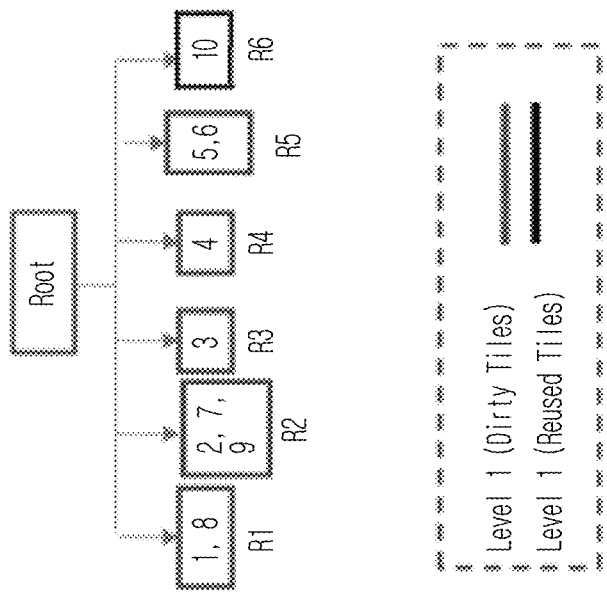
Figure 24A:
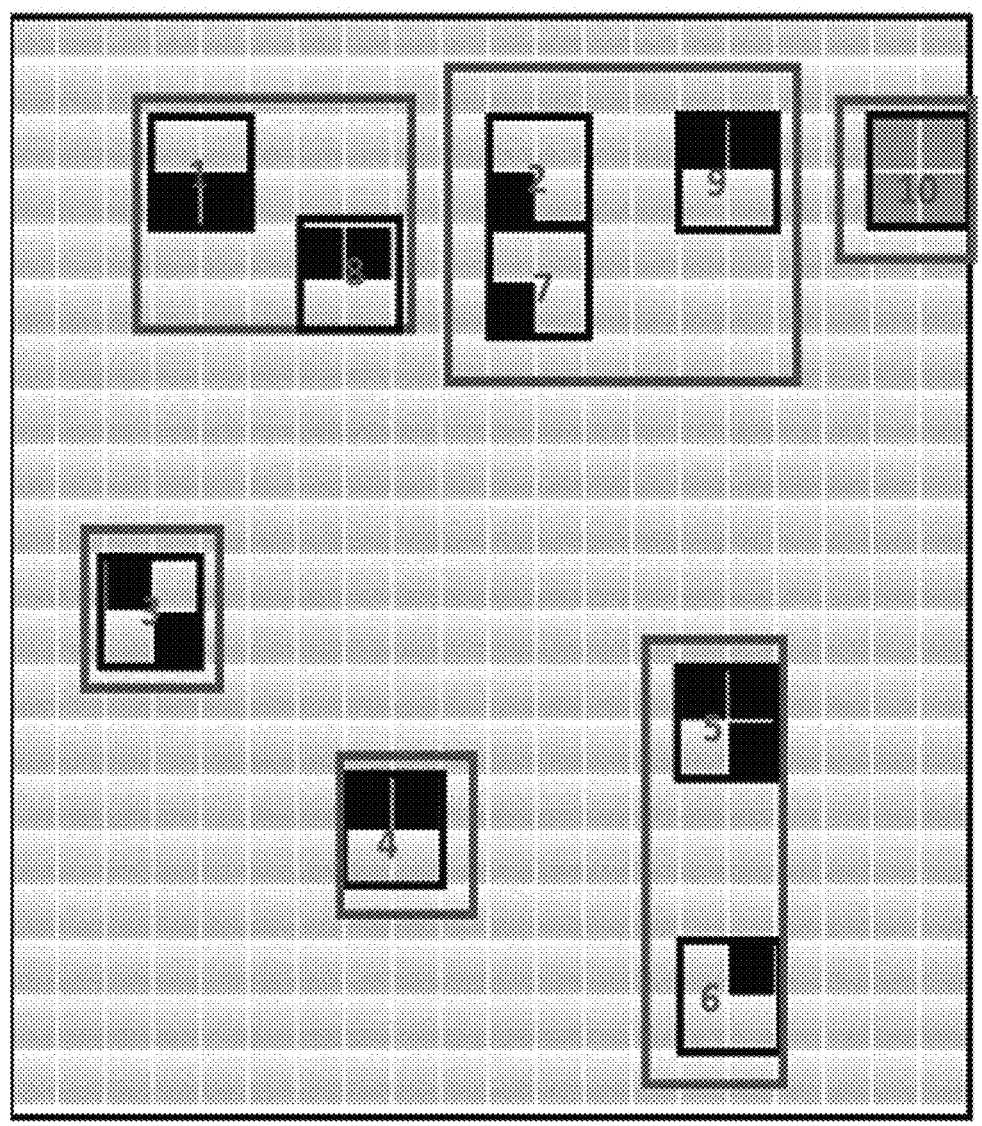
FIG. 24A illustrates an example of the connected component formation process of FIG. 21, in accordance with an embodiment of the present disclosure.
Figure 24B:
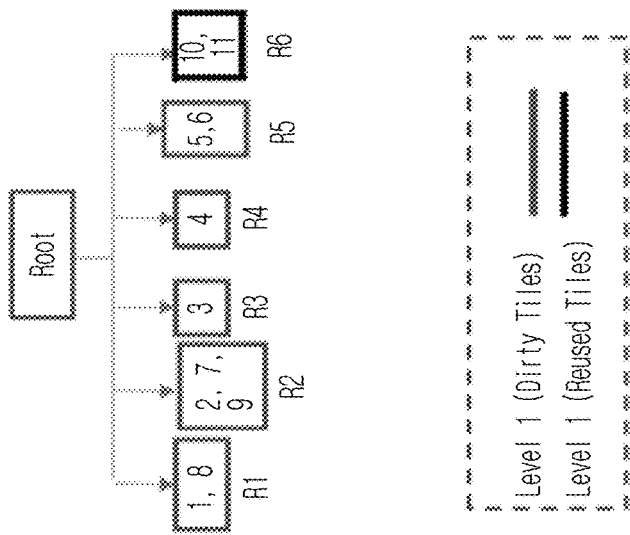
FIG. 24B illustrates an example of the connected component formation process of FIG. 21, in accordance with an embodiment of the present disclosure.
Figure 24B:
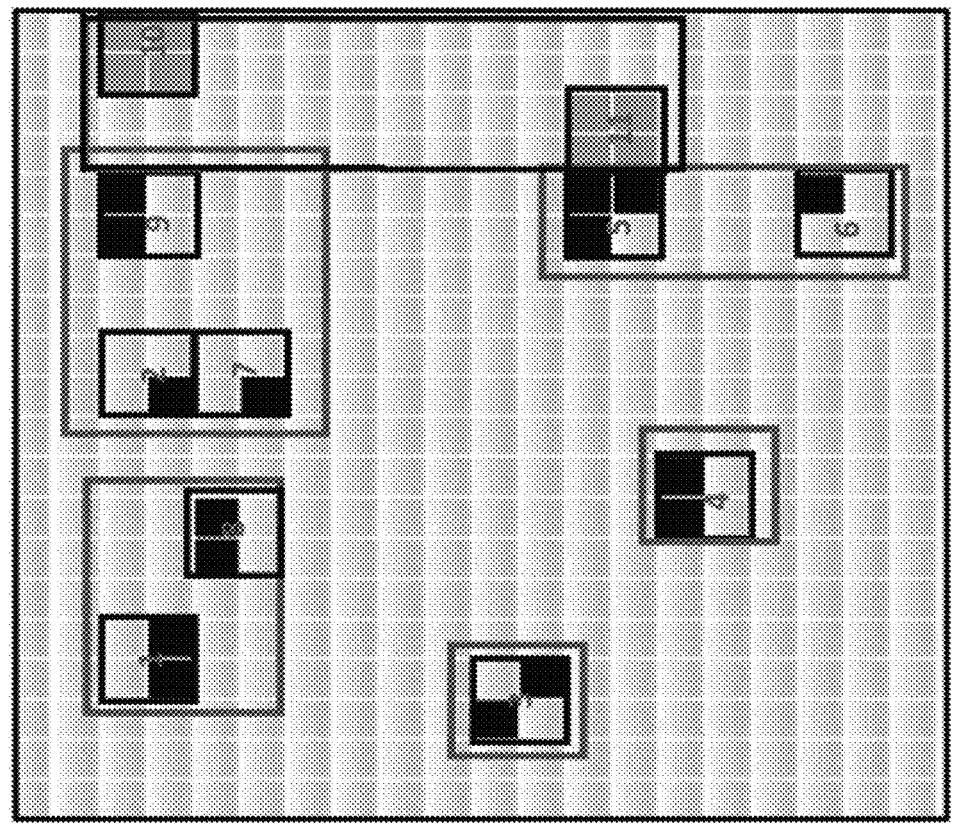

The connected component formation process S408 B now proceeds from the block S2100 to block 52102. With reference to FIGS. 23A-23B, at the block 52102, the Optimal Region Generator Unit 206A checks whether the selected tile size regions 7, 8, 9, and 10 includes any reused tiles. As shown in FIGS. 23A-23B, tile size regions 7, 8, and 9 are dirty tiles and the tile size region 10 is a reused tile. Accordingly, in a case the result at the block 52102 is Yes, the process proceeds to the block 52104 where the Optimal Region Generator Unit 206A check for any matching reused region in neighbor of the reused tile 10 and if found inserts the reused tile in a reused region separately from dirty tile regions (i.e. child regions including dirty tiles) as shown at block 52106. As an example, as shown in FIGS. 23A-23B, the reused tile 10 indicates that it includes reused regions and is inserted to the child region R6 separately from the child regions R1 to R5. Also, as shown in FIGS. 24A-24B, reused tile 11 is a matching reused region in neighbor of the reused tile 10, and is inserted to the child region R6 including the reused tile 10. Accordingly, each time the Optimal Region Generator Unit finds any reused tiles, adds such tiles to the root block as a separate child region.

Now coming back again to the block 52102, if the result at the block 52102 is No, then the Optimal Region Generator Unit 206A inserts the tile size regions 7, 8, and 9 to their respective neighbor child regions R1 and R2. As Shown in FIGS. 22A-22B, the tile size region 8 is neighbor of the child region R1, and the tile size regions 7 and 9 are neighbor of the child region R2. Therefore, the tile size region 8 is inserted into the child region R1, and the tile size regions 7 and 9 are inserted into the child region R2. Here, the child regions R1 and R2 includes dirty tiles and can be considered as dirty regions. Accordingly, the tile size regions 7, 8, and 9 are inserted to the dirty regions in accordance with the block 52108 of FIG. 21.

The connected component formation process S408 B now proceeds from the blocks S2106 and S2108 to block S2110. At the block S2110, the Optimal Region Generator Unit 206A determines whether any of the reused regions or the dirty Region is full. For example, the Optimal Region Generator Unit 206A determines whether any of the reused regions or the dirty regions violates or exceeds the predefined criteria corresponding to N. In case the result of the block S2110 is No, then the Optimal Region Generator Unit 206A continues to add neighboring tile size regions to a respective child region of the root block such that each of the child regions satisfy the predefined criteria E, where E is less than or equal to a specific efficiency E', as shown for example at S2112 of FIG. 21.

The connected component formation process S408 B now proceeds from the block S2112 to block S2114, at the block S2114, the Optimal Region Generator Unit 206A determines whether any of the child regions includes a number of tile size regions which violates the predefined criteria E. As an example, the Optimal Region Generator Unit 206A determines whether any of the child regions exceeds the predefined criteria E. If the result of the block S2114 is No, then the connected component formation process S408 B now proceeds from the block S2114 to block S2116.

Further, if the result of the block S2114 is Yes, then the Optimal Region Generator Unit 206A further selects a second set of each of the dirty tiles and the reused tiles, where the second set of the dirty tiles neighbor the first set of the dirty tiles. As an example, as shown in FIGS. 22A-22B and 25A-25B tile size regions 12 and 14 are neighbors of the child region R5 including tile size regions 5 and 6. Similarly, tile size region 13 is neighbor of reused tile 11 in the child region R6. Accordingly, the tile size regions 12 and 14 is added to the child region R5, and the tile size region 13 is added to the child region R6. When the tile size region 13 is added to the child region R6, the connected component formation process S408 B now proceeds from the block S2114 to block S2116. Also, in case the result of the block S2110 is Yes, the connected component formation process S408 B now proceeds from the block S2110 to the block S2116.

At the block S2116, the Optimal Region Generator Unit 206A splits each of the dirty regions and the reused regions that are full into one or more sub child regions. For example, the Optimal Region Generator Unit 206A splits each of the child regions which exceeds at least one the predefined criteria N and E into the one or more sub child regions, such that each of the one or more sub child regions satisfies the predefined criteria N and E, and further the Optimal Region Generator Unit 206A also updates the value of N based on the iterative method 1 as described above.

Furthermore, if the result of the block S2114 is Yes, then the Optimal Region Generator Unit 206A repeats the process S2100 through S2112 until the result of the block S2112 becomes No. Also, each time the result of the block S2114 becomes No, the Optimal Region Generator Unit 206A performs the split operation for the level at which any of the child regions and sub child regions violates the constraint E. Also, each time the result of the block S2110 becomes yes, the Optimal Region Generator Unit 206A performs the split operation for the level at which any of the child regions and sub child regions violates the constraint N, updates the value of N after the split.

According to the above-mentioned examples, the connected component formation process S408 B of FIG. 21 may include generating a first level of the hierarchal region tree based on the addition of the selected first set of the dirty tiles and the reused tiles to the root block, and generating a second level of the hierarchal region tree based on the split of at least one child region into the one or more sub child regions. The first level of the hierarchal region tree is generated as a result of the addition of the reused tiles and the dirty tiles to the root block, and the second level of the hierarchal region tree is generated as a result of the spilt of the child regions that exceeded at least one of the predefined criteria N and E.

The split operation at the block S2116 can also be performed for each level of a plurality of levels that may be generated as a result of one or more iteration of the processes at the Blocks S2100 through S2114. As an example, the Optimal Region Generator Unit 206A may perform the split operation for the levels $Level_1, Level_i, \ldots Level_k$, where each of these levels are arranged in a sequence from a top of the root block towards leaf blocks. The leaf blocks represent the below most level i.e., $Level_k$. Further, these levels are arranged in a sequence of descending order to form the hierarchal region tree. As an example, the second level is a level subsequent to the first level in the hierarchal region tree. As a result of the arrangement, the hierarchal region tree is formed. As an example, the Optimal Region Generator Unit 206A may arrange the first level and the second level of the hierarchal region tree in an order of their generation from the top of the root block towards leaf blocks.

The split operation is performed by the Optimal Region Generator Unit 206A for each level of the plurality of levels until each of the child regions and the sub child regions satisfies the predefined criteria N and E at each level of the plurality of levels.

Figure 25A:
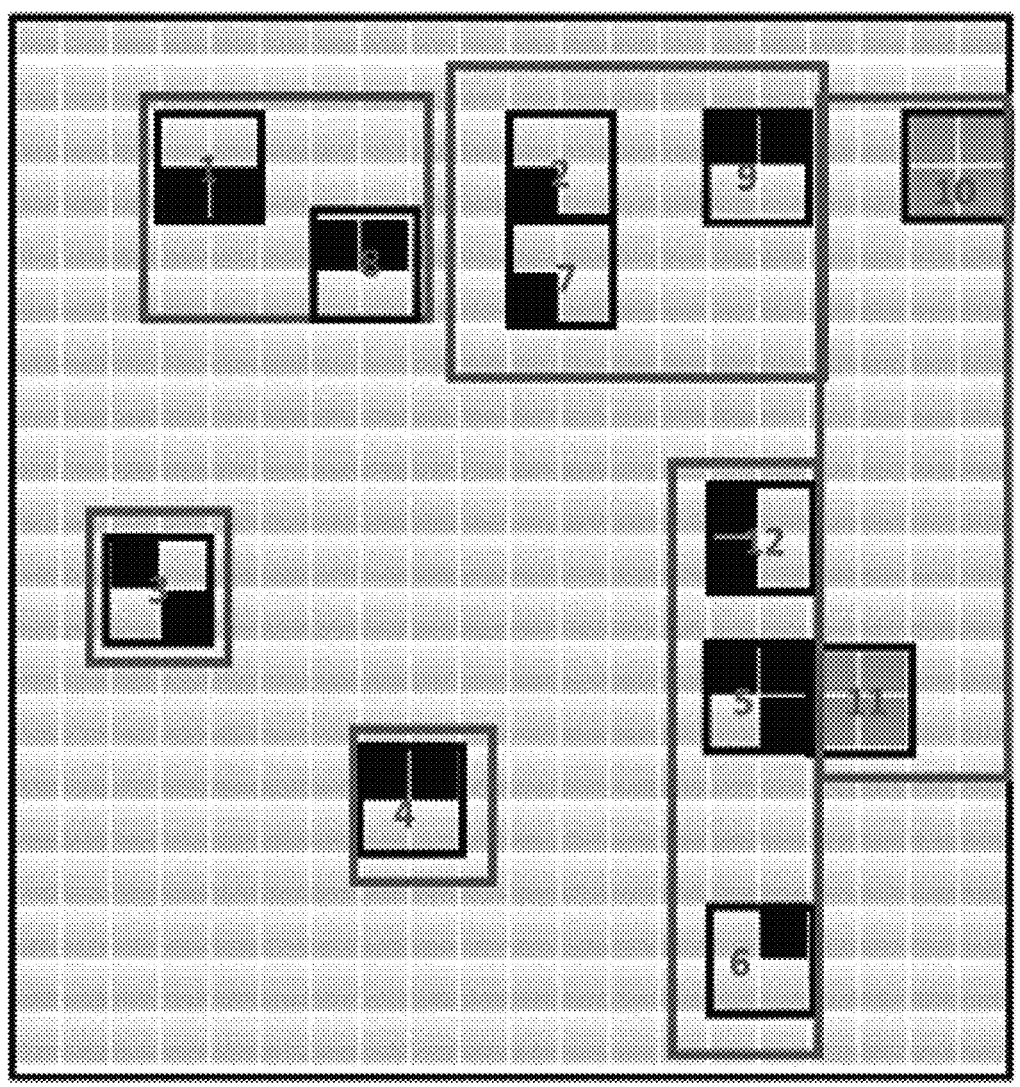
FIG. 25A illustrates an example of the connected component formation process of FIG. 21, in accordance with an embodiment of the present disclosure.
Figure 25B:
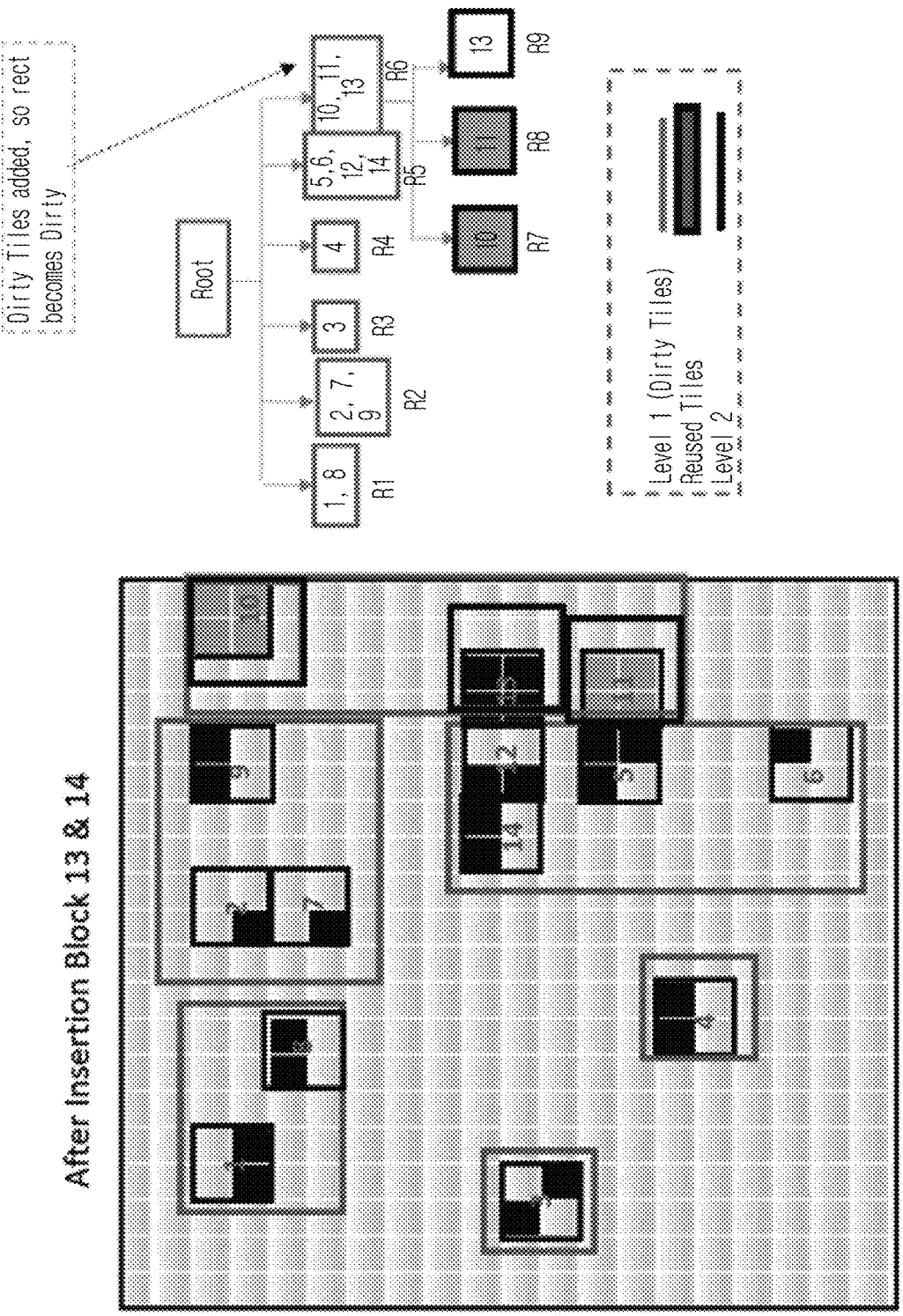
FIG. 25B illustrates an example of the connected component formation process of FIG. 21, in accordance with an embodiment of the present disclosure.
Figure 26A:
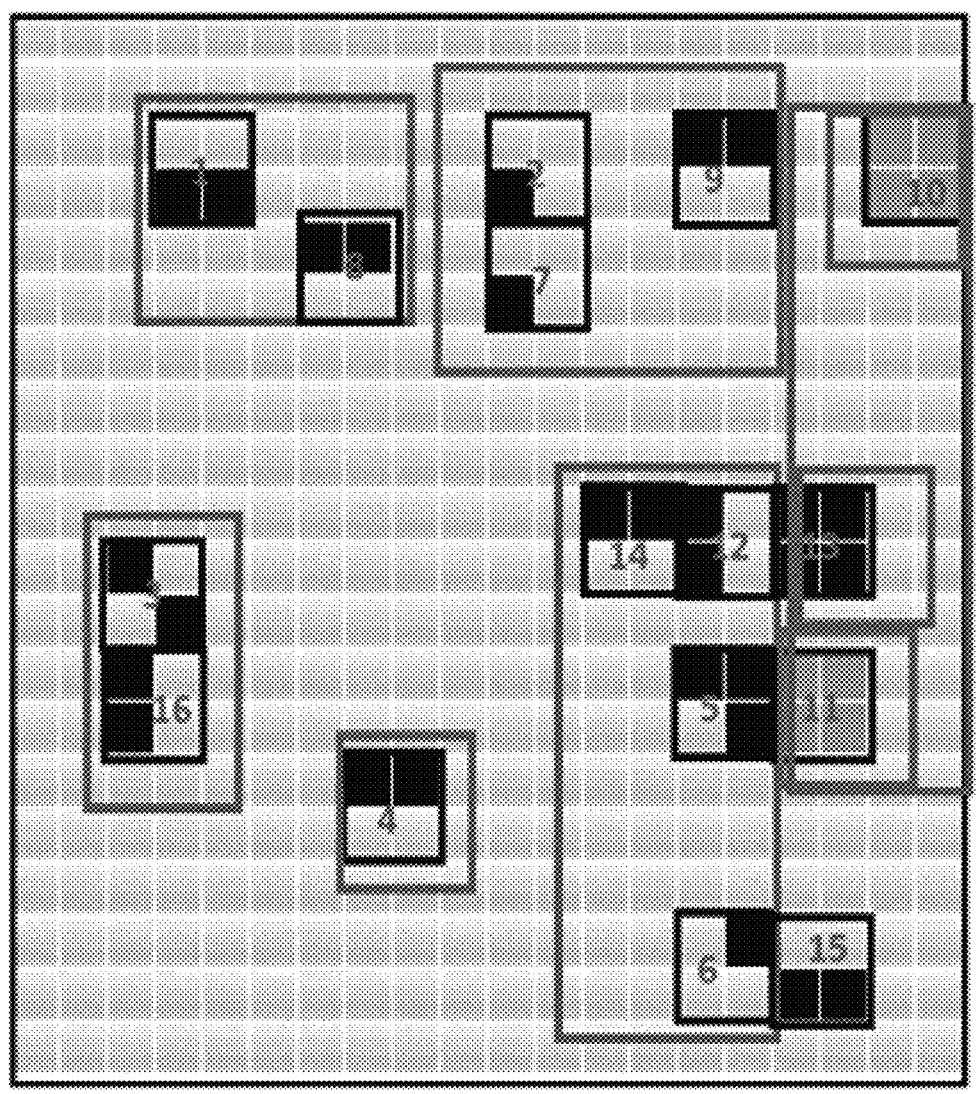
FIG. 26A illustrates an example of the connected component formation process of FIG. 21, in accordance with an embodiment of the present disclosure.
Figure 26B:
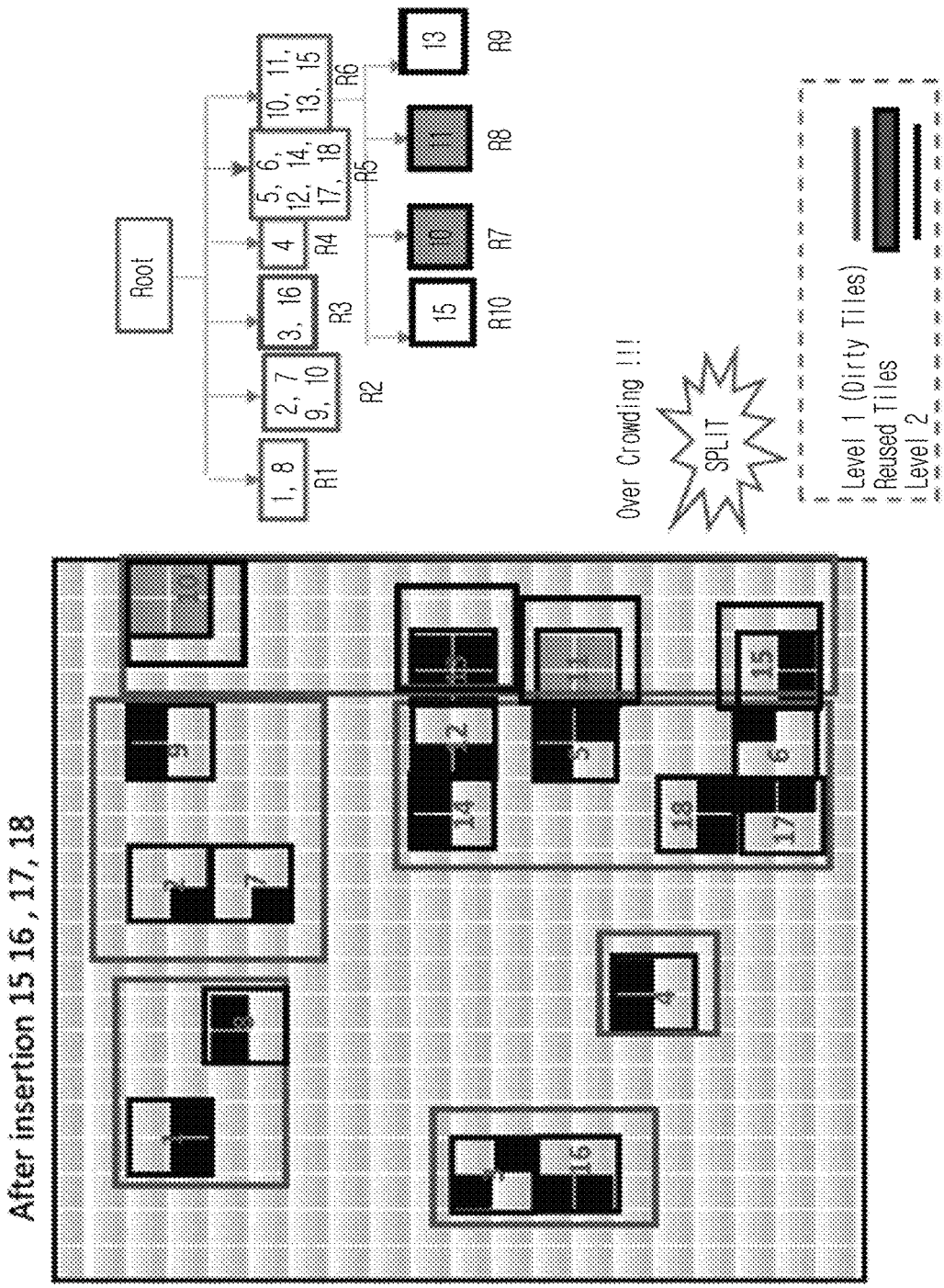
FIG. 26B illustrates an example of the connected component formation process of FIG. 21, in accordance with an embodiment of the present disclosure.
Figure 27:
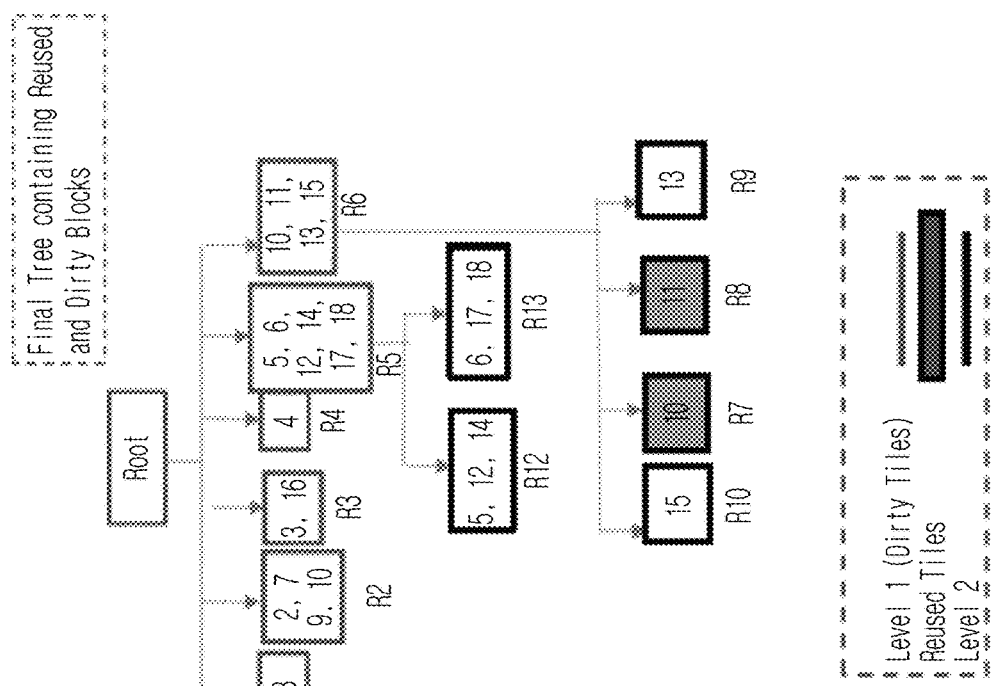
FIG. 27 illustrates an example of the connected component formation process of FIG. 21, in accordance with an embodiment of the present disclosure.
Figure 27:
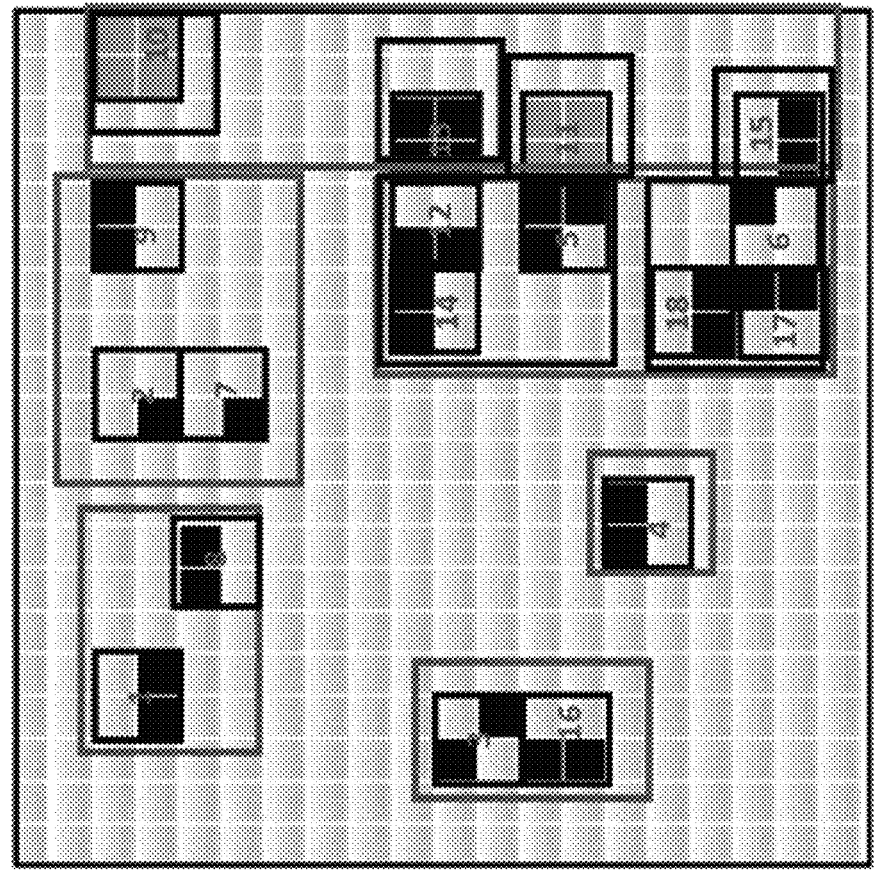

The split operation will be further explained with reference to FIGS. 25A through 27. As shown in FIGS. 25A-25B, the child region R6 at the level 1 is split into Sub child regions R7, R8, and R9 to satisfy the predefined criteria N and E for the child region R6. Further, as shown in FIGS. 26A-26B, the tile size region 15 is added as the R10 separately from the reused regions R7 and R8 to satisfy the criteria E of the child region R6. Also, as shown in FIGS. 25A-25B, 26A-26B, and 27, the tile size regions 12, 14, 17, and 18 were respectively added to the child region R5 including the dirty tiles 5 and 6. Therefore, the child region R5 becomes overcrowded and violates at least one of the predefined criteria N and E. Accordingly, the child region R5 is split into sub child regions R12 and R13 to satisfy at least one of the predefined criteria N and E.

Accordingly, the connected component formation process S408 B of FIG. 21 results in the formation of the hierarchal region tree including the plurality of levels.

Figure 28A:
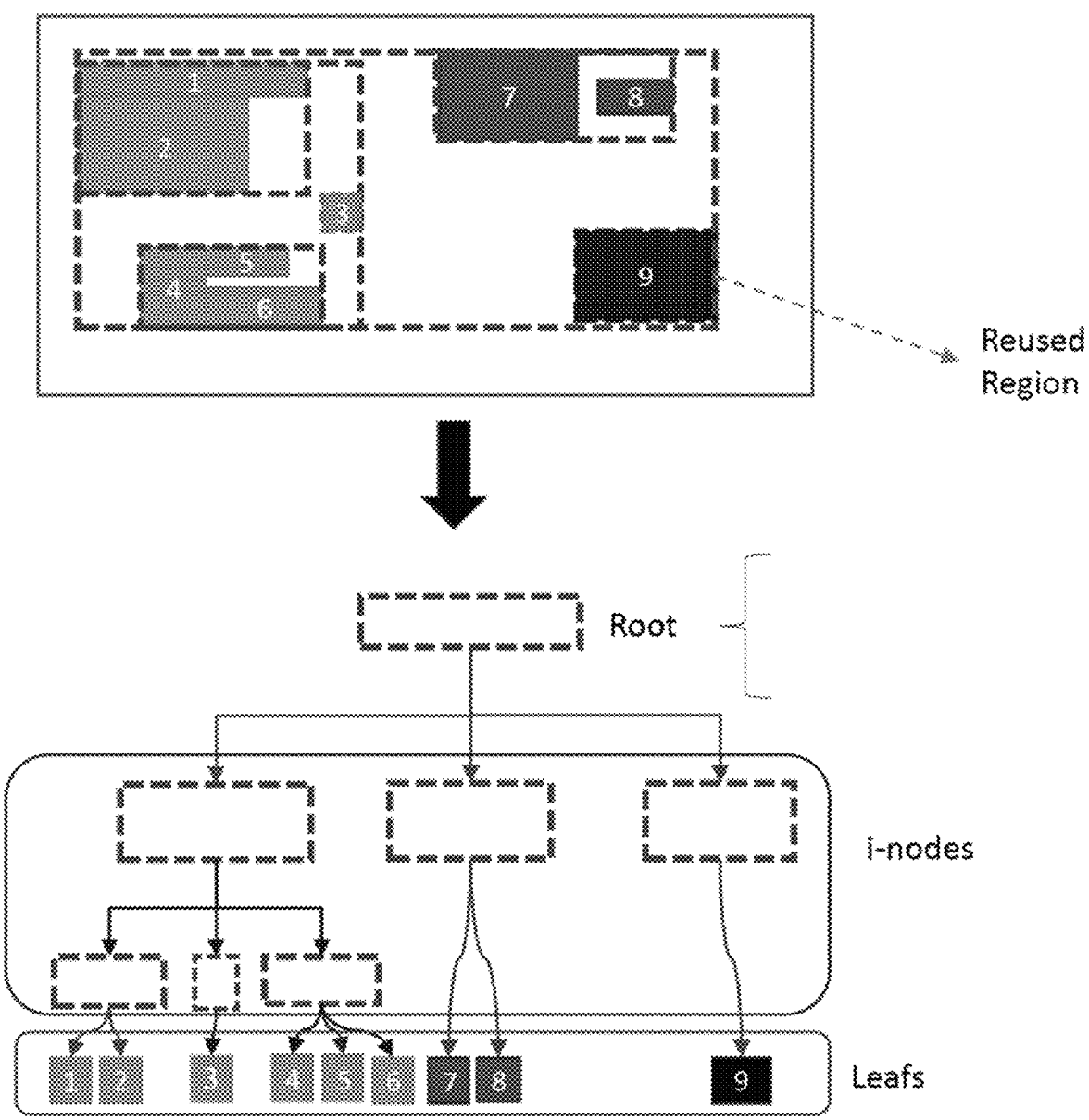
FIG. 28A illustrate an example illustration of the hierarchal region tree formed as a result of the connected component formation process of FIG. 21, in accordance with an embodiment of the present disclosure.
Figure 28B:
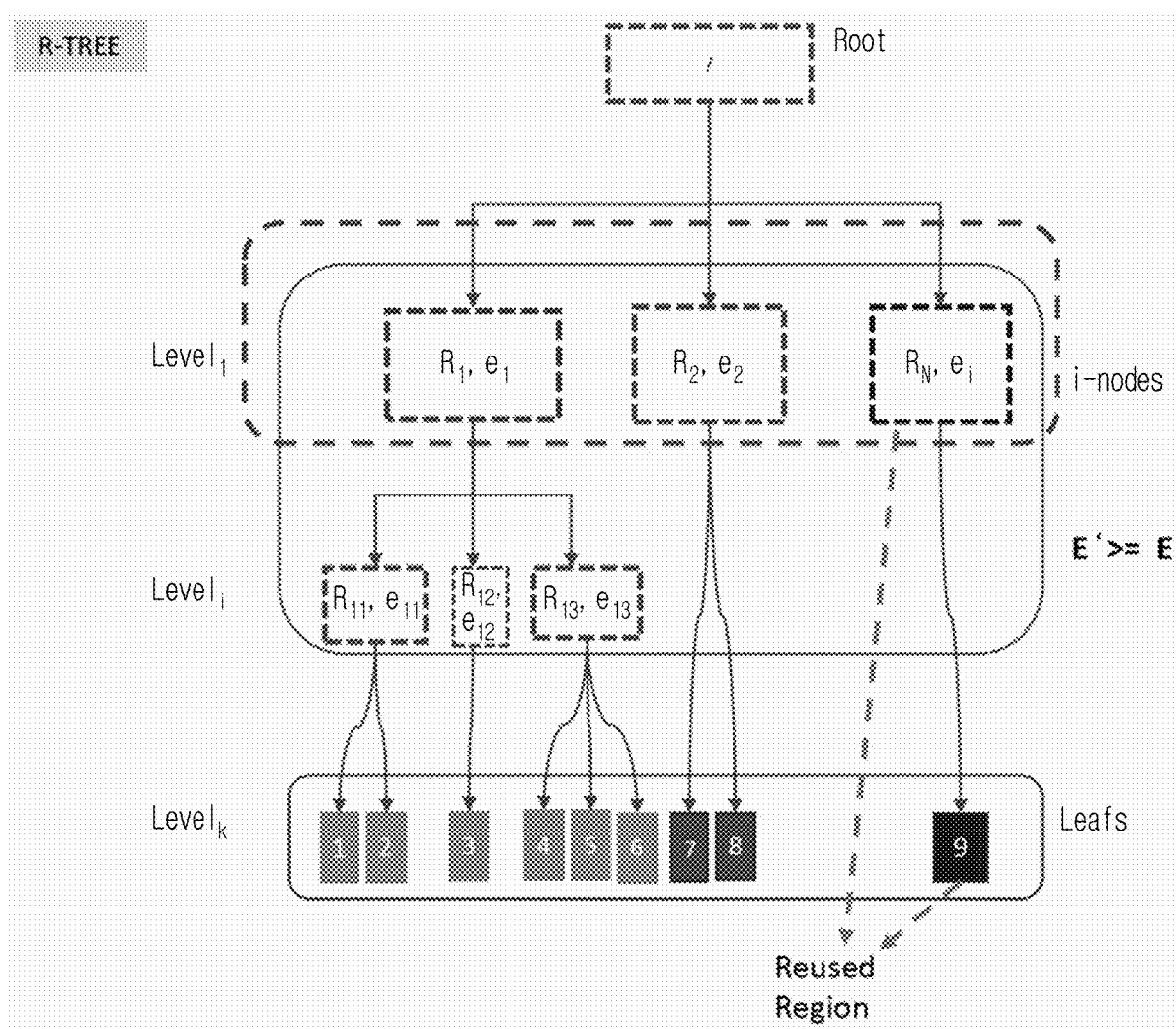
FIG. 28B illustrate an example illustration of the hierarchal region tree formed as a result of the connected component formation process of FIG. 21, in accordance with an embodiment of the present disclosure.

Referring now to FIGS. 28A-28B, illustrate an example illustration of the hierarchal region tree formed as a result of the connected component formation process S408 B of FIG. 21, in accordance with an embodiment of the present disclosure. FIG. 28A illustrates an example of tile size regions including the dirty regions and the reused regions. For example, the tile size region 9 of FIG. 28A represents a reused region. Also, it is shown at FIGS. 28A-28B an example representation of the hierarchal region tree. The uppermost node I of the hierarchal region tree corresponds to the root block. The hierarchal region tree includes levels $Level_1, Level_i, \ldots Level_k$. $Level_1$ of the hierarchal region tree includes i Nodes $(R_1, e_1), (R_2, e_2), \ldots (R_N, e_i)$. These nodes correspond to the child regions directly connected to the root block and are direct child's of the root block. $Level_i$ of the hierarchal region tree includes sub child regions of the child regions at the $Level_1$ and includes sub nodes. For example, $(R_{11}, e_{11}), (R_{12}, e_{12})$, and $(R_{13}, e_{13})$ are sub nodes of the node $(R_1, e_1)$. The bottom most level i.e. $Level_k$ of the hierarchal region tree includes leaf blocks. Each of the tile size regions at the $Level_k$ of the hierarchal region tree.

Now, referring again to FIG. 4, subsequent to the generation of the hierarchal region tree S408 B, the flow of the differential video rendering method 400 now proceeds to block S408 C. The block S408 C describes optimal region formation process S408 C for generating a plurality of optimal regions. The differential video rendering method 400 at the block S408 C, further may include generating the plurality of optimal regions based on the hierarchal region tree satisfying the predefined criteria N and E. The Optimal Region Generator Unit 206A generates the plurality of optimal regions by the optimal region formation process S408 C. The optimal region formation process S408 C is also performed in a series of steps that will be described with reference to the FIG. 29 of the Drawings.

Figure 29:
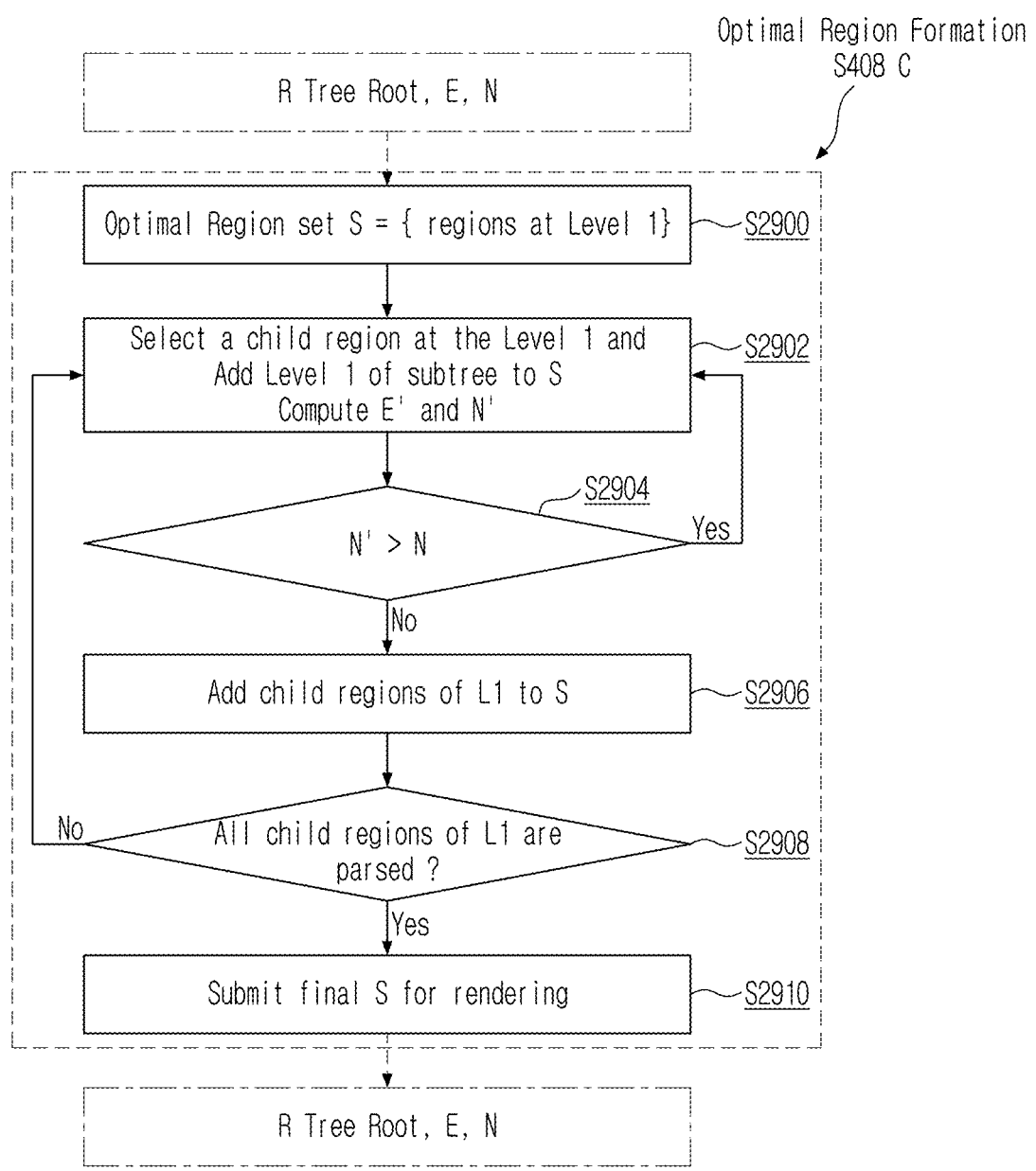
FIG. 29 illustrates a flow chart of an optimal region formation process of the differential video rendering method of FIG. 4, in accordance with an embodiment of the present disclosure.

FIG. 29 illustrates a flow chart of the optimal region formation process S408 C of the differential video rendering method 400 of FIG. 4, in accordance with an embodiment of the present disclosure. The optimal region formation process S408 C includes a series of method-steps S2900 through S2910. The optimal region formation process S408 C starts with the first level of the hierarchal region tree generated by the Optimal Region Generator Unit 206A.

The optimal region formation process S408 C starts with the root block of the hierarchal region tree. Root Block of the hierarchal region tree is the largest single region covering all actual pixel data in the form of the dirty tiles and the reused tiles. Level 1 of the hierarchal region tree is minimum optimal region including at least all child regions of the root block. Further, the Leaf blocks in the last level in the region tree has the maximum efficiency, as it covers only the dirty tiles. Also, if an optimal region includes any reused region, the reused region will be treated as the dirty region.

At block S2900 of the optimal region formation process S408 C, the Optimal Region Generator Unit 206A initializes an optimal region set (S) with all the child regions at the Level 1 and parses the hierarchal region tree in a breadth-first search (BFS) manner. The parsing starts at the root block of the hierarchal region tree and explores all nodes of the hierarchal region tree at present level prior to moving on to the nodes at the next level of the hierarchal region tree. The flow of the optimal region formation process S408 C now proceeds to block S2902.

At the block S2902, the Optimal Region Generator Unit 206A selects a child region at the first level of the hierarchal region tree, and adds the first level including the child region to S. Subsequent to the addition of the first level including the child region to S, the Optimal Region Generator Unit 206A computes an overall efficiency (E') of the first level and an overall optimal number of regions (N') of the first level. The flow of the optimal region formation process S408 C now proceeds to block S2904. Here, an overall efficiency of each level of the hierarchal region tree can be given by $E_L$=No. of Dirty tiles in region R/Total tiles in R. Here, R indicates the regions present at a corresponding level of the hierarchal region tree.

At the block S2904, the Optimal Region Generator Unit 206A determines whether a value of N' exceeds the predefined criteria N. Also, the Optimal Region Generator Unit 206A determines whether a value of E' exceeds the predefined criteria E. If a result of the determination at the block S2904 is Yes and the individual efficiency of the child regions exceeds the predefined criteria E, then the Optimal Region Generator Unit 206A replaces the child region with its sub child regions at the next level to S. Here, the individual efficiency of the child regions at the corresponding level of the hierarchal region tree can be given by: $(\Sigma e_{SL}+(E-E_R))>E$, where $e_{SL}$ is individual efficiency of child regions at Level L of the hierarchal region tree, E is the overall efficiency of the hierarchal region tree, and $E_R$ is the efficiency of the complete region.

Also, the Optimal Region Generator Unit 206A may perform a rearrangement of S in a case the value of N' exceeds the predefined criteria N. Further, if a result of the determination at the block S2904 is No, the Optimal Region Generator Unit 206A may add remaining child regions of the level 1 to S and may re-compute E' and N' after addition to check whether it satisfies each of the predefined criteria N and E. The flow of the optimal region formation process S408 C now proceeds to block 52908.

At the block 52908, the Optimal Region Generator Unit 206A determines whether all of the child regions at the first level of the hierarchal region tree is parsed. If a result of the determination at the block 52908 is No, the Optimal Region Generator Unit 206A repeats the process at the blocks 52902 through 52908 to prepare a final optimal region set for rendering on the graphics display. Further, if a result of the determination at the block 52908 is Yes, the Optimal Region Generator Unit 206A transfers the final optimal region set prepared based on the process at blocks 52902 through 52908 to the Graphics Engine 216 for rendering on the graphics display. Accordingly, the Optimal Region Generator Unit 206A generates one or more optimal regions in the BFS manner from the root block of the hierarchal region tree towards the leaf blocks of the hierarchal region tree, using the at least one child region and at least one sub child region that are formed as the result of the split operation.

The final optimal region set includes a list of optimal regions and each of the optimal region in the list of the optimal regions satisfies the predefined E and N criteria. Also, the one or more optimal regions is generated from the root block towards the leaf blocks such that E' of each optimal region of the one or more optimal regions is greater than or equal to E.

Figure 30:
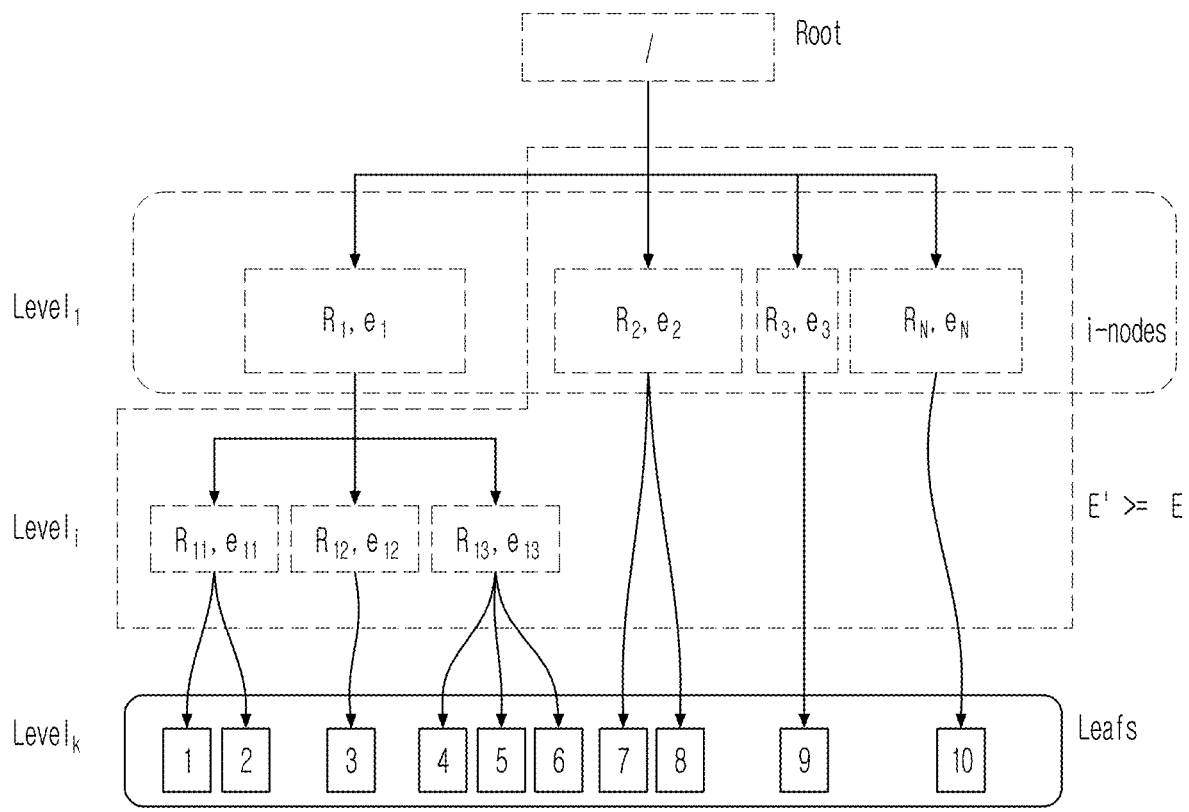
FIG. 30 illustrates an example of the generation of an optimal region set, in accordance with an embodiment of the present disclosure.

FIG. 30 illustrates an example of the generation of the final optimal region set, in accordance with an embodiment of the present disclosure. As shown in FIG. 30 the hierarchal region tree includes levels $Level_1$, $Level_i$, ... $Level_k$. $Level_1$ of the hierarchal region tree includes Nodes $(R_1, e_i)$, $(R_2, e_2)$, $(R_3, e_3)$, and $(R_n, e_n)$. when parsing is performed at the $Level_1$ of the hierarchal region tree in order to find the optimal regions, it is determined that the node $(R_1, e_1)$ needs to be split to have the specific efficiency E'. Therefore, the node $(R_1, e_1)$ is split into sub nodes $(R_{11}, e_{11})$, $(R_{12}, e_{12})$, and $(R_{13}, e_{13})$. Similarly the hierarchal region tree is parsed at each level among the levels $Level_1$, $Level_i$, ... $Level_k$ and the split operation is performed such that each node from the root block towards the leaf blocks has an efficiency greater than or equal to E. As an example, and the split operation is performed such that each node after split satisfies E' in a descending order from the root block towards the leaf blocks.

Once the split operation is performed at level of the hierarchal region tree, the final optimal region set can be generated based on the summation of the nodes after split at the corresponding levels of the hierarchal region tree. As an example, the final optimal region set according to FIG. 30 can be determined as:

Final optimal region set (S)={$(R_{11}, e_{11})$, $(R_{12}, e_{12})$, $(R_{13}, e_{13})$, $(R_2, e_2)$, $(R_3, e_3)$, $(R_n, e_n)$} Accordingly, the cumulative efficiencies of the sub nodes of the hierarchal region tree increases the overall efficiency of the hierarchal region tree.

Figure 31A:
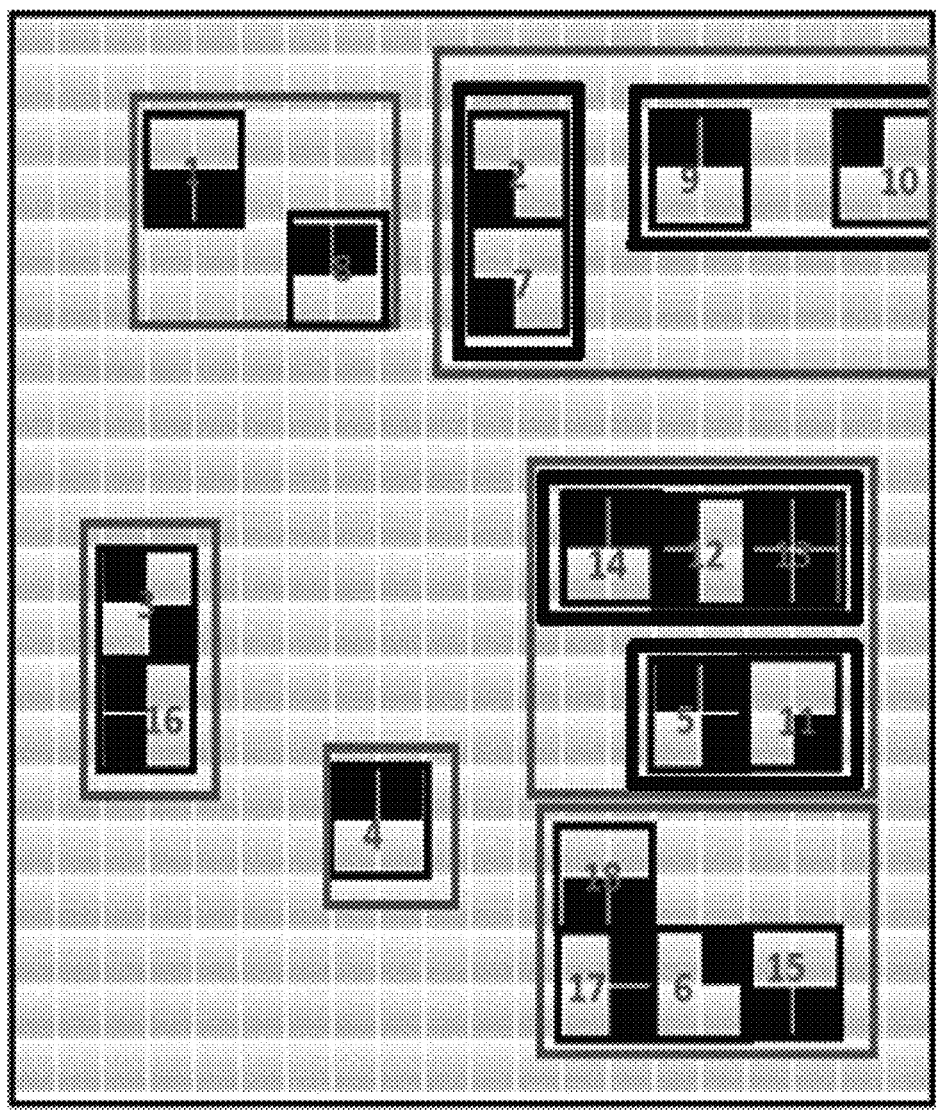
FIG. 31A illustrates an example of the optimal region set, in accordance with an embodiment of the present disclosure.
Figure 31B:
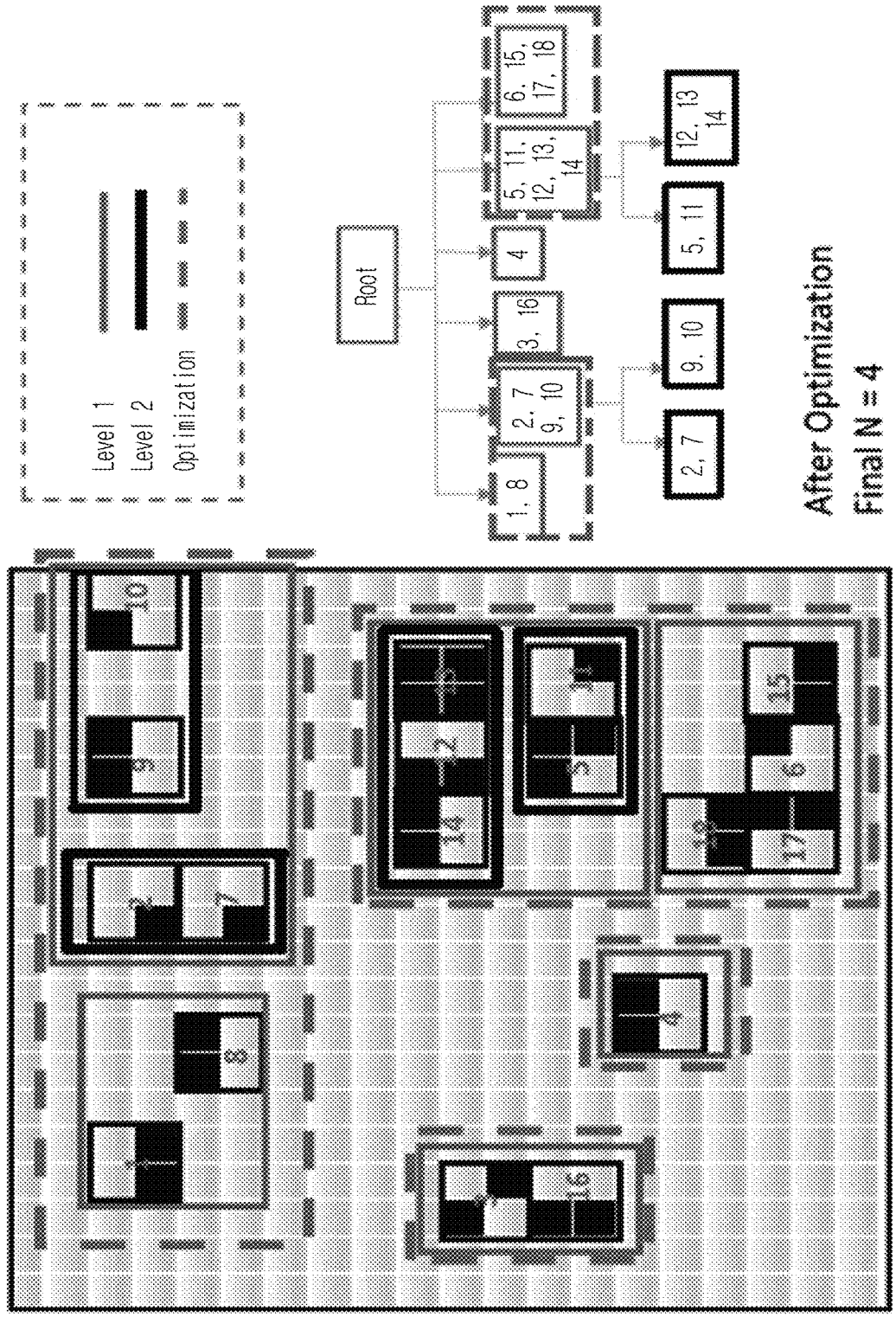
FIG. 31B illustrates an example of the optimal region set, in accordance with an embodiment of the present disclosure.

FIGS. 31A-31B illustrate an example of the final optimal region set generated as a result of the optimal region formation process S408 C, in accordance with an embodiment of the present disclosure. FIGS. 31A-31B describes an optimal set of regions which maximizes the efficiency and also follows the predefined criteria N. As an example, as shown in FIGS. 31A-31B, the final optimal region set generated as the result of the optimal region formation process S408 C includes 4 optimized child regions that are {(R1, R2), (R3), (R4), (R5, R6). Accordingly, the total number of child regions at the level 1 of the hierarchal region tree are optimized by the optimal region formation process S408 C. Further, these optimized regions can leads to reduction in overall bandwidth requirement of the system 200 and enhancement of the rendering performance of the GPU 214 at the time of rendering the decoded video frames on the graphics display by the Graphics Engine 216.

Now, referring again to FIG. 4, subsequent to the optimal region formation process S408 C, the flow of the differential video rendering method 400 now proceeds to block S410. At the block S410, the differential video rendering method 400 may include combining the final optimal region set with a group of the differential regions. As an example, the Graphics Engine 216 executes an optimal region rendering process at the block S410, and accordingly combines the final optimal region set with the group of differential regions. The flow of the differential video rendering method 400 now proceeds to block S412.

At the block S412, the differential video rendering method 400 may include rendering the differential video frame on the graphical display based on the combination of the final optimal region set and the group of differential regions. As an example, the Graphics Engine 216 renders the differential video frame on the graphical display of the output unit 224 based on the combination of the final optimal region set and the group of differential regions.

According to the above-described differential video rendering method 400 and the differential video rendering system 200, the decoded frames can be partially rendered to the graphics display in comparison to the related art full decoded frame rendering method. Accordingly, pixels of the decoded frames are minimally required for rendering and therefore, the GPU DDR accesses can be minimized, and the CPU-GPU DDR bandwidth can be improved.

The final optimal region set prepared based on the process S408 including processes S408 A, S408 B, and S408 C of differential video rendering method 400 provides lesser unchanged region area in comparison to the related art full frame rendering method, thereby saving a lot on DDR bandwidth and reduced amount of rendering leads to improve the performance of a differential video rendering system.

Because the final optimal region set may include only those pixels of the decoded frames that are minimally required for rendering, the rendering performance of the differential video rendering system 200 can be improved and the DDR bandwidth used by the GPU at the time of rendering can also be reduced.

Further, due to presence of too many regions for rendering a rendering pipeline of the GPU can be stalled. In such a scenario, the differential video rendering method 400 and the differential video rendering system 200 of the present disclosure can prevent the rendering pipeline of the GPU from stalling with the application of the minimal optimal region set for rendering. Also, at the same time the CPU consumption can be reduced. Further, the differential video rendering method 400 of the present disclosure traverses down the tree until efficiency of the GPU increases within a limit of maximum number of rectangles 'N' as shown in examples above, thereby provides a maximum efficiency within allowed limits of maximum regions of the GPU.

Figure 32A:
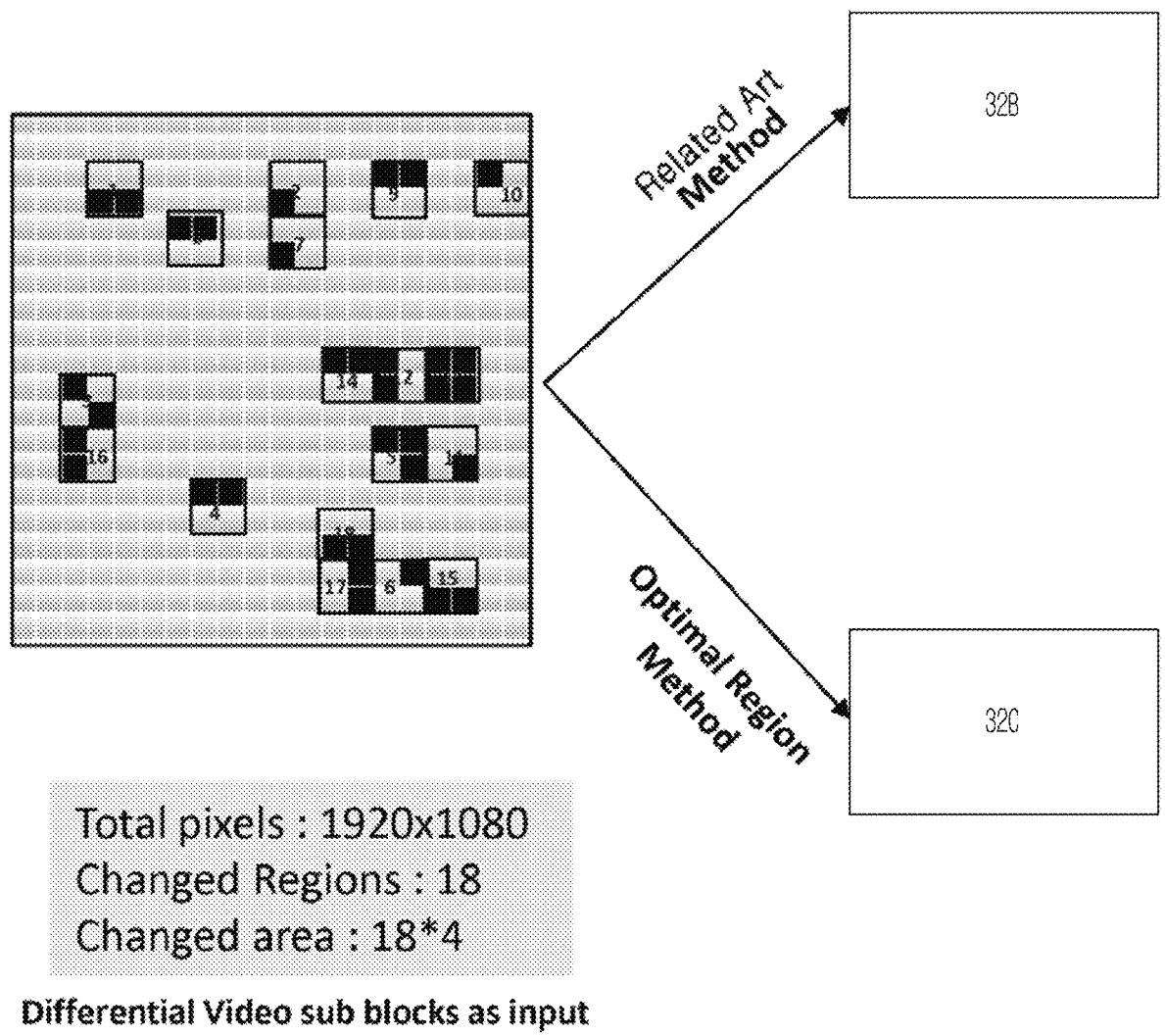
FIG. 32A illustrates exemplary advantages of the differential video rendering method according to embodiments over a related art video rendering method, in in accordance with an embodiment of the present disclosure.
Figure 32B:
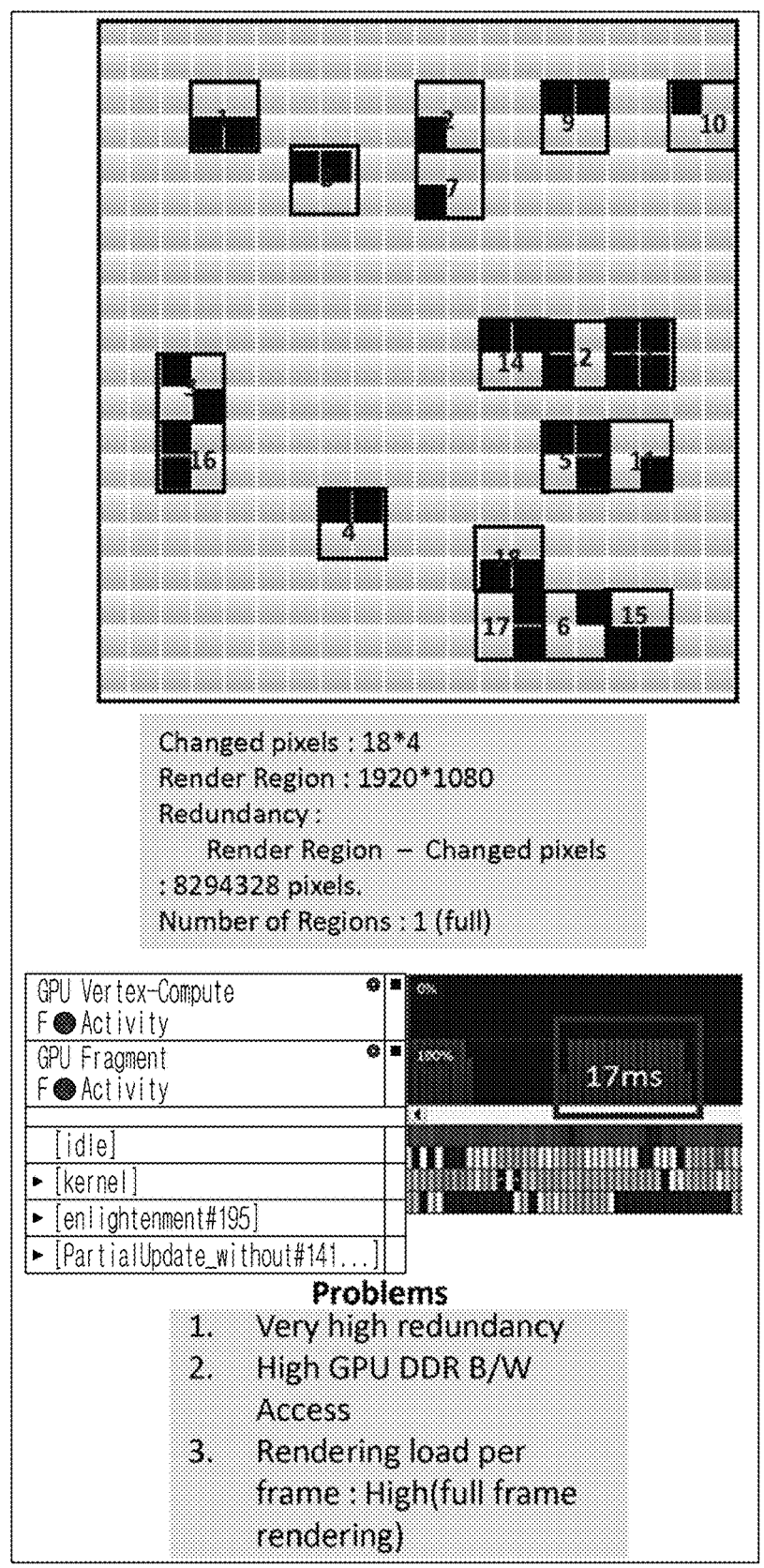
FIG. 32B illustrates exemplary advantages of the differential video rendering method according to embodiments over related art video rendering method, in in accordance with an embodiment of the present disclosure.
Figure 32C:
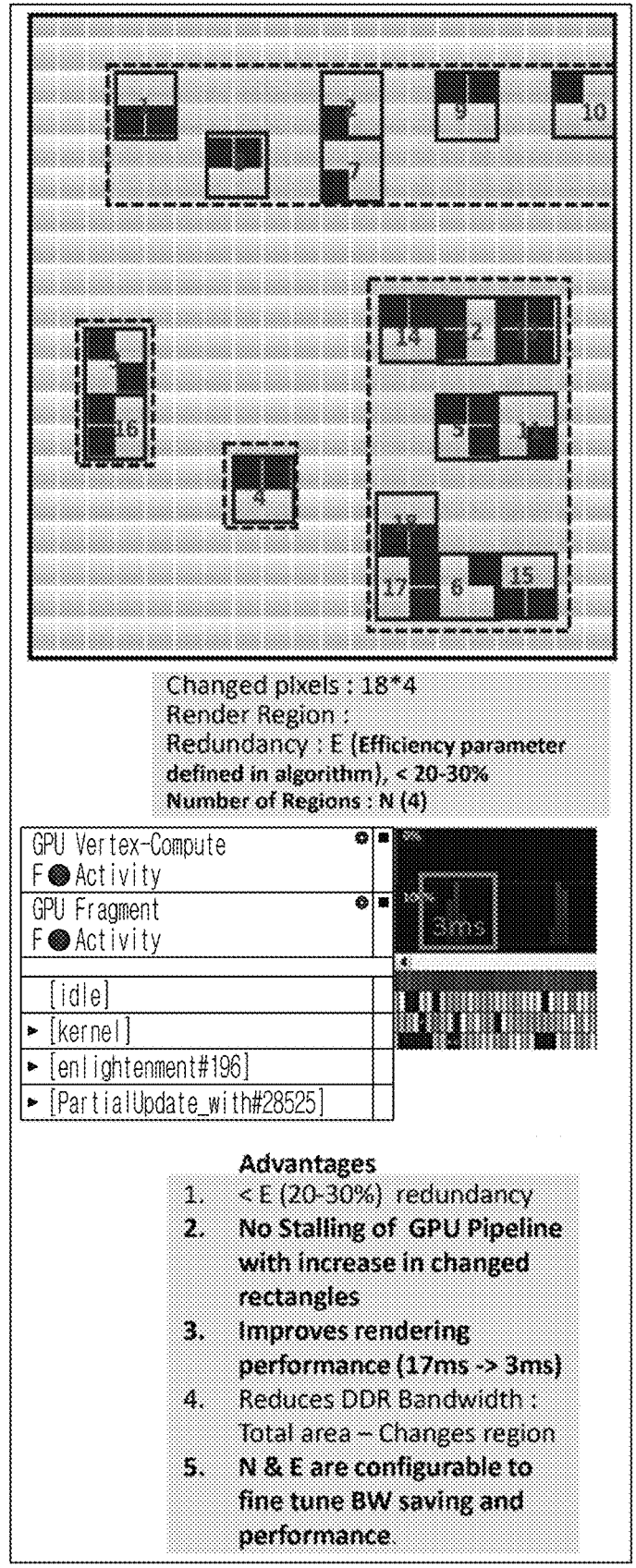
FIG. 32C illustrates exemplary advantages of the differential video rendering method according to embodiments over related art video rendering method, in in accordance with an embodiment of the present disclosure.

FIGS. 32A, 32B, 32C illustrates exemplary advantages of the differential video rendering method 400 over related art video rendering methods, in accordance with an embodiment of the present disclosure. As can be seen from FIGS. 32A, 32B, 32C, the related art video rendering method resulted in problems such as high redundancy, High GPU DDR Bandwidth Access, high rendering load per frame during full frame rendering. However as can been seen from FIGS. 32A, 32B, 32C, the differential video rendering method 400 can results in reduction of the redundancy by 20-30%, overcome stalling of the GPU pipeline, improvement of the rendering performance of the GPU, reduction of the DDR bandwidth, and improvement in efficiency of a video rendering system, in contrary to the related art video rendering method.

Figure 33A:
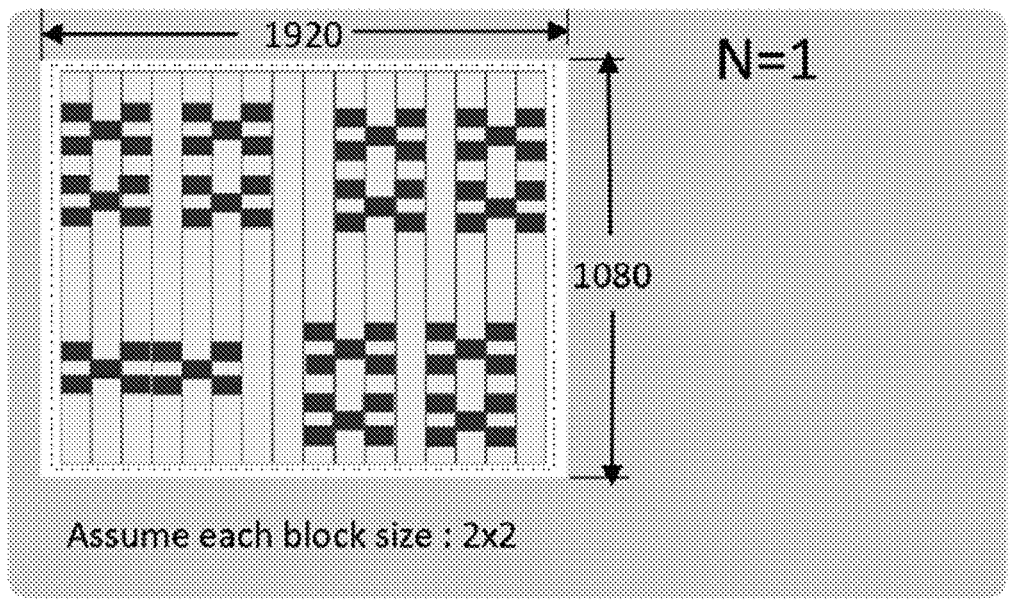
FIG. 33A illustrates yet another exemplary advantages of the differential video rendering method according to embodiments over related art video rendering methods, in accordance with an embodiment of the present disclosure.
Figure 33B:
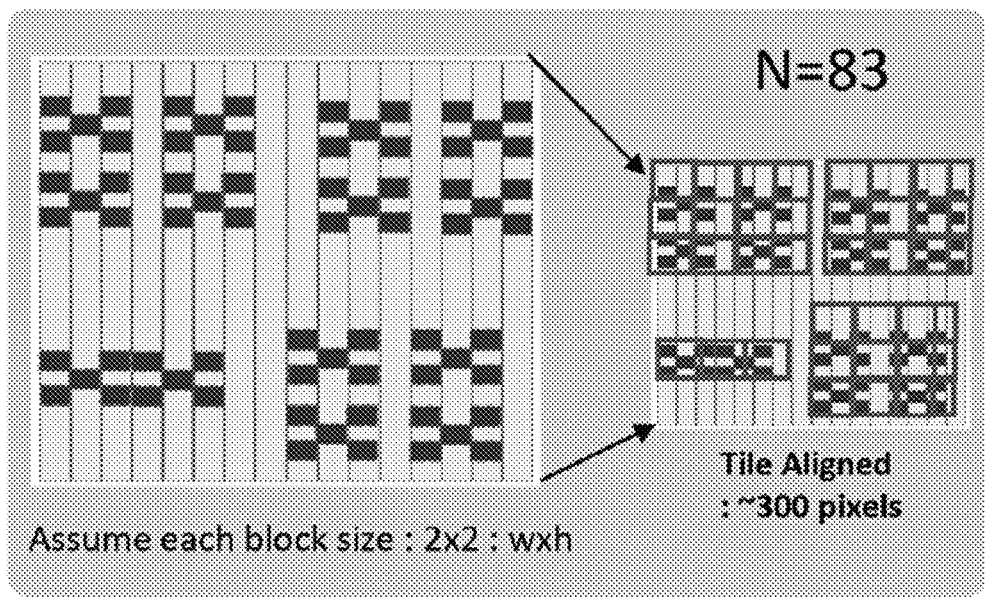
FIG. 33B illustrates yet another exemplary advantages of the differential video rendering method according to embodiments over related art video rendering methods, in accordance with an embodiment of the present disclosure.
Figure 33B:
Figure 33B:
Figure 33C:
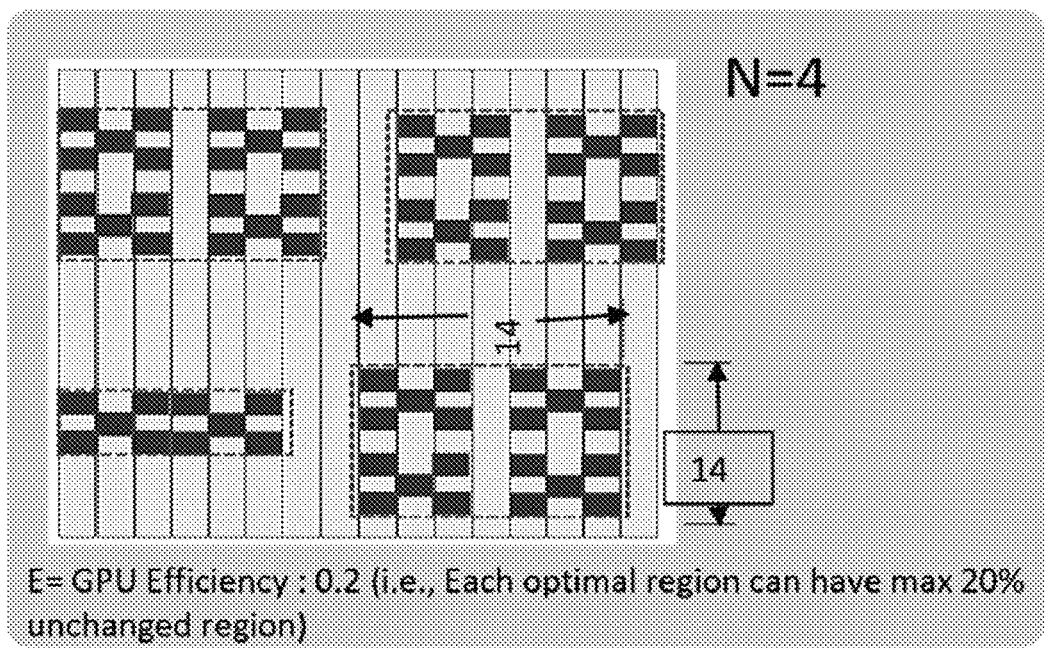
FIG. 33C illustrates yet another exemplary advantages of the differential video rendering method according to embodiments over related art video rendering methods, in accordance with an embodiment of the present disclosure.

FIG. 33A, 33B, 33C illustrates another exemplary advantage of the differential video rendering method 400 over related art video rendering methods, in accordance with an embodiment of the present disclosure. As can be seen from FIGS. 33A, 33B, 33C, the rendering performance of each of the related art video rendering methods is low. However, as can be seen from FIGS. 33A, 33B, 33C, the differential video rendering method according to embodiments has high rendering performance and also maintains the lower CPU utilization.

Further, the differential video rendering method 400 can be implemented in low end system, for example a system having specifications or capabilities that may be lower than other systems. The differential video rendering method 400 overcomes the problems related to the audio glitches in low end systems and problems related to the productization of video texturing features in the low end systems by reducing the bandwidth utilization and increased memory access.

Furthermore, the differential video rendering method 400 can be implemented in various video rendering technology domain. For example, the differential video rendering method 400 can be implemented in Premium Direct TV applications, video texturing solutions like video advertisements on user interface, VR 360, animation video-based user interface that displays animation video on graphical objects, multi view planes that supports graphics rendering. The implementation of the differential video rendering method 400 are not limited to the above described examples. The differential video rendering method 400 can be implemented in any other video texturing solutions different from those described above.

Figure 34:
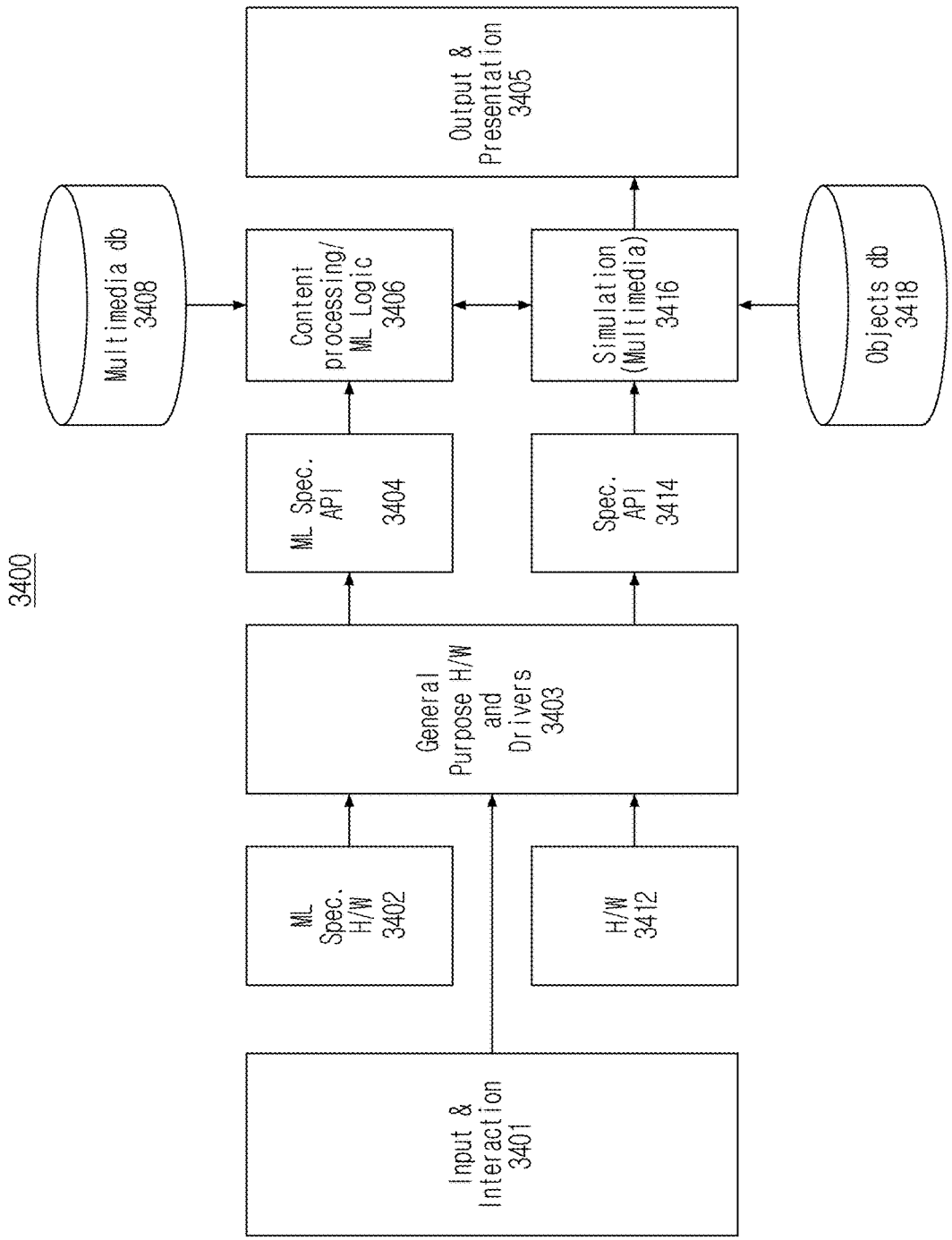
FIG. 34 illustrates another system architecture, in accordance with an embodiment of the present disclosure.

FIG. 34 illustrates a representative architecture 3400 to provide tools and development environment described herein for a technical-realization of the system 200. FIG. 34 is a non-limiting example, and it will be appreciated that many other architectures may be implemented to facilitate the functionality described herein. The architecture may be executing on hardware such as architecture 3400 of FIG. 34 that includes, among other things, processors, memory, and various application-specific hardware components.

The architecture 3400 may include an operating system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as file-system (e.g., C standard library) that may provide functions such as memory allocation functions, string manipulation functions, mathematic functions, and the like. In addition, the libraries may include API libraries such as audio-visual media libraries (e.g., multimedia data libraries to support presentation and manipulation of various media format such as MPEG4, H.264, MP3, AAC, AMR, JPG, PNG), database libraries (e.g., SQLite that may provide various relational database functions), web libraries (e.g. WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Further, the architecture 3400 depicts an aggregation of audio/video processing device based mechanisms and ML/NLP based mechanism in accordance with an embodiment of the present subject matter. A user-interface defined as input and interaction 3401 refers to overall input. It can include one or more of the following—touch screen, microphone, camera etc. A first hardware module 3402 depicts specialized hardware for ML/NLP based mechanisms. In an example, the first hardware module 3402 may include one or more of neural processors, FPGA, DSP, GPU etc.

A second hardware module 3412 depicts specialized hardware for executing the data splitting and transfer. ML/NLP based frameworks and APIs 3404 correspond to the hardware interface layer for executing the ML/NLP logic 3406 based on the underlying hardware. In an example, the frameworks may be one or more or the following—Tensorflow, Café, NLTK, GenSim, ARM Compute etc. Simulation frameworks and APIs 3414 may include one or more of— Audio Core, Audio Kit, Unity, Unreal etc.

A database 3408 depicts a pre-trained database. The database 3408 may be remotely accessible through cloud by the ML/NLP logic 3406. In other example, the database 3408 may partly reside on cloud and partly on-device based on usage statistics.

Another database 3418 refers the memory. The database 3418 may be remotely accessible through cloud. In other example, the database 3418 may partly reside on the cloud and partly on-device based on usage statistics.

A rendering module 3405 is provided for rendering audio output and trigger further utility operations. The rendering module 3405 may be manifested as a display cum touch screen, monitor, speaker, projection screen, etc.

Figure 35:
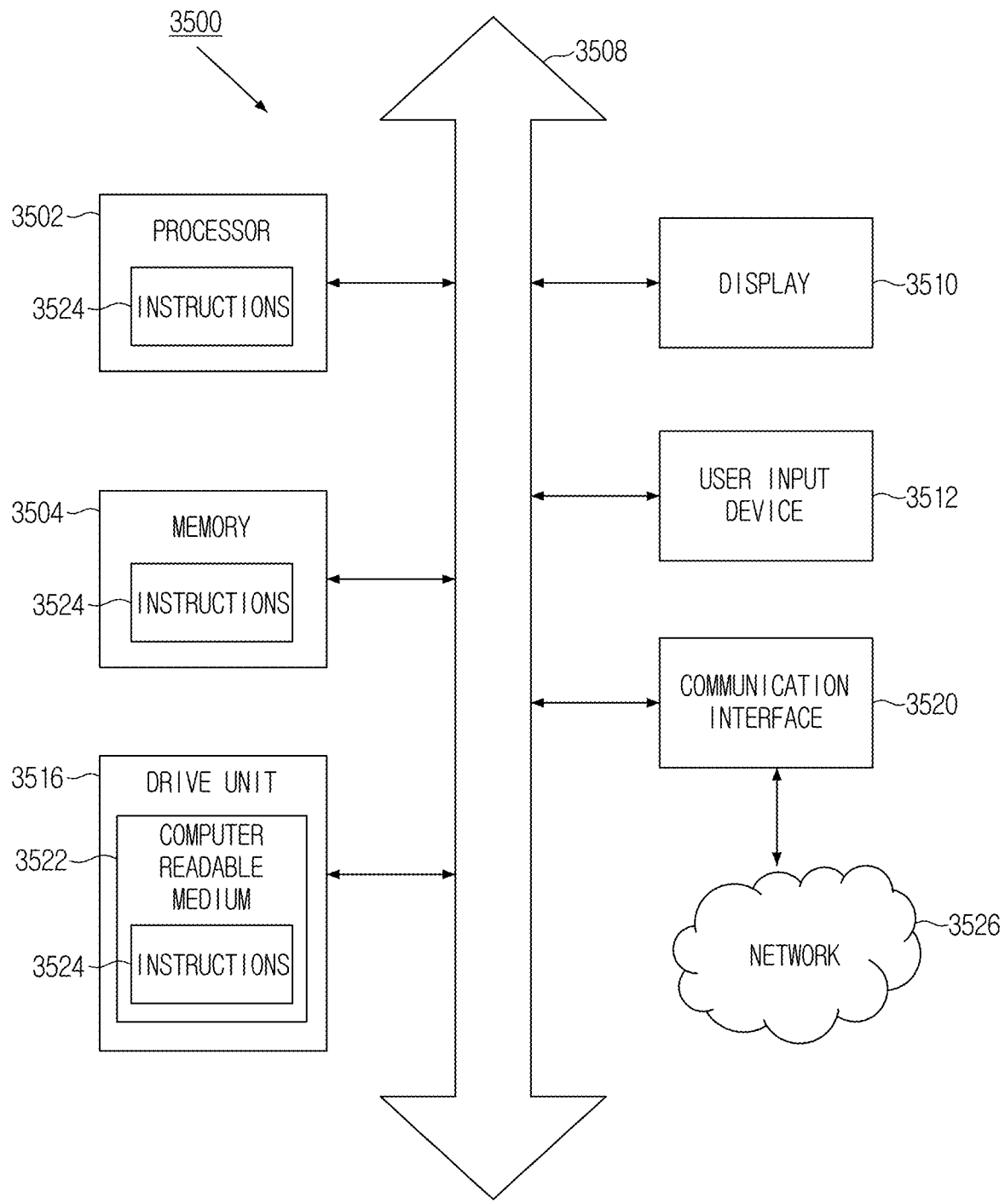
FIG. 35 illustrates yet another exemplary implementation in accordance with an embodiment of the present disclosure.

A general-purpose hardware and driver module 3403 corresponds to the computing system 3500 as referred in FIG. 35 and instantiates drivers for the general purpose hardware units as well as the application-specific units (3402, 3412).

In an example, the ML mechanism underlying the present architecture 3400 may be remotely accessible and cloud-based, thereby being remotely accessible through a network connection. An audio/video processing device may be configured for remotely accessing the NLP/ML modules and simulation modules may include skeleton elements such as a microphone, a camera a screen/monitor, a speaker etc.

Further, at-least one of the plurality of modules of mesh network may be implemented through AI based on an ML/NLP logic 3406. A function associated with AI may be performed through the non-volatile memory, the volatile memory, and the processor constituting the first hardware module 3402 i.e. specialized hardware for ML/NLP based mechanisms. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor 3502 of FIG. 35.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of the desired characteristic is made. "Obtained by training" means that a predefined operation rule or artificial intelligence model configured to perform a desired feature (or purpose) is obtained by training a basic artificial intelligence model with multiple pieces of training data by a training technique. The learning may be performed in a device (i.e. the architecture 3400 or the system 3500) itself in which AI according to an embodiment is performed, and/or may be implemented through a separate server/system. "

The AI model may consist of a plurality of neural network layers. Each layer has a plurality of weight values, and performs a neural network layer operation through calculation between a result of computation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic 3406 is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

FIG. 35 illustrates another exemplary implementation in accordance with embodiments, and yet another typical hardware configuration of the architecture 3400 in the form of a computer system 3500. The computer system 3500 can include a set of instructions that can be executed to cause the computer system 3500 to perform any one or more of the methods disclosed. The computer system 3500 may operate as a standalone device or may be connected, e.g., using a network, to other computer systems or peripheral devices.

In a networked deployment, the computer system 3500 may operate in the capacity of a server or as a client user computer in a server-client user network environment, or as a peer computer system in a peer-to-peer (or distributed) network environment. The computer system 3500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 3500 is illustrated, the term "system" shall also be taken to include any collection of systems or sub-systems that individually or jointly execute a set, or multiple sets, of instructions to perform one or more computer functions.

The computer system 3500 may include a processor 3502 e.g., a central processing unit (CPU), a graphics processing unit (GPU), or both. The processor 3502 may be a component in a variety of systems. For example, the processor 3502 may be part of a standard personal computer or a workstation. The processor 3502 may be one or more general processors, digital signal processors, application-specific integrated circuits, field-programmable gate arrays, servers, networks, digital circuits, analog circuits, combinations thereof, or other now known or later developed devices for analyzing and processing data. The processor 3502 may implement a software program, such as code generated manually (i.e., programmed).

The computer system 3500 may include a memory 3504, such as a memory 3504 that can communicate via a bus 3508. The memory 3504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 3504 includes a cache or random access memory for the processor 3502. In alternative examples, the memory 3504 is separate from the processor 3502, such as a cache memory of a processor, the system memory, or other memory. The memory 3504 may be an external storage device or database for storing data. The memory 3504 is operable to store instructions executable by the processor 3502. The functions, acts or tasks illustrated in the figures or described may be performed by the programmed processor 3502 for executing the instructions stored in the memory 3504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 3500 may or may not further include a display 3510, such as a liquid crystal display (LCD), an organic light-emitting diode (OLED), a flat panel display, a solid-state display, a cathode ray tube (CRT), a projector, a printer or other now known or later developed display device for outputting determined information. The display 3510 may act as an interface for the user to see the functioning of the processor 3502, or specifically as an interface with the software stored in the memory 3504 or the drive unit 3516.

Additionally, the computer system 3500 may include an input device 3512 configured to allow a user to interact with any of the components of system 3500. The computer system 3500 may also include a disk drive or optical drive, for example in drive unit 3516. The disk drive may include a computer-readable medium 3522 in which one or more sets of instructions 3524, e.g. software, can be embedded. Further, the instructions 3524 may embody one or more of the methods or logic as described. In a particular example, the instructions 3524 may reside completely, or at least partially, within the memory 3504 or within the processor 3502 during execution by the computer system 3500.

Embodiments may relate to a computer-readable medium that includes instructions 3524 or receives and executes instructions 3524 responsive to a propagated signal so that a device connected to a network 3526 can communicate voice, video, audio, images, or any other data over the network 3526. Further, the instructions 3524 may be transmitted or received over the network 3526 via a communication interface 3520, which may be for example a communication port, or using a bus 3508. The communication interface 3520 may be a part of the processor 3502 or maybe a separate component. The communication interface 3520 may be created in software or maybe a physical connection in hardware. The communication interface 3520 may be configured to connect with a network 3526, external media, the display 3510, or any other components in system 3500, or combinations thereof. The connection with the network 3526 may be a physical connection, such as a wired Ethernet connection or may be established wirelessly as discussed later. Likewise, the additional connections with other components of the system 3500 may be physical or may be established wirelessly. The network 3526 may alternatively be directly connected to the bus 3508.

The network 3526 may include wired networks, wireless networks, Ethernet AVB networks, or combinations thereof. The wireless network may be a cellular telephone network, an 802.11, 802.16, 802.20, 802.1Q or WiMax network. Further, the network 3526 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A differential video rendering system, comprising:
   a graphics processing unit (GPU);
   a graphical display coupled to the GPU;
   a video decoder configured to decode a bitstream of encoded data into a plurality of sets of decoded blocks;
   at least one processor configured to:
      generate, based on a first set of the plurality of sets of decoded blocks, a first differential video frame comprising a plurality of sets of differential regions,
      normalize each set of the plurality of sets of differential regions to a fixed size block to provide a normalized plurality of sets of differential regions,
      map a respective set of the normalized plurality of sets of differential regions to align with a respective tile size region of a plurality of tile size regions conforming with the GPU,
      generate a hierarchal region tree based on the normalized plurality of sets of differential regions mapped to the plurality of tile size regions, and
      generate a plurality of optimal regions based on the hierarchal region tree satisfying a predefined criteria corresponding to a pre-defined optimal number of regions and a predefined efficiency parameter; and
   a graphics rendering engine configured to render the first differential video frame on the graphical display based on the plurality of optimal regions and a group of differential regions.

2. The differential video rendering system as claimed in claim 1, wherein a respective optimal region of the plurality of optimal regions includes a set of tile size regions, and satisfies the predefined criteria.

3. The differential video rendering system as claimed in claim 2, further comprising a central processing unit (CPU) configured to:
   determine the pre-defined optimal number of regions based on experimental values associated with at least one of a clock speed of the GPU, a clock speed of the CPU, and a number of processing cores included in the GPU; and
   determine the predefined efficiency parameter based on system variable parameters corresponding to at least one of the clock speed of the GPU, a bandwidth of the GPU, a memory configuration coupled to the GPU, a width of a memory bus, and the number of the processing cores included in the GPU, wherein the predefined efficiency parameter corresponds to a processing capability of the GPU to process maximum differential regions with a minimum bandwidth.

4. The differential video rendering system as claimed in claim 3, wherein the pre-defined optimal number of regions corresponds to a maximum number of optimal regions that can be passed to a rendering pipeline of the GPU without impacting an overall performance of the GPU.

5. The differential video rendering system as claimed in claim 3, wherein the at least one processor is further configured to:
   determine a first number of tile size regions among the plurality of tile size regions that includes a minimum number of differential regions;

execute a marking process to mark, as dirty tiles, the first number of tile size regions having the minimum number of differential regions; and generate a list of the dirty tiles based on the marking process.

6. The differential video rendering system as claimed in claim 5, wherein the at least one processor is further configured to:

generate a blocklist including the plurality of tile size regions based on the list of the dirty tiles;

select a root block from the blocklist, wherein the root block is a superset of all blocks in the blocklist;

select, in a sequential order, a second number of tile size regions among the plurality of tile size regions in the blocklist;

add the selected second number of tile size regions to the root block in the sequential order until a number of child regions of the root block exceeds the predefined criteria corresponding to the pre-defined optimal number of regions; and generate a first level of the hierarchal region tree based on the addition of the selected second number of tile size regions to the root block.

7. The differential video rendering system as claimed in claim 6, wherein the at least one processor is further configured to:

select a third number of tile size regions among the plurality of tile size regions in the blocklist, wherein the third number of tile size regions neighbors the second number of tile size regions;

add, in the sequential order, the selected third number of tile size regions to the first level of the hierarchal region tree;

determine at least one child region of the root block at the first level exceeds at least one of the pre-defined optimal number of regions and the predefined efficiency parameter; and split, into a first plurality of sub child regions, the at least one child region which exceeds the at least one of the pre-defined optimal number of regions and the pre-defined efficiency parameter, such that each sub child region of the first plurality of sub child regions satisfies the predefined criteria.

8. The differential video rendering system as claimed in claim 7, wherein the at least one processor is further configured to generate a second level of the hierarchal region tree based on the split of the at least one child region into the first plurality of sub child regions, wherein the second level of the hierarchal region tree includes the first plurality of sub child regions, and wherein the second level corresponds to a level subsequent to the first level of the hierarchal region tree.

9. The differential video rendering system as claimed in claim 8, wherein the hierarchal region tree includes a plurality of levels, wherein the plurality of levels includes at least the first level, and wherein the at least one processor is further configured to:

determine whether any of sub child regions at each of the plurality of levels exceeds at least one of the pre-defined optimal number of regions and the predefined efficiency parameter; and split, into a second plurality of sub child regions, the sub child regions which exceed the at least one of the pre-defined optimal number of regions and the pre-defined efficiency parameter, such that each of the sub child regions at a corresponding level of the plurality of levels satisfies the predefined criteria.

10. The differential video rendering system as claimed in claim 9, wherein a bottom level of the hierarchal region tree includes leaf blocks, wherein the at least one processor is further configured to generate, based on the split of the at least one child region and at least one sub child region among any of the sub child regions, the plurality of optimal regions from the root block towards the leaf blocks, and wherein the plurality of optimal regions is generated from the root block towards the leaf blocks such that each optimal region of the plurality of optimal regions has an efficiency greater than or equal to the predefined efficiency parameter.

11. The differential video rendering system as claimed in claim 8, wherein the at least one processor is further configured to:

arrange, in an order of the generation of the first level and the second level, the first level and the second level from a top of the root block towards leaf blocks; and generate the hierarchal region tree based on the arrangement.

12. The differential video rendering system as claimed in claim 3, wherein the at least one processor is further configured to generate a second differential video frame based on a second set of the plurality of sets of decoded blocks, wherein the generation of the first differential video frame occurs before the generation of the second differential video frame, wherein a first number of tile size regions among the plurality of tile size regions corresponds to reused tiles, wherein a second number of tile size regions among the plurality of tile size regions corresponds to dirty tiles, wherein the reused tiles are fully composed of reused blocks, wherein the reused blocks correspond to blocks which have same pixel values in the first differential video frame and the second differential video frame, and wherein the dirty tiles include the reused blocks.

13. The differential video rendering system as claimed in claim 12, wherein the at least one processor is further configured to:

generate a blocklist including the plurality of tile size regions based on a list of the reused tiles and the dirty tiles;

select a root block from the blocklist, wherein the root block is a superset of all blocks in the blocklist;

select, in a sequential order, a first set of the dirty tiles and the reused tiles;

add the selected first set of the dirty tiles and the reused tiles to the root block in the sequential order until a number of child regions of the root block exceeds the pre-defined optimal number of regions, wherein each reused tile of the first set of the reused tiles is added to the root block as a separate child region; and generate a first level of the hierarchal region tree based on the addition of the selected first set of the dirty tiles and the reused tiles to the root block.

14. The differential video rendering system as claimed in claim 13, wherein the at least one processor is further configured to:

select a second set of each of the dirty tiles and the reused tiles, wherein the second set of the dirty tiles neighbor the first set of the dirty tiles;

add, in the sequential order, the selected second set of the dirty tiles and the reused tiles to the first level of the hierarchal region tree;

determine at least one child region of the root block at the first level exceeds at least one of the pre-defined optimal number of regions and the predefined efficiency parameter; and split, into a first plurality of sub child regions, the at least one child region which exceeds the at least one of the pre-defined optimal number of regions and the pre-defined efficiency parameter, such that each sub child region of the first plurality of sub child regions satisfies the predefined criteria.

15. The differential video rendering system as claimed in claim 14, wherein the at least one processor is further configured to generate a second level of the hierarchal region tree based on the split of the at least one child region into the first plurality of sub child regions, wherein the second level of the hierarchal region tree includes the first plurality of sub child regions, and wherein the second level corresponds to a level subsequent to the first level of the hierarchal region tree.

16. The differential video rendering system as claimed in claim 15, wherein the hierarchal region tree includes a plurality of levels, wherein the plurality of levels includes at least the first level, and wherein the at least one processor is further configured to:

determine whether any of sub child regions at each of the plurality of levels exceeds at least one of the pre-defined optimal number of regions and the predefined efficiency parameter; and split, into a second plurality of sub child regions, the sub child regions which exceed the at least one of the pre-defined optimal number of regions and the pre-defined efficiency parameter, such that each of the sub child regions at a corresponding level the plurality of levels satisfies the predefined criteria.

17. The differential video rendering system as claimed in claim 16, wherein a bottom level of the hierarchal region tree includes leaf blocks, wherein the at least one processor is further configured to generate, based on the split of the at least one child region and at least one sub child region among any of the sub child regions, the plurality of optimal regions from the root block towards the leaf blocks, and wherein the plurality of optimal regions is generated from the root block towards the leaf blocks such that each optimal region of the plurality of optimal regions has an efficiency greater than or equal to the predefined efficiency parameter.

18. The differential video rendering system as claimed in claim 15, wherein the at least one processor is further configured to:

arrange the first level and the second level in an order of generation from a top of the root block towards leaf blocks; and generate the hierarchal region tree based on the arrangement.

19. The differential video rendering system as claimed in claim 12, wherein each of the first differential video frame and the second differential video frame corresponds to one of a static video frame or a dynamic video frame.

20. The differential video rendering system as claimed in claim 1, wherein the at least one processor is further configured to map, based on a tile-based rendering process, the normalized plurality of sets of differential regions to align with the plurality of tile size regions.

* * * * *